United States Patent
Wittek et al.

(10) Patent No.: US 10,711,197 B2
(45) Date of Patent: *Jul. 14, 2020

(54) LIQUID-CRYSTALLINE MEDIUM AND HIGH-FREQUENCY COMPONENTS COMPRISING SAME

(71) Applicant: MERCK PATENT GMBH, Darmstadt (DE)

(72) Inventors: Michael Wittek, Erzhausen (DE); Dagmar Klass, Darmstadt (DE); Atsutaka Manabe, Bensheim (DE); Christian Jasper, Seligenstadt (DE); Volker Reiffenrath, Rossdorf (DE); Constanze Brocke, Gross-Gerau (DE); Detlef Pauluth, Ober-Ramstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,178

(22) Filed: Jan. 26, 2017

(65) Prior Publication Data

US 2017/0130129 A1 May 11, 2017

Related U.S. Application Data

(62) Division of application No. 14/820,803, filed on Aug. 7, 2015, now Pat. No. 9,593,279.

(30) Foreign Application Priority Data

Aug. 8, 2014 (EP) .................................... 14002781

(51) Int. Cl.
| | | |
|---|---|---|
| G02F 1/1333 | (2006.01) | |
| C09K 19/34 | (2006.01) | |
| C09K 19/12 | (2006.01) | |
| C09K 19/16 | (2006.01) | |
| C09K 19/18 | (2006.01) | |

(Continued)

(52) U.S. Cl.
CPC .......... *C09K 19/3444* (2013.01); *C09K 19/10* (2013.01); *C09K 19/12* (2013.01); *C09K 19/16* (2013.01); *C09K 19/18* (2013.01); *C09K 19/3001* (2013.01); *C09K 19/3003* (2013.01); *C09K 19/542* (2013.01); *H01Q 1/36* (2013.01); *H01Q 21/0006* (2013.01); *C09K 2019/0444* (2013.01); *C09K 2019/0448* (2013.01); *C09K 2019/0459* (2013.01); *C09K 2019/122* (2013.01); *C09K 2019/123* (2013.01); *C09K 2019/161* (2013.01); *C09K 2019/181* (2013.01);

(Continued)

(58) Field of Classification Search
CPC .... C09K 19/3444; C09K 19/10; C09K 19/12; C09K 19/16; C09K 19/18; C09K 19/3001; C09K 19/3003; C09K 19/542; C09K 2019/0444; C09K 2019/0448; C09K 2019/0459; C09K 2019/122; C09K 2019/123; C09K 2019/161; C09K 2019/181; C09K 2019/3016; C09K 2019/548; C09K 2019/2219; C09K 2019/11; G02F 1/1333; H01Q 1/36; H01Q 21/0006
USPC .................................................... 252/299.63
See application file for complete search history.

(56) References Cited

U.S. PATENT DOCUMENTS

| | | |
|---|---|---|
| 6,569,505 B2 | 5/2003 | Poetsch |
| 7,361,288 B2 | 4/2008 | Lussem et al. |

(Continued)

FOREIGN PATENT DOCUMENTS

| | | |
|---|---|---|
| CN | 102 352 260 A | 2/2012 |
| CN | 102604649 A | 7/2012 |

(Continued)

OTHER PUBLICATIONS

Search Report dated Dec. 8, 2015 issued in corresponding application EP 15 00 2259 (pp. 1-7).

(Continued)

*Primary Examiner* — Geraldina Visconti
(74) *Attorney, Agent, or Firm* — Millen White Zelano & Branigan, PC; Brion P. Heaney

(57) ABSTRACT

The present invention relates to liquid-crystalline media comprising
one or more compounds selected from the group of compounds of formulae I, II and III,

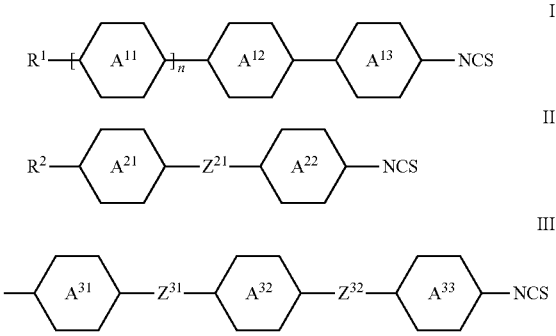

in which the parameters $R^1$-$R^3$, $Z^{21}$, $Z^{31}$, $Z^{32}$ and rings $A^{11}$, $A^{12}$, $A^{13}$, $A^{21}$, $A^{22}$, $A^{31}$, and $A^{32}$ are as defined herein, and to components comprising these media for high-frequency technology, in particular phase shifters and microwave array antennas.

30 Claims, No Drawings

(51) Int. Cl.
*C09K 19/30* (2006.01)
*C09K 19/10* (2006.01)
*C09K 19/54* (2006.01)
*H01Q 1/36* (2006.01)
*H01Q 21/00* (2006.01)
*C09K 19/04* (2006.01)

(52) U.S. Cl.
CPC ............... *C09K 2019/3016* (2013.01); *C09K 2019/548* (2013.01); *C09K 2219/11* (2013.01)

(56) References Cited

U.S. PATENT DOCUMENTS

| | | | |
|---|---|---|---|
| 9,593,279 B2 * | 3/2017 | Wittek | .................. C09K 19/10 |
| 2002/0142108 A1 | 10/2002 | Poetsch et al. | |
| 2004/0119051 A1 | 6/2004 | Yun et al. | |
| 2005/0067605 A1 | 3/2005 | Lussem et al. | |

FOREIGN PATENT DOCUMENTS

| | | |
|---|---|---|
| CN | 102660296 A | 9/2012 |
| CN | 103 725 294 A | 4/2014 |
| CN | 103725294 A | 4/2014 |
| DE | 102004029429 A1 | 2/2005 |
| JP | 2013237842 A | 11/2013 |

OTHER PUBLICATIONS

F. Dubois, et al., "Large Microwave Birefringence Liquid-Crystal Characterization for Phase-Shifter Applications", The Japan Society of Applied Physics. vol. 47, No. 5, (2008), pp. 3564-3567.

Sebastian Gauza et al., "Isothyocyanato-Tolanes Based High Birefringence and Fast Response Time Mixtures for Photonic Applications", Molecular Crystals and Liquid Crystals, Sep. 12, 2016, pp. 214-226.

English translation of Second Office Action in correspondingJP Application No. 2015-157566 dated Nov. 19, 2019 (pp. 1-2).

Sun et al: Digest of Technical Papers-Society for Information Display International Symposium, 2010, 41, 1758-1761, p. 132.

Sun et al: Liquid Crystals, 2009, 36(12), 1401-1408.

Yang et al: Liquid Crystals, 2013, 40(10), 1316-1321.

Dabrowski et al: Liquid Crystals, 2013, 40(10), 1339-1353.

Dubois et al: Japanese Journal of Applied Physics, 2008, 47(5), 3564-3567.

Reuter et al; Journal of Materials Chemistry C, 2013, 1, 4457-4463.

English translation of Second Office Action in corresponding CN Application No. 201510482208.6 dated Sep. 6, 2019 (pp. 1-9).

\* cited by examiner

LIQUID-CRYSTALLINE MEDIUM AND HIGH-FREQUENCY COMPONENTS COMPRISING SAME

FIELD OF THE INVENTION

The present invention relates to liquid-crystalline media and to high-frequency components comprising same, especially microwave components for high-frequency devices, such as devices for shifting the phase of microwaves, in particular for microwave phased-array antennas.

PRIOR ART AND PROBLEM TO BE SOLVED

Liquid-crystalline media have been used for some time in electro-optical displays (liquid crystal displays: LCDs) in order to display information.

Recently, however, liquid-crystalline media have also been proposed for use in components for microwave technology, such as, for example, in DE 10 2004 029 429.1 A and in JP 2005-120208 (A).

As a typical microwave application, the concept of the inverted microstrip line as described by K. C. Gupta, R. Garg, I. Bahl and P. Bhartia: Microstrip Lines and Slotlines, 2$^{nd}$ ed., Artech House, Boston, 1996, is employed, for example, in D. Dolfi, M. Labeyrie, P. Joffre and J. P. Huignard: Liquid Crystal Microwave Phase Shifter. *Electronics Letters*, Vol. 29, No. 10, pp. 926-928, May 1993, N. Martin, N. Tentillier, P. Laurent, B. Splingart, F. Huert, P H. Gelin, C. Legrand: Electrically Microwave Tunable Components Using Liquid Crystals. 32$^{nd}$ European Microwave Conference, pp. 393-396, Milan 2002, or in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002, C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, together with the commercial liquid crystal K15 from Merck KGaA. C. Weil, G. Lüssem, and R. Jakoby: Tunable Invert-Microstrip Phase Shifter Device Using Nematic Liquid Crystals, *IEEE MTT-S Int. Microw. Symp.*, Seattle, Wash., June 2002, pp. 367-370, achieve phase shifter qualities of 12°/dB at 10 GHz with a control voltage of about 40 V therewith. The insertion losses of the LC, i.e. the losses caused only by the polarization losses in the liquid crystal, are given as approximately 1 to 2 dB at 10 GHz in Weil, C.: Passiv steuerbare Mikrowellenphasenschieber auf der Basis nichtlinearer Dielektrika [Passively Controllable Microwave Phase Shifters based on Nonlinear Dielectrics], Darmstädter Dissertationen D17, 2002. In addition, it has been determined that the phase shifter losses are determined primarily by the dielectric LC losses and the losses at the waveguide junctions. T. Kuki, H. Fujikake, H. Kamoda and T. Nomoto: Microwave Variable Delay Line Using a Membrane Impregnated with Liquid Crystal. *IEEE MTT-S Int. Microwave Symp. Dig.* 2002, pp. 363-366, June 2002, and T. Kuki, H. Fujikake, T. Nomoto: Microwave Variable Delay Line Using Dual-Frequency Switching-Mode Liquid Crystal. *IEEE Trans. Microwave Theory Tech.*, Vol. 50, No. 11, pp. 2604-2609, November 2002, also address the use of polymerized LC films and dual-frequency switching-mode liquid crystals in combination with planar phase shifter arrangements.

A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548 describe, inter alia, the properties of the known single liquid-crystalline substance K15 (Merck KGaA, Germany) at a frequency of 9 GHz.

A. Gaebler, F. Goelden, S. Müller, A. Penirschke and R. Jakoby "Direct Simulation of Material Permittivites using an Eigen-Susceptibility Formulation of the Vector Variational Approach", 12MTC 2009—International Instrumentation and Measurement Technology Conference, Singapore, 2009 (IEEE), pp. 463-467, describe the corresponding properties of the known liquid-crystal mixture E7 (likewise Merck KGaA, Germany).

DE 10 2004 029 429.1 A describes the use of liquid-crystal media in microwave technology, inter alia in phase shifters. It has already investigated liquid-crystalline media with respect to their properties in the corresponding frequency range. In addition, it describes liquid-crystalline media which comprise a small amount of a single compound of the formula

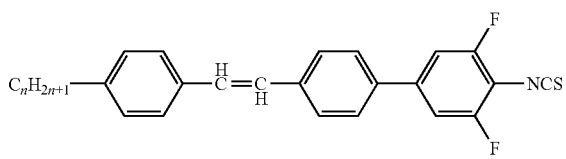

respectively

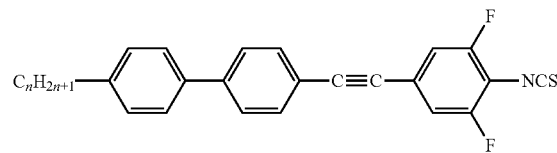

in combination with the well known cyanobiphenyl compound

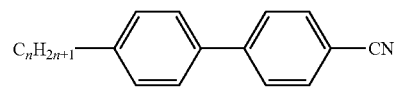

and also media comprising, besides other compounds,

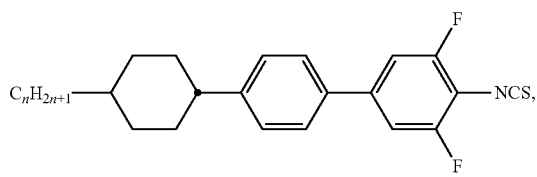

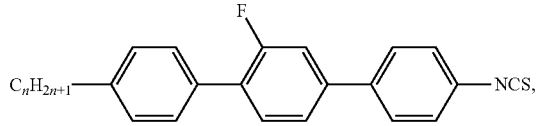

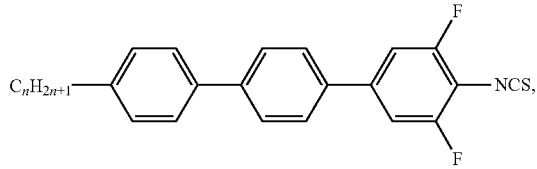

-continued

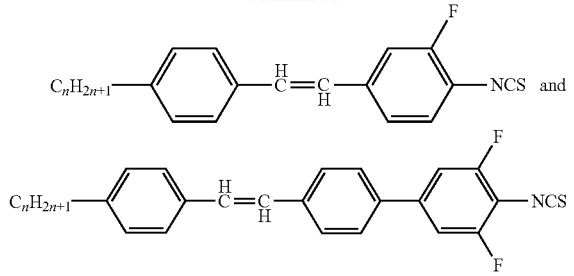

respectively

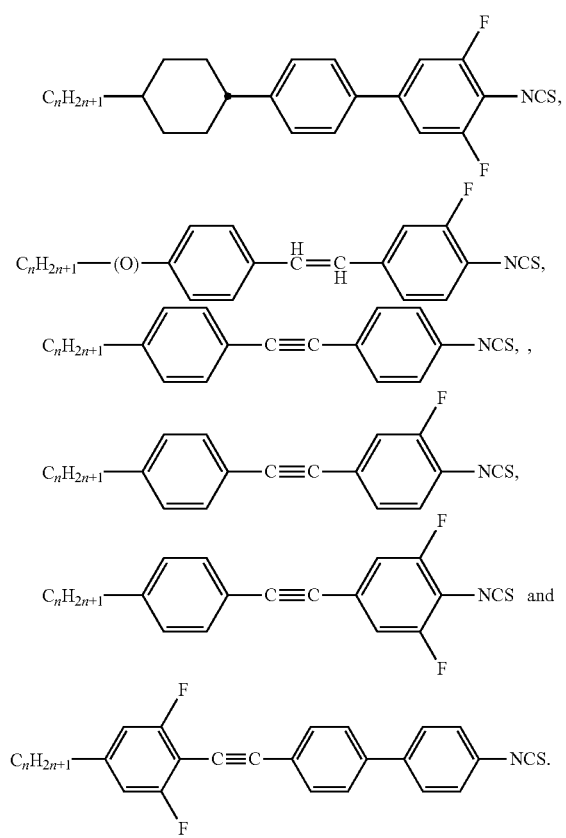

These relatively simple mixtures, however, show limited performance for the application in devices operating in the microwave regime and even need to be significantly improved with respect to their general physical properties, such as, especially, the clearing point, the phase range, especially their stability against storage at low temperatures, and their viscosities, in particular their rotational viscosity.

Further liquid crystalline media for microwave applications comprising one or more these compounds, as well as similar ones, are proposed for microwave applications in DE 10 2010 025 572 A and WO 2013/034227.

Polymer stabilization of liquid crystalline media, as well as doping by chiral dopants, has already been proposed for several types of display applications and for various reasons. However, there has been no respective suggestion for the type of applications envisaged by the instant application.

The known devices for the high frequency-technology comprising these media do still lack sufficient stability and, in particular, fast response.

However, these compositions are afflicted with serious disadvantages. Most of them result, besides other deficiencies, in disadvantageously high losses and/or inadequate phase shifts or inadequate material quality.

For these applications, liquid-crystalline media having particular, hitherto rather unusual and uncommon properties or combinations of properties are required.

Novel liquid-crystalline media having improved properties are thus necessary. In particular, the dielectric loss in the microwave region must be reduced and the material quality ($\eta$, sometimes also called figure of merit, short FoM), i.e. a high tunability and, at the same time, a low dielectric loss, must be improved. Besides these requirements increased focus has to be placed on improved response times for several envisaged applications especially for those devices using planar structures such as e.g. phase shifters and leaky antennas.

In addition, there is a steady demand for an improvement in the low-temperature behavior of the components. Both an improvement in the operating properties at low temperatures and also in the shelf life are necessary here.

There is therefore a considerable demand for liquid-crystalline media having suitable properties for corresponding practical applications.

The invention additionally has the aim of providing improved methods and materials, to achieve polymer stabilized mesogenic phases, in particular nematic phases, which do not have the above-mentioned disadvantages of methods and materials described in prior art. These mesogenic phases comprise a polymer and a low molecular weight mesogenic material. Consequently, they are also called "composite systems", or short "systems".

Another aim of the invention is to extend the pool of suitable materials available to the expert. Other aims are immediately evident to the expert from the following description.

Additionally, it has been found that by using an RM (reactive mesogen), a stabilized liquid crystalline phase which has improved, faster switching times, good tunability and acceptable loss can be achieved.

Additionally to mesogenic monomers the use of non-mesogenic monomers, such as 2-ethylhexylacrylate, is also possible and in certain instances may be beneficial. It, however, also may be problematic due to the volatile nature of such compounds, leading to problems of loss due to evaporation and inhomogeniety of the mixed monomer/host system.

Also, the use of non-mesogenic compounds can severely lower the clearing point of the liquid liquid crystalline host, leading to a much smaller width of the polymer stabilized nematic phase, which is not desirable for most practical applications.

Using RMs having a cyclohexylene core instead of a core comprising one or more 1,4-phenylenes has an advantage for the stability against UV irradiation in general and in particular against the UV irradiation used in the polymerization process. The resultant polymer stabilized phase (composite system) therefore has a high voltage holding ratio (VHR).

Also, it has been found that by using cyclohexylene RMs in combination with a liquid liquid crystalline host comprising fluorophenyl liquid crystalline compounds, the RMs do effectively stabilize this host to give a high VHR, which is necessary for advanced state-of-the-art devices.

PRESENT INVENTION

Surprisingly, it has now been found that it is possible to achieve liquid-crystalline media having a suitably fast switching times, a suitable, nematic phase range and loss which do not have the disadvantages of the prior-art materials, or at least only do so to a considerably reduced extent.

These improved liquid-crystalline media in accordance with the present invention comprise one or more compounds selected from the group of compounds of formulae I, II and III

  I in which

R[1] denotes H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably unfluorinated alkyl or unfluorinated alkenyl, n denotes 0 or 1, preferably 1, and

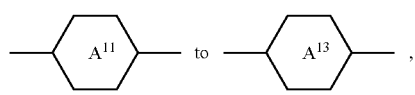

independently of one another, denote

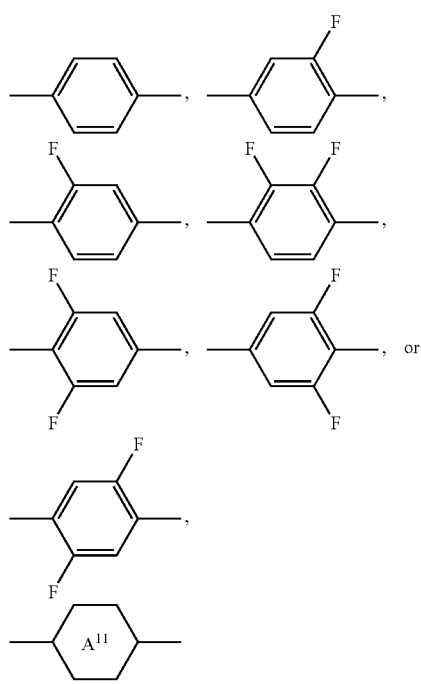

alternatively denotes

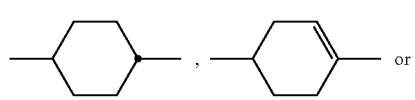 or

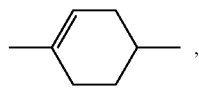, preferably

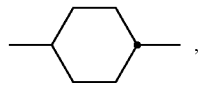, preferably

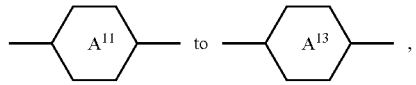, independently of one another, denote

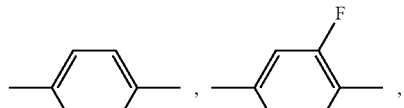

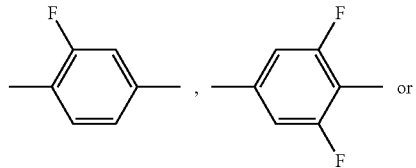

more preferably

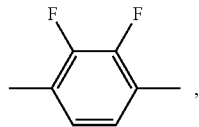

denotes

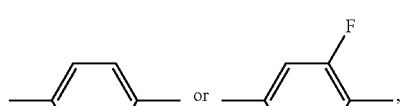,

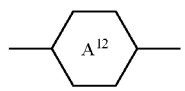

denotes

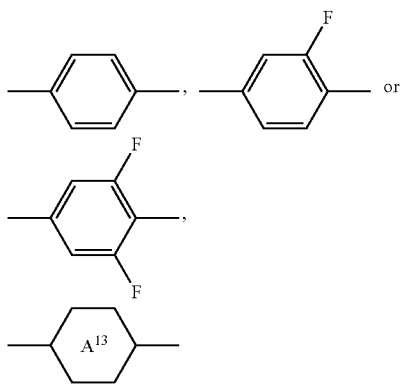

denotes

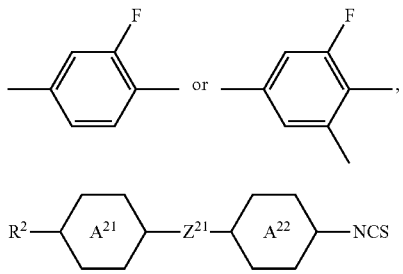

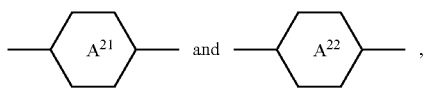   II in which
R² denotes H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably unfluorinated alkyl or unfluorinated alkenyl, Z²¹ denotes trans-CH=CH—, trans-CF=CF— or —C≡C—, preferably —C≡C— or trans-CH=CH—, and

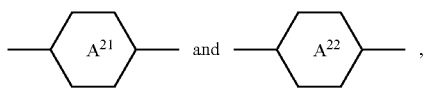

independently of one another, denote

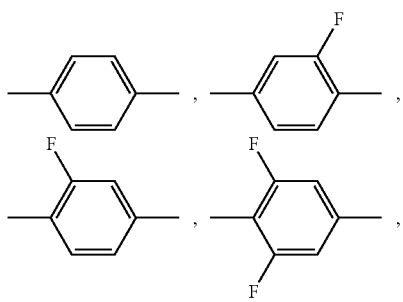

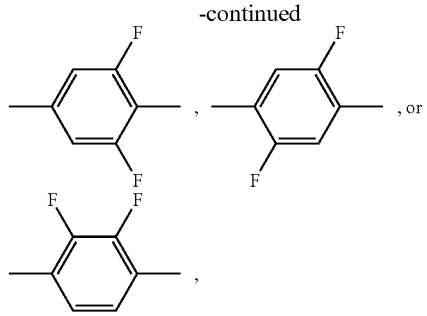

preferably

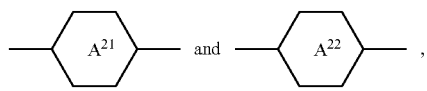

independently of one another, denote

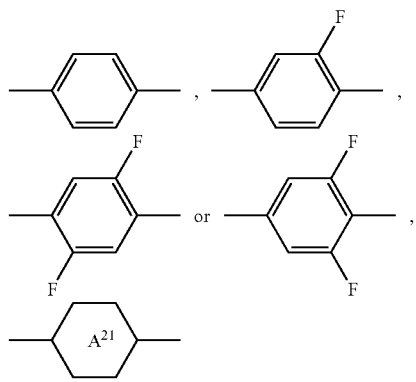

preferably denotes

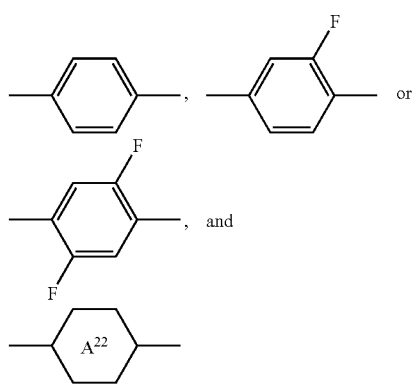

preferably denotes

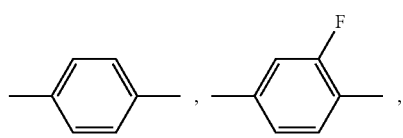

-continued

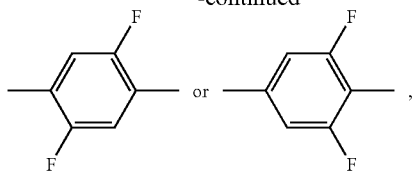

more preferably

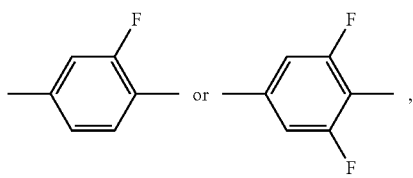

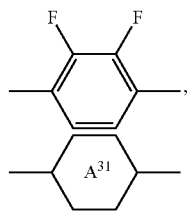
III in which
R³ denotes H, unfluorinated alkyl or unfluorinated alkoxy having 1 to 17, preferably having 3 to 10, C atoms or unfluorinated alkenyl, unfluorinated alkenyloxy or unfluorinated alkoxyalkyl having 2 to 15, preferably 3 to 10, C atoms, preferably unfluorinated alkyl or unfluorinated alkenyl, one of $Z^{31}$ and $Z^{32}$, preferably $Z^{32}$, denotes trans-CH=CH—, trans-CF=CF— or —C≡C— and the other one, independently thereof, denotes trans-CH=CH—, trans-CF=CF— or a single bond, preferably one of them, preferably $Z^{32}$, denotes —C≡C— or trans-CH=CH— and the other denotes a single bond, and

independently of one another, denote

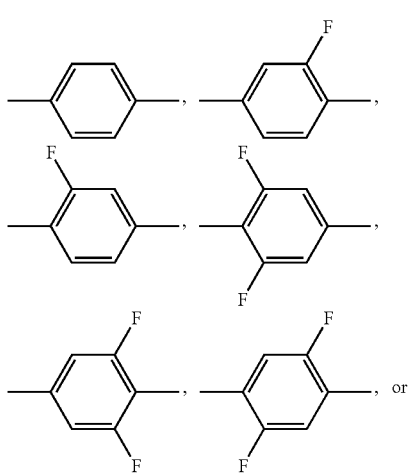

-continued

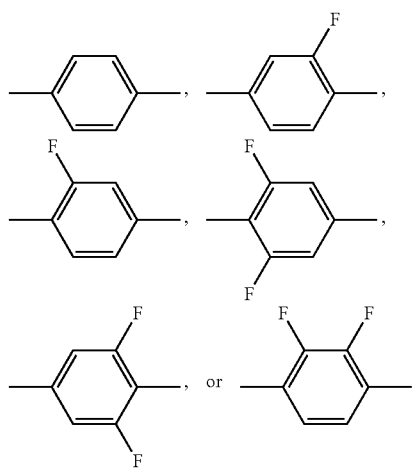

alternatively independently denotes

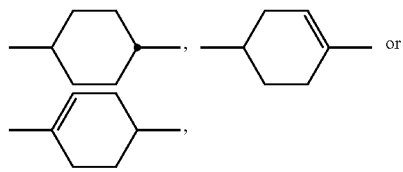

preferably

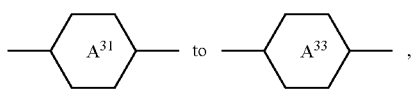

independently of one another, denote

more preferably

denotes

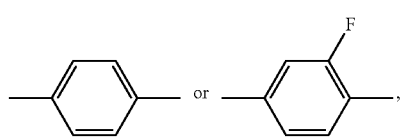

-continued

denotes

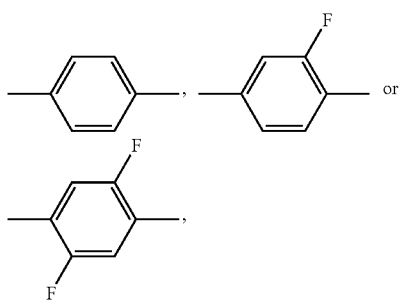

and more preferably

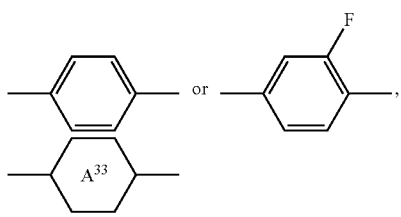

denotes

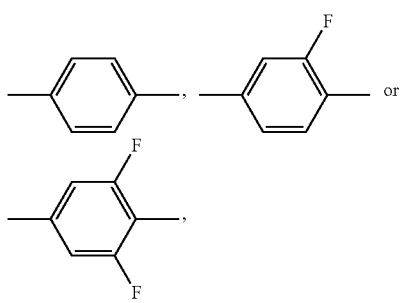

more preferably

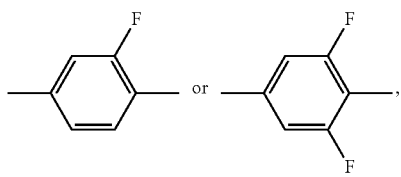

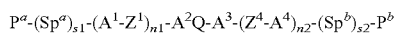

and
optionally one or more compounds of formula P $$P^a\text{-}(Sp^a)_{s1}\text{-}(A^1\text{-}Z^1)_{n1}\text{-}A^2Q\text{-}A^3\text{-}(Z^4\text{-}A^4)_{n2}\text{-}(Sp^b)_{s2}\text{-}P^b \qquad P$$

wherein the individual radicals have the following meanings:

$P^a$, $P^b$ each, independently of one another, are a polymerizable group, $Sp^a$, $Sp^b$ each, independently of one another, denote a spacer group, s1, s2 each, independently of one another, denote 0 or 1, n1, n2 each, independently of one another, denote 0 or 1, preferably 0, Q denotes a single bond, —CF$_2$O—, —OCF$_2$—, —CH$_2$O—, —OCH$_2$—, —(CO)O—, —O(CO)—, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —O—, —CH$_2$—, —(CH$_2$)$_3$—, —CF$_2$—, preferably —CF$_2$O—, $Z^1$, $Z^4$ denote a single bond, —CF$_2$O—, —OCF$_2$—, —CH$_2$O—, —OCH$_2$—, —(CO)O—, —O(CO)—, —(CH$_2$)$_4$—, —CH$_2$CH$_2$—, —CF$_2$—CF$_2$—, —CF$_2$—CH$_2$—, —CH$_2$—CF$_2$—, —CH=CH—, —CF=CF—, —CF=CH—, —(CH$_2$)$_3$O—, —O(CH$_2$)$_3$—, —CH=CF—, —C≡C—, —O—, —CH$_2$—, —(CH$_2$)$_3$—, —CF$_2$—, where $Z^1$ and Q or $Z^4$ and Q do not simultaneously denote a group selected from —CF$_2$O— and —OCF$_2$—, $A^1$, $A^2$, $A^3$, $A^4$ each, independently of one another, denotes a diradical group selected from the following groups:

a) the group consisting of trans-1,4-cyclohexylene, 1,4-cyclohexenylene and 1,4'-bicyclohexylene, in which, in addition, one or more non-adjacent CH$_2$ groups may each be replaced by —O— or —S— and in which, in addition, one or more H atoms may each be replaced by F, b) the group consisting of 1,4-phenylene and 1,3-phenylene, in which, in addition, one or two CH groups may each be replaced by N and in which, in addition, one or more H atoms may each be replaced by L, c) the group consisting of tetrahydropyran-2,5-diyl, 1,3-dioxane-2,5-diyl, tetrahydrofuran-2,5-diyl, cyclobutane-1,3-diyl, piperidine-1,4-diyl, thiophene-2,5-diyl and selenophene-2,5-diyl, each of which may also be mono- or polysubstituted by L, d) the group consisting of saturated, partially unsaturated or fully unsaturated, and optionally substituted, polycyclic radicals having 5 to 20 cyclic C atoms, one or more of which may, in addition, be replaced by heteroatoms, preferably selected from the group consisting of bicyclo[1.1.1]pentane-1,3-diyl, bicyclo[2.2.2]octane-1,4-diyl, spiro[3.3]heptane-2,6-diyl,

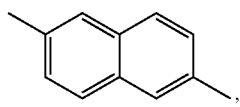

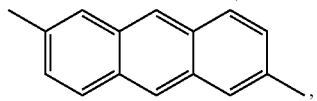

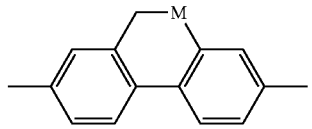

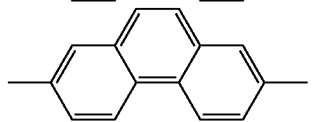

-continued

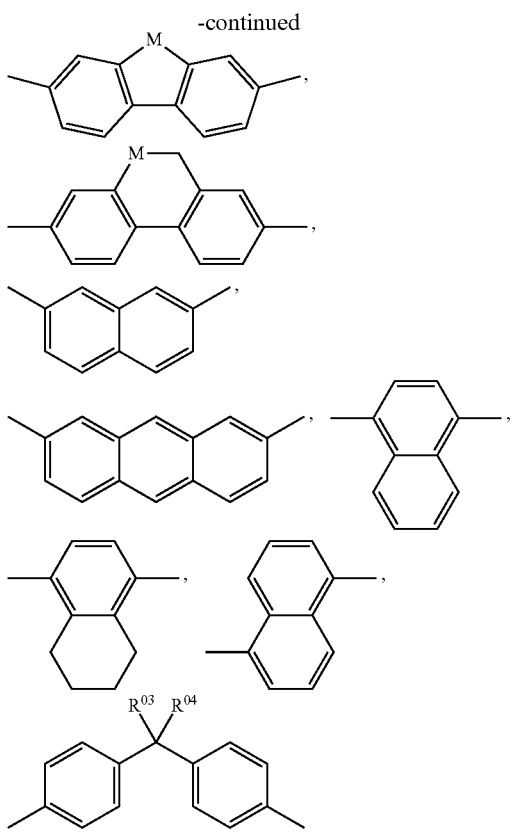

where, in addition, one or more H atoms in these radicals may each be replaced by L, and/or one or more double bonds may each be replaced by single bonds, and/or one or more CH groups may each be replaced by N, and $A^3$, alternatively may be a single bond, L on each occurrence, identically or differently, denotes F, Cl, CN, SCN, $SF_5$ or straight-chain or branched, in each case optionally fluorinated, alkyl, alkoxy, alkylcarbonyl, alkoxycarbonyl, alkylcarbonyloxy or alkoxycarbonyloxy having up to 12 C atoms, $R^{03}$, $R^{04}$ each, independently of one another, denote H, F or straight-chain or branched alkyl having 1 to 12 C atoms, in which, in addition, one or more H atoms may be replaced by F, M denotes —O—, —S—, —$CH_2$—, —$CHY^1$— or —$CY^1Y^2$—, and $Y^1$ and $Y^2$ each, independently of one another, have one of the meanings indicated above for $R^{03}$, or denote Cl or CN, and one of the groups $Y^1$ and $Y^2$ alternatively denotes —$OCF_3$, preferably H, F, Cl, CN or $CF_3$, as well as to a polymer stabilized system obtainable by polymerization of one or more compounds of formula P alone or in combination with one or more further polymerizable compounds from a respective mixture, and to the use of such a stabilized system in components or devices for high frequency technology.

Polymerizable compounds of formula P preferably used according to the present invention are selected from the group consisting of the following formulae:

P1-1

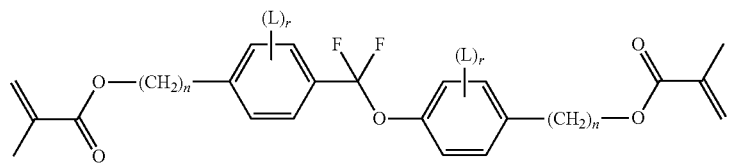

P1-2

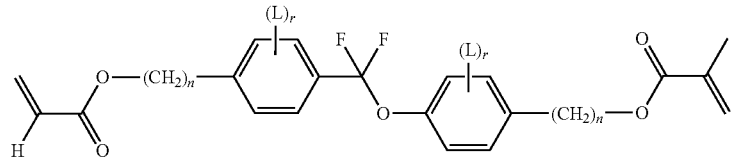

P1-3

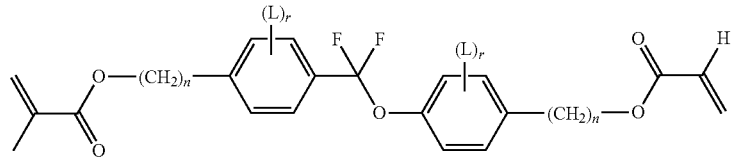

P1-4

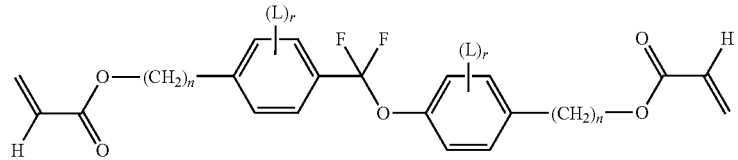

-continued
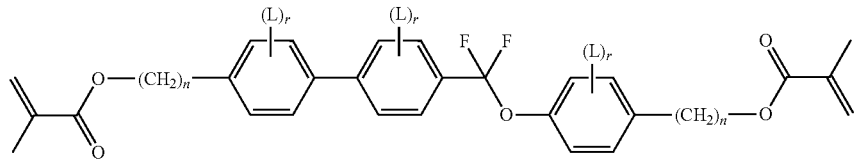
P2-1
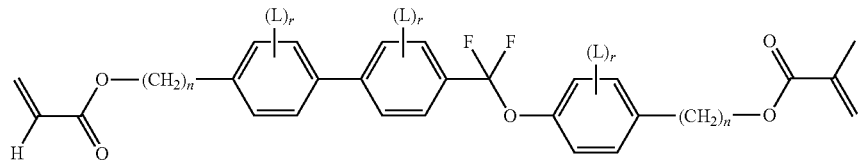
P2-2
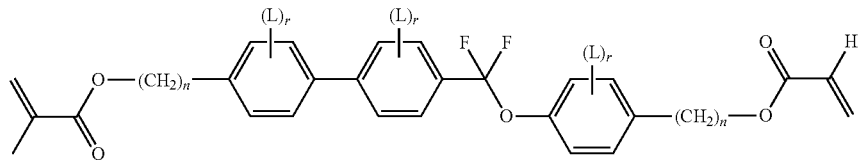
P2-3
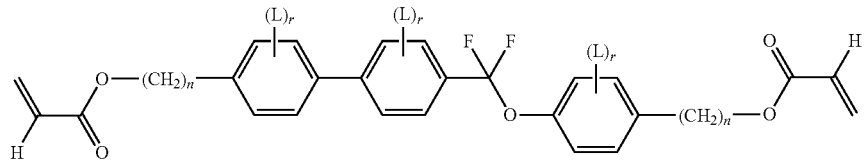
P2-4
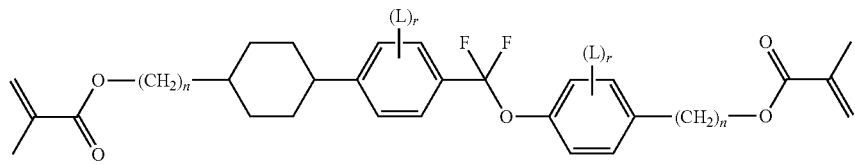
P3-1
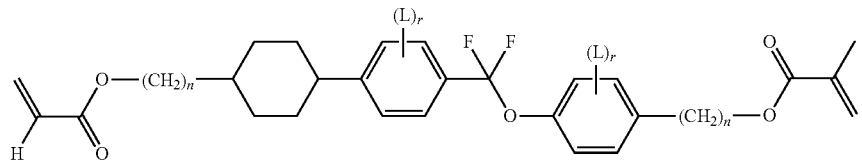
P3-2
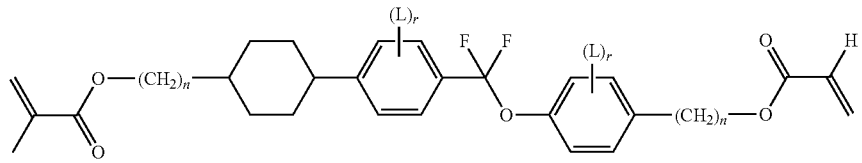
P3-3
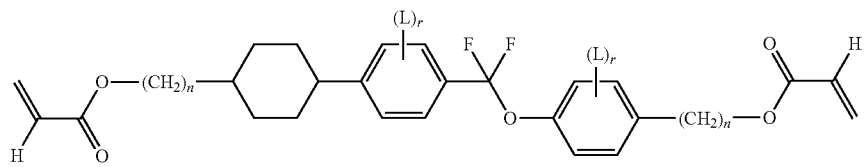
P3-4
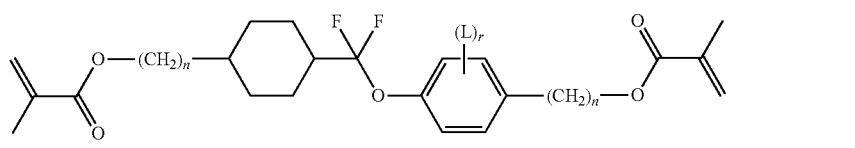
P4-1

-continued
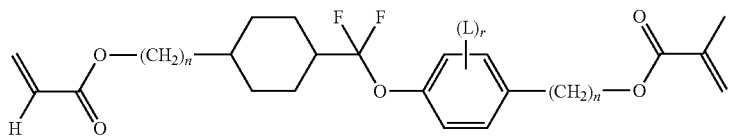
P4-2
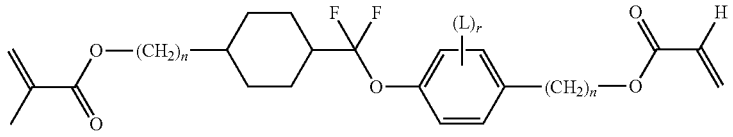
P4-3
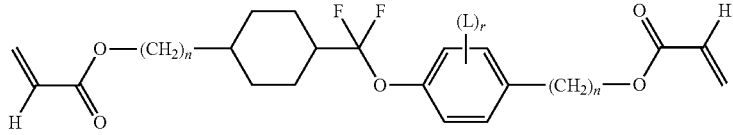
P4-4
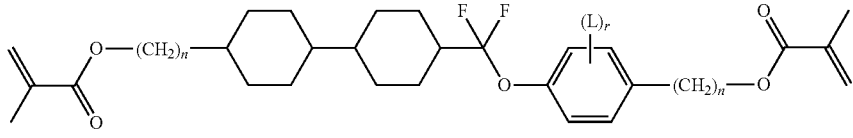
P5-1
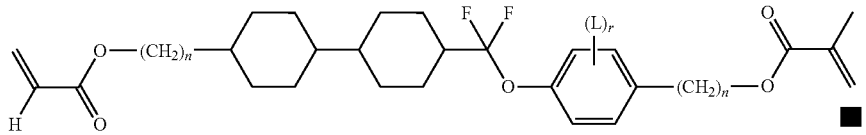
P5-2
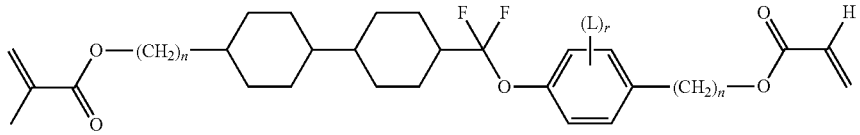
P5-3
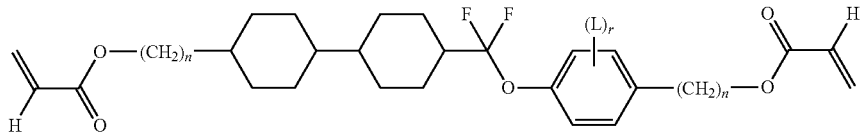
P5-4
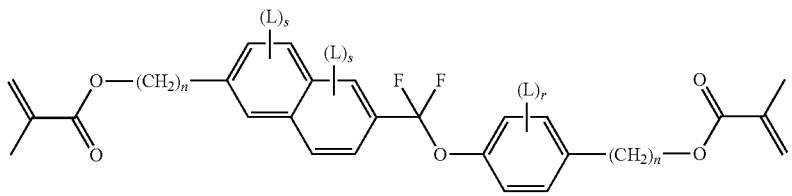
P6-1
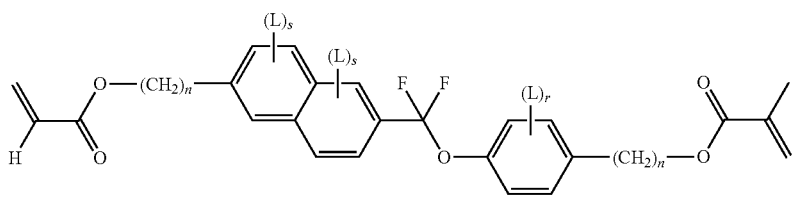
P6-2
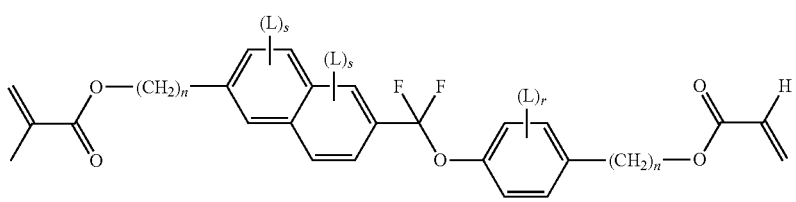
P6-3

-continued
P6-4
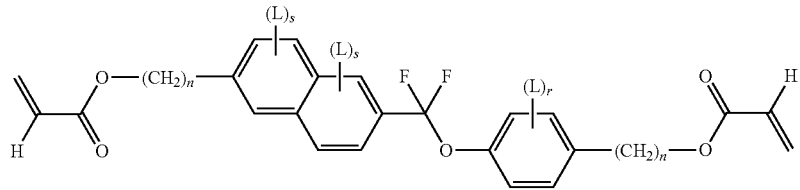
P7-1
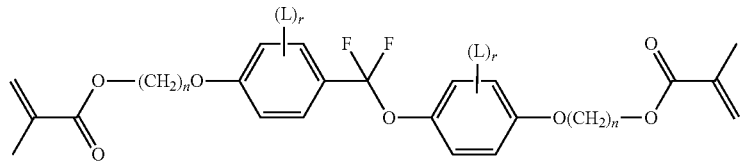
P7-2
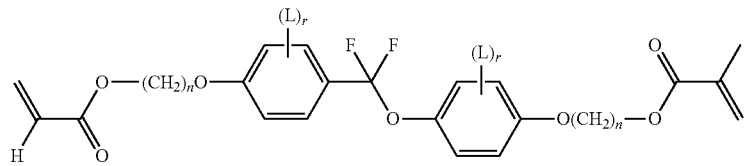
P7-3
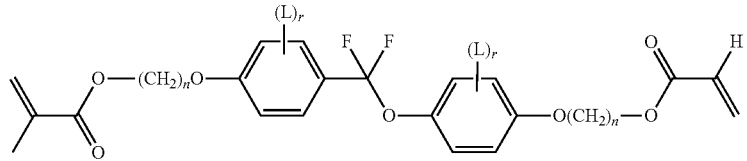
P7-4
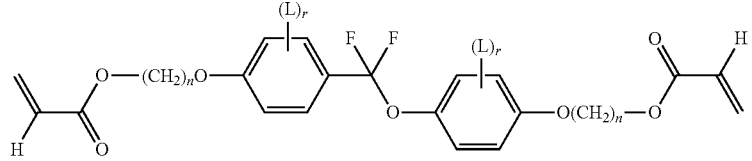
P8-1
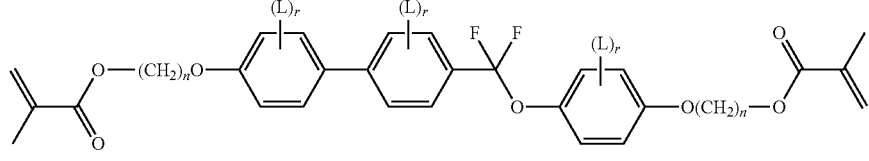
P8-2
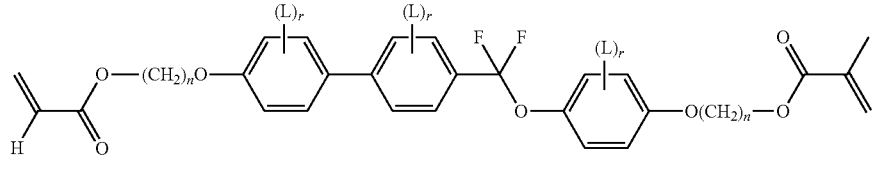
P8-3
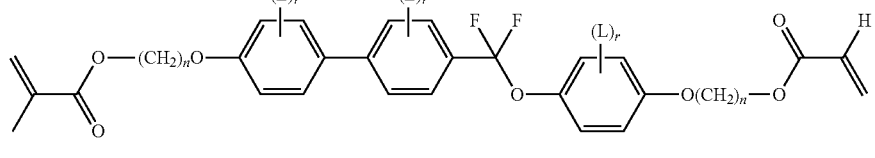
P8-4
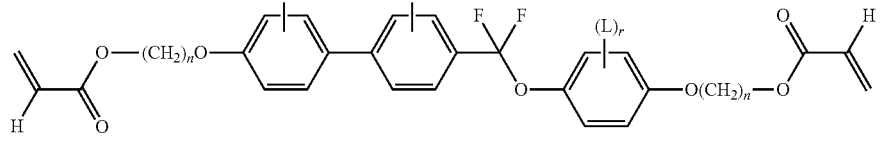

-continued
P9-1
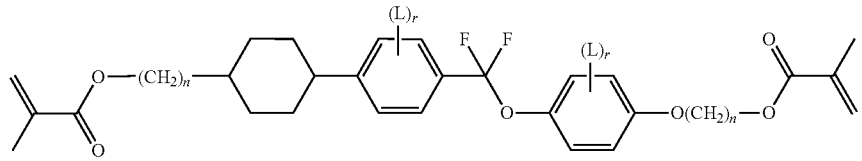
P9-2
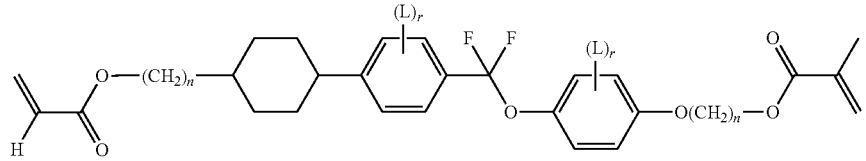
P9-3
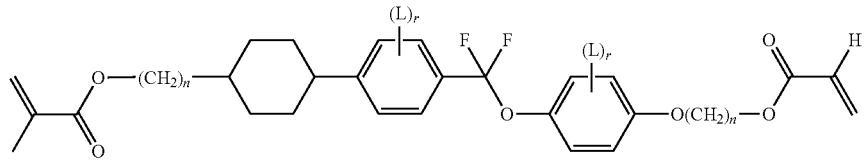
P9-4
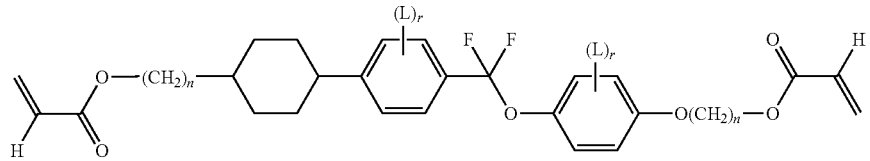
P10-1
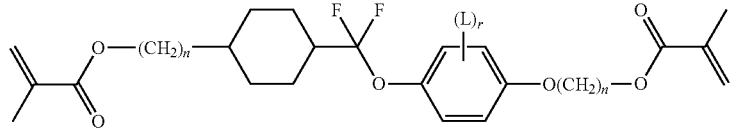
P10-2
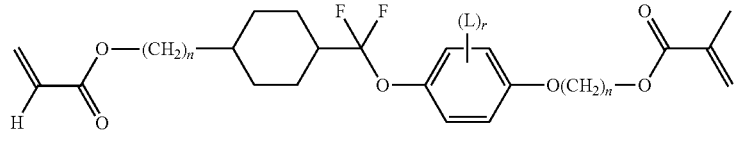
P10-3
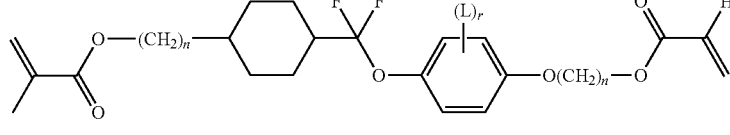
P10-4
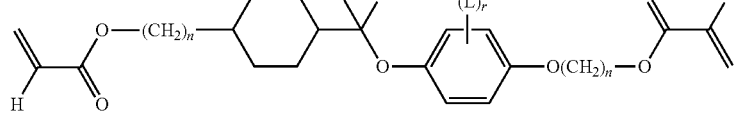
P11-1
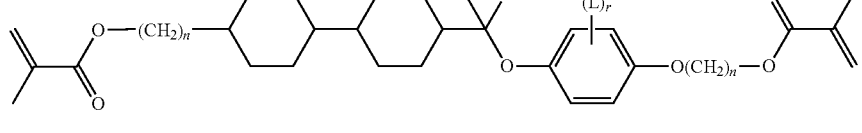
P11-2
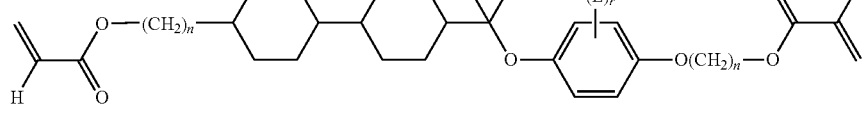

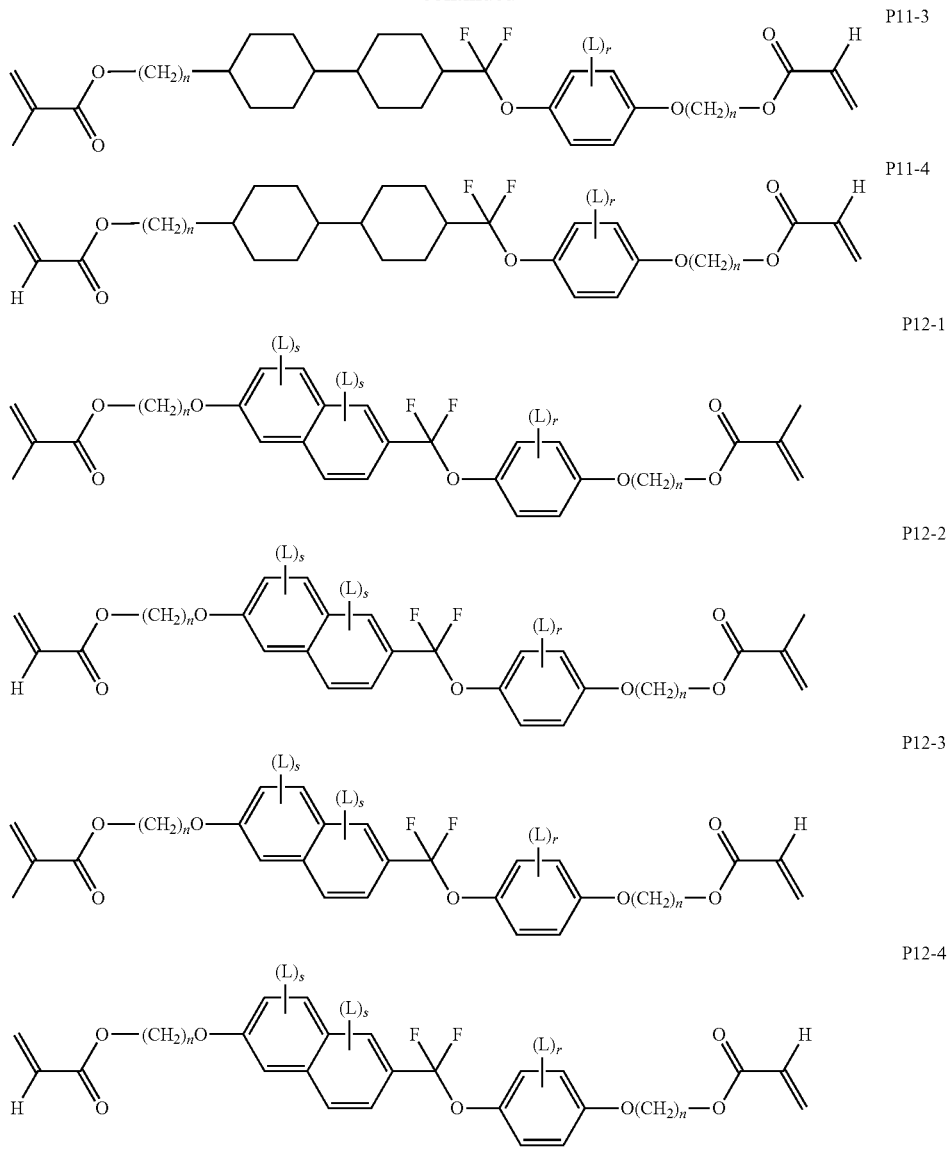

in which L in each occurrence, identically or differently, has one of the meanings indicated above and below, r denotes 0, 1, 2, 3 or 4, s denotes 0, 1, 2 or 3, and n denotes an integer between 1 and 24, preferably between 1 and 12, very particularly preferably between 2 and 8, and in which, if a radical is not indicated at the end of a single or double bond, it is a terminal $CH_3$ or $CH_2$ group.

In the formulae P1-1 to P12-4,

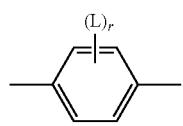

preferably denotes a group selected from the group consisting of the following formulae:

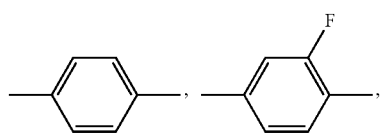

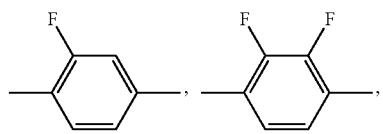

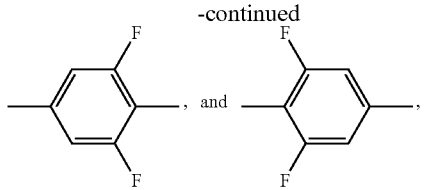

particularly preferably selected from

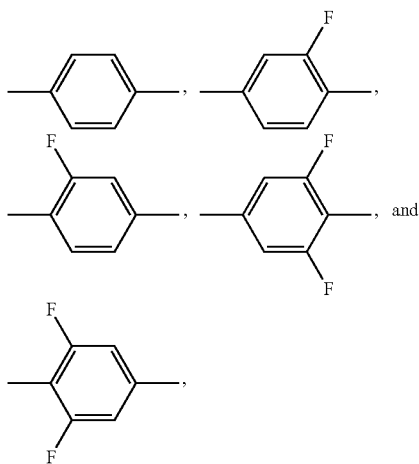

The group $A^2$-Q-$A^3$ preferably denotes a group of the formula

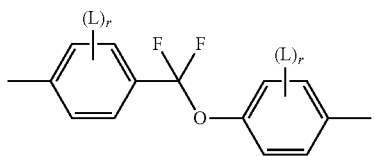

in which at least one of the rings is substituted by at least one group L=F. r here is in each case, independently, preferably 0, 1 or 2.

$P^a$ and $P^b$ in the compounds of formula P and the sub-formulae thereof preferably denote acrylate or methacrylate, furthermore fluoroacrylate.

$Sp^a$ and $Sp^b$ in the compounds of formula P and the sub-formulae thereof preferably denote a radical selected from the group consisting of —(CH$_2$)$_{p1}$—, —(CH$_2$)$_{p1}$—O—, —(CH$_2$)$_{p1}$—O—CO— and —(CH$_2$)$_{p1}$—O—CO—O— and mirror images thereof, in which p1 denotes an integer from 1 to 12, preferably from 1 to 6, particularly preferably 1, 2 or 3, where these groups are linked to $P^a$ or $P^b$ in such a way that O atoms are not directly adjacent.

Of the compounds of formula P, particular preference is given to those in which the radicals $P^a$ and $P^b$ are selected from the group consisting of vinyloxy, acrylate, methacrylate, fluoroacrylate, chloroacrylate, oxetane and epoxide groups, particularly preferably acrylate or methacrylate groups, the radicals $Sp^a$ and $Sp^b$ are selected from the group consisting of —(CH$_2$)$_{p1}$—, —(CH$_2$)$_{p1}$—O—, —(CH$_2$)$_{p1}$—O—CO— and —(CH$_2$)$_{p1}$—O—CO—O— and mirror images thereof, in which p1 denotes an integer from 1 to 12, preferably from 1 to 6, particularly preferably 1, 2 or 3, and where these radicals are linked to $P^a$ or $P^b$ in such a way that O atoms are not directly adjacent.

Compounds of formula P preferably used according to a preferred embodiment of the instant invention are those comprising exactly two rings (n1=n2=0), which are preferably 6-membered rings. Especially preferred are compounds selected from the group of compounds of the following formulae:

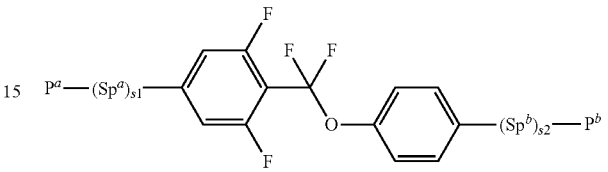
Pa

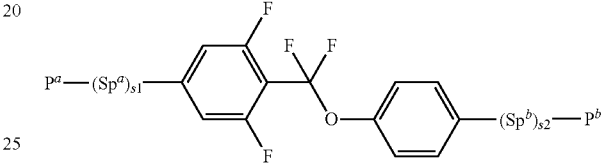
Pb

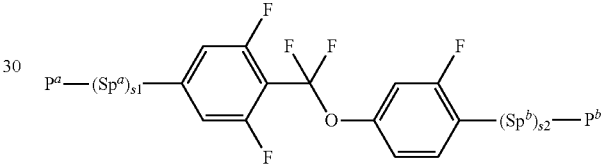
Pc

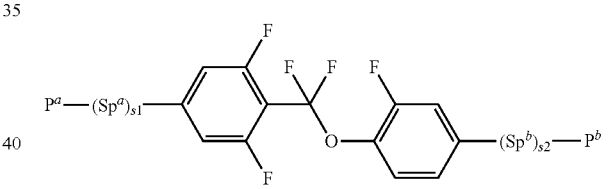
Pd

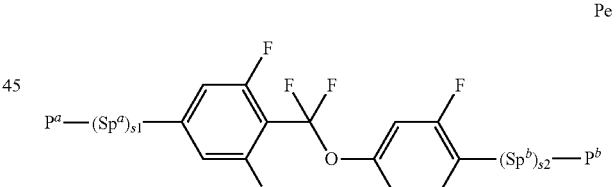
Pe

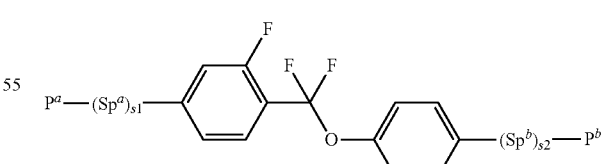
Pf

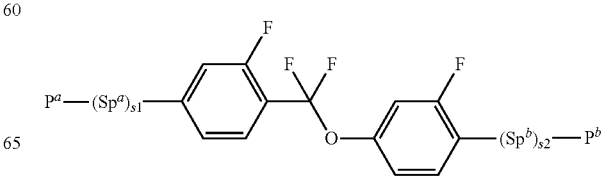
Pg

Ph
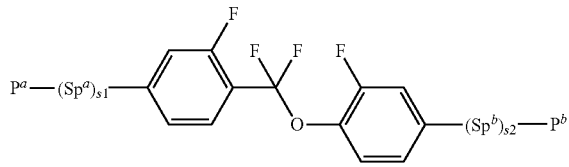

Pi
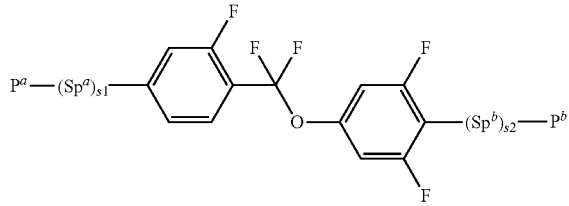

Pk
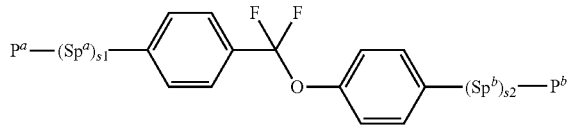

Pl
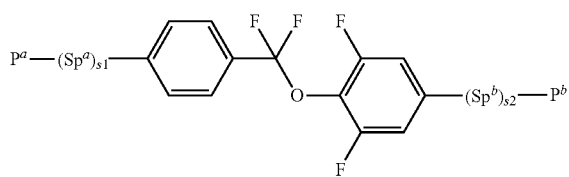

Pm
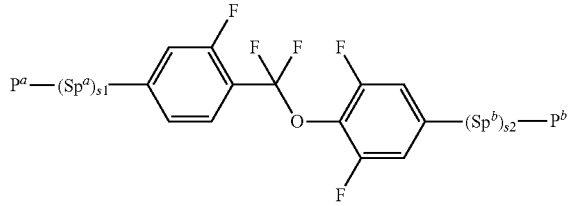

Pn
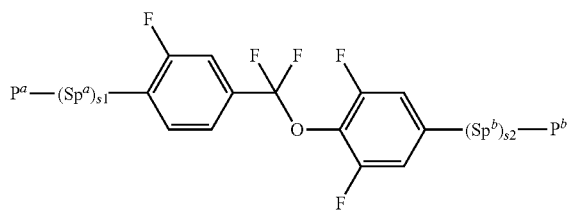

Po
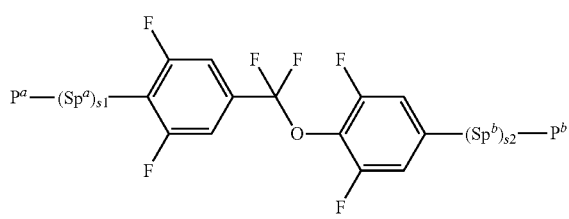

Pp

Pq
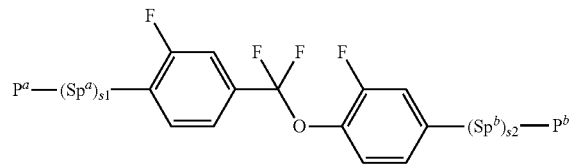

Pr
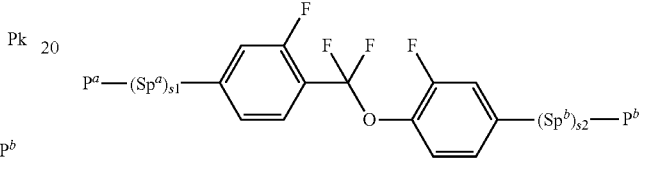

Ps
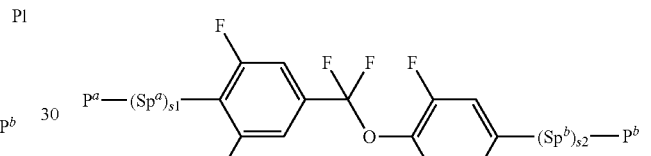

wherein $P^a$, $P^b$, $Sp^a$, $Sp^b$, s1 and s2 are as defined under formula P above, and preferably $Sp^{a/b}$ is alkylene —$(CH_2)_n$— wherein n preferably is 3, 4, 5, 6 or 7 and $P^{a/b}$ preferably a methacrylate or acrylate moiety. Especially preferred is the use of compounds selected from the group of formulae Pa, Pb, Pc, Pd, Pe, Pf, Pg, Ph and Pi and, in particular the compounds of formula Pa.

Suitable and preferred co-monomers for use in polymer precursors for polymer stabilized devices according to the present invention are selected, for example, from the following formulae:

M1
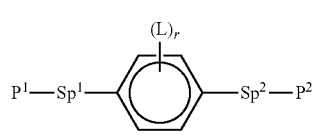

M2
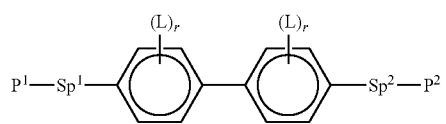

M3
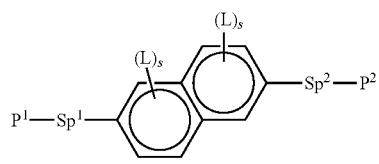

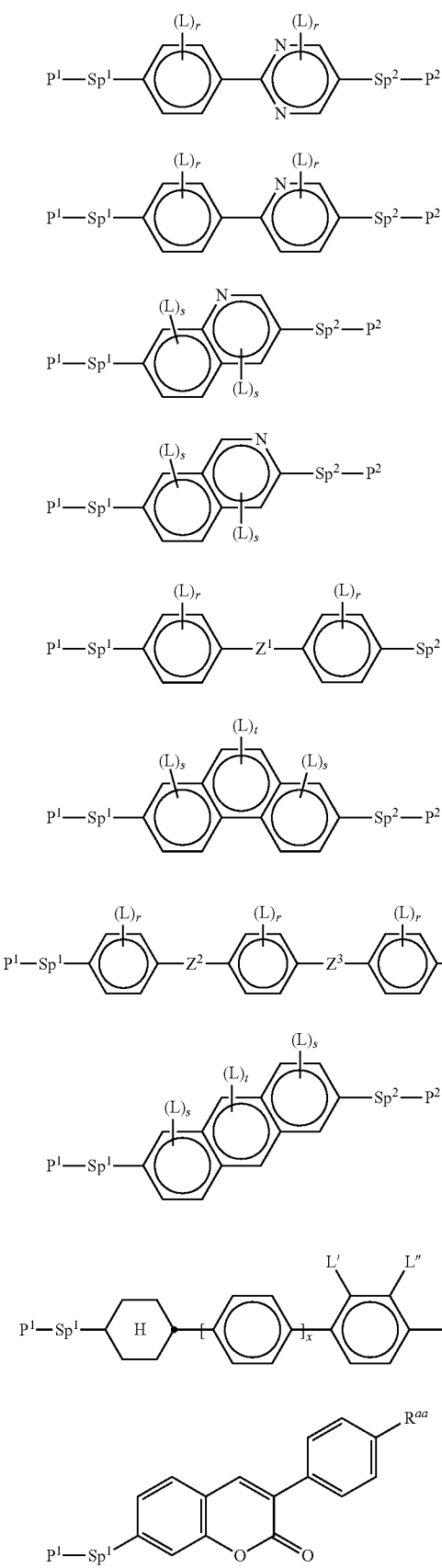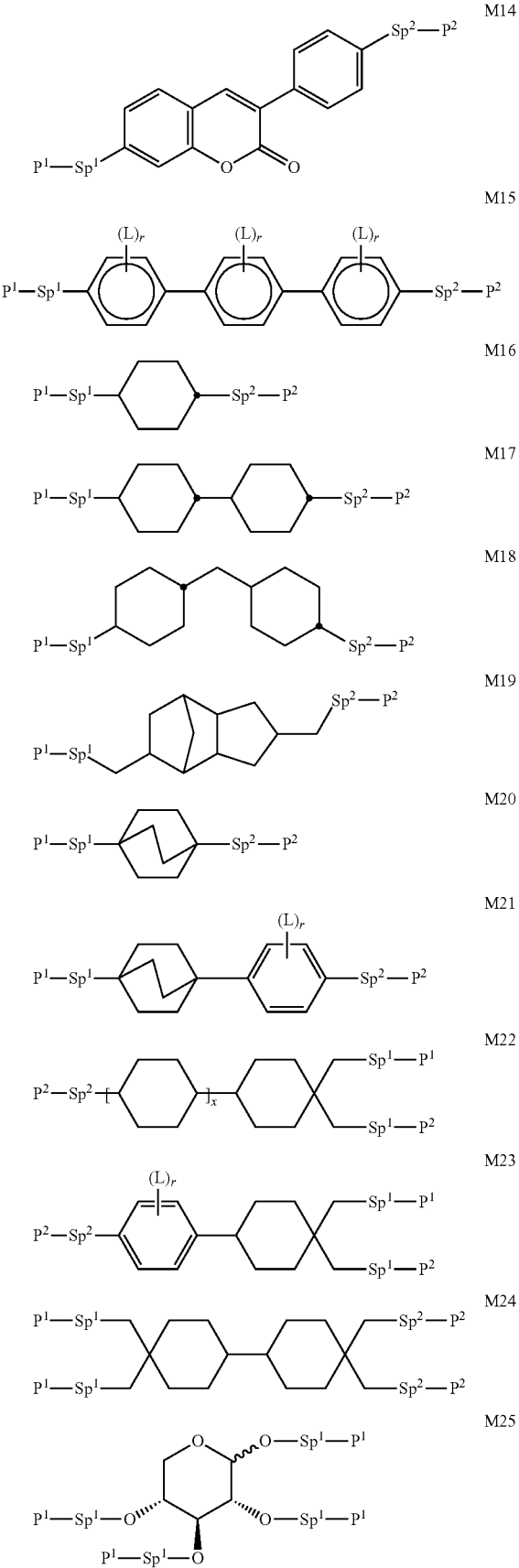

-continued

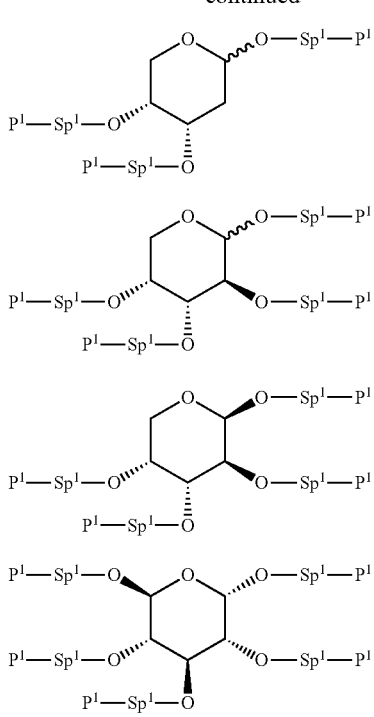

wherein the parameters have the following meanings:

$P^1$ and $P^2$ are each, independently of one another, a polymerizable group, preferably having one of the meanings given above or below for $P^a$, particularly preferred an acrylate, methacrylate, fluoroacrylate, oxetane, vinyloxy or epoxy group, $Sp^1$ and $Sp^2$ are each, independently of one another, a single bond or a spacer group, preferably having one of the meanings given above or below for $Sp^a$, particularly preferred an —$(CH_2)_{p1}$—, —$(CH_2)_{p1}$—O—, —$(CH_2)_{p1}$—CO—O—, —$(CH_2)_{p1}$—O—CO— or —$(CH_2)_{p1}$—O—CO—O—, wherein p1 is an integer from 1 to 12, and wherein the groups mentioned last are linked to the adjacent ring via the O-atom, and, wherein alternatively also one or more of $P^1$-$Sp^1$- and $P^2$-$Sp^2$- may be $R^{aa}$, provided that at least one of $P^1$-$Sp^1$- and $P^2$-$Sp^2$- present in the compound is not $R^{aa}$, $R^{aa}$ is H, F, Cl, CN or linear or branched alkyl having 1 to 25 C-atoms, wherein one or more non-adjacent —$CH_2$— groups, independently of each another, may each be replaced by —C($R^o$)=C($R^{oo}$)—, —C≡C—, —N($R^o$)—, —O—, —S—, —CO—, —CO—O—, —O—CO—, or —O—CO—O— in such a way that neither O- nor S-atoms are directly linked to one another, and wherein also one or more H-atoms may each be replaced by F, Cl, CN or $P^1$-$Sp^1$-, particularly preferred linear or branched, optionally single- or poly-fluorinated, alkyl, alkoxy, alkenyl, alkinyl, alkylcarbonyl, alkoxycarbonyl, or alkylcarbonyloxy having up to 12 C-atoms, wherein the alkenyl- and alkinyl groups have at least two and the branched groups have at least three C-atoms, $R^o$, $R^{oo}$ are each, at each occurrence independently of one another, H or alkyl having 1 to 12 C-atoms, $Z^1$ is —O—, —CO—, —C($R^yR^z$)—, or —$CF_2CF_2$—, $Z^2$ and $Z^3$ are each, independently of one another, —CO—O—, —O—CO—, —$CH_2O$—, —$OCH_2$—, —$CF_2O$—, —$OCF_2$—, or —$(CH_2)_n$—, wherein n is 2, 3 or 4, $R^y$ and $R^z$ are each, independently of one another, H, F, $CH_3$ or $CF_3$, L is at each occurrence independently of one another, F, Cl, CN, SCN, $SF_5$ or linear or branched, optionally mono- or poly-fluorinated, alkyl, alkoxy, alkenyl, alkinyl, alkylcarbonyl, alkoxycarbonyl, alkylcarbonyloxy or alkoxycarbonyloxy having up to 12 C-atoms, preferably F, L' and L" are each, independently of one another, H, F or Cl, r is 0, 1, 2, 3 or 4, s is 0, 1, 2 or 3, t is 0, 1 or 2, and x is 0 or 1.

Suitable and preferred co-monomers for use in devices according to the present application are for example selected from the group of mono-reactive compounds, which are present in the precursor of the polymer stabilized systems in a concentration in the range from 1 to 9 wt.-%, particularly preferred from 4 to 7 wt.-%. Preferred mono-reactive compounds are the compounds of formulae M1 to M29, wherein one or more of $P^1$-$Sp^1$- and $P^2$-$Sp^2$- are $R^{aa}$, such that the compounds have a single reactive group only.

Particularly preferred mono-reactive compounds are the compounds of the following formulae

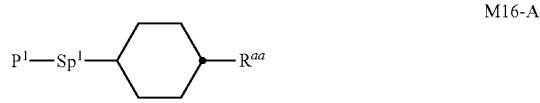

M16-A

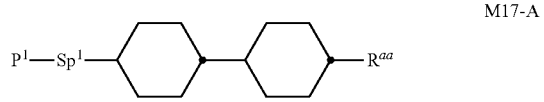

M17-A wherein $P^1$, $Sp^1$ and $R^{aa}$ have the respective meanings given above and $P^1$ preferably is acrylate ($CH_2$=CH—CO—O—) or methacrylate ($CH_2$=C($CH_3$)—CO—O—).

Amongst these the compounds of formula

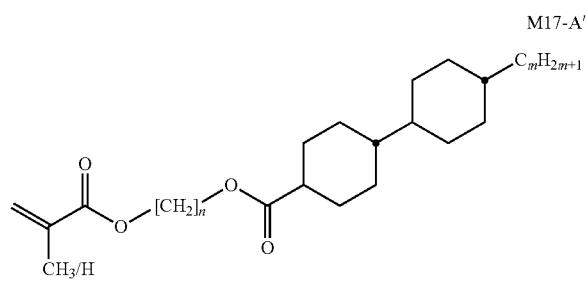

M17-A' wherein n is an integer, preferably an even integer, in the range from 1 to 16, preferably from 2 to 8, m is an integer in the range from 1 to 15, preferably from 2 to 7, are especially preferred.

Particular preference is given to an LC medium, an LC device, preferably for the high frequency technology, in particular for a phase shifter or a microwave antenna, e.g., a leaky antenna, a process or the use as described above and below, in which the LC medium or the polymerizable or polymerized component present therein comprises one or more compounds of the following formula:

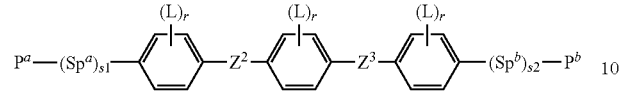

M10-A in which $P^a$, $P^b$, $Sp^a$, $Sp^b$, s1, s2 and L have the meanings indicated above and below, r denotes 0, 1, 2, 3 or 4, and $Z^2$ and $Z^3$ each, independently of one another, denote —$CF_2$—O— or —O—$CF_2$—, preferably $Z^2$ is —$CF_2$—O— and $Z^3$ is —O—$CF_2$— or vice versa or $Z^2$ is —CO—O— and $Z^3$ is —O—CO— or vice versa, and, most preferably, $Z^2$ is —$CF_2$—O— and $Z^3$ is —O—$CF_2$— or $Z^2$ is —CO—O— and $Z^3$ is —O—CO—.

Preferably the liquid-crystalline media used according to the present invention comprise as a polymer precursor or part of a polymer precursor one, two or more reactive mesogens, preferably one or more mono-reactive mesogens and, at the same time, one or more direactive mesogens. Optionally one or more of the reactive mesogens may be replaced by a non-mesogenic, respectively an isotropic, reactive compound, preferably selected from HDMA, HDDMA, EHA, EA, EMA, as defined below, and the like.

In a preferred embodiment of the instant application the liquid-crystalline media used according to the present invention comprise a polymer obtained or obtainable by polymerization, preferably photopolymerization of a polymer precursor comprising one, two or more reactive mesogens, preferably one or more mono-reactive mesogens and, at the same time, one or more direactive mesogens. Optionally one or more of the reactive mesogens may be replaced by a non-mesogenic, respectively an isotropic, reactive compound, preferably selected from 2-ethylhexyl acrylate (EHA), 1,3,3-trimethylhexyl acrylate (TMHA), hexanediol diacrylate (HDDA), hexanediol dimethacrylate (HDDMA), and the like, but also from metylmethacrylate (MMA), ethylacrylate (EA), ethylmethacrylate (EMA) and 6-(4'-cyanobiphenyl-4-yloxy)hexyl acrylate (6CBA), a mesogenic monomer:

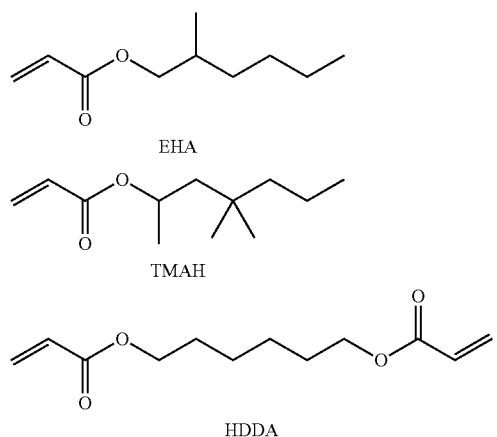

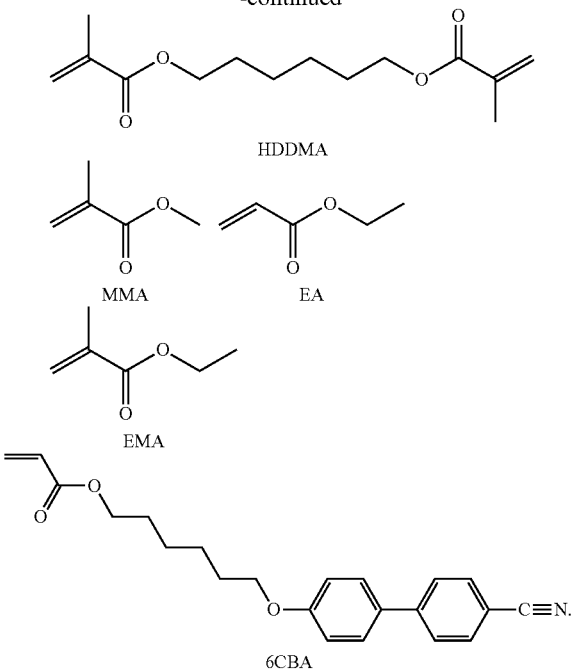

Preferably one or more, most preferably all, mono-reactive mesogens are methacrylates and, also preferably one or more, most preferably all, mono-reactive mesogens are selected from the group of the bisacrylates and the mixed acrylates-methacrylates, preferably they are bisacrylates.

Preferably the liquid-crystalline media according to the present invention comprise
one or more compounds of formula I and
one or more compounds of formula II
or
one or more compounds of formula I and
one or more compounds of formula III
or
one or more compounds of formula II and
one or more compounds of formula III
or, most preferably,
one or more compounds of formula I and
one or more compounds of formula II and
one or more compounds of formula III.

In a preferred embodiment of the present invention, the liquid-crystalline media comprise one or more compounds of formula I and one or more compounds of formula III.

In a further preferred embodiment of the present invention, the liquid-crystalline media comprise one or more compounds of formula I and one or more compounds of formula II.

The liquid-crystalline media in accordance with the present invention like-wise preferably comprise one or more compounds of formula II and one or more compounds of formula III.

Particular preference is given in accordance with the present invention to liquid-crystalline media which comprise one or more compounds of formula I, one or more compounds of formula II and one or more compounds of formula III.

Additionally the liquid-crystalline media used according to the present invention in a certain embodiment preferably comprise one or more compounds of formula IV,

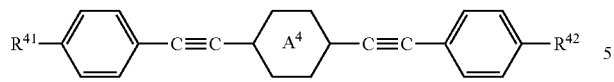

in which

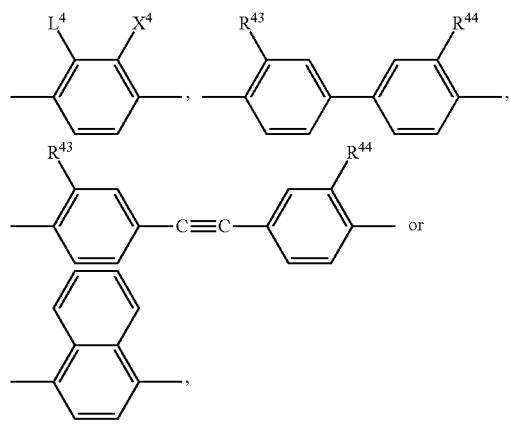

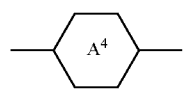

denotes preferably

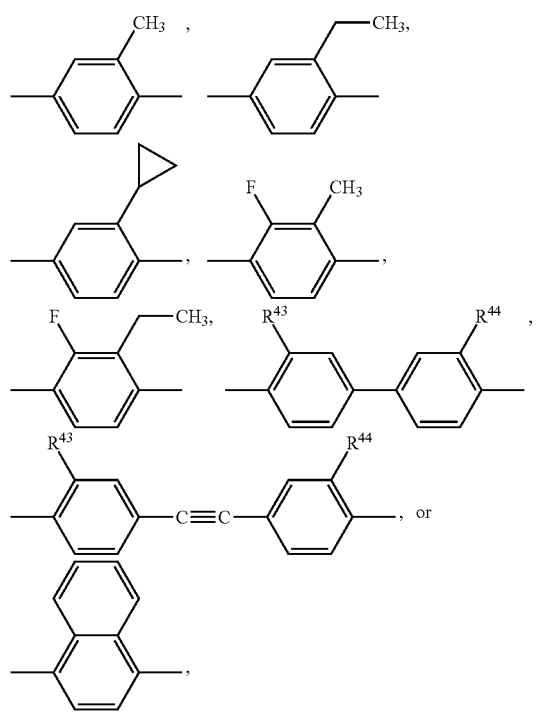

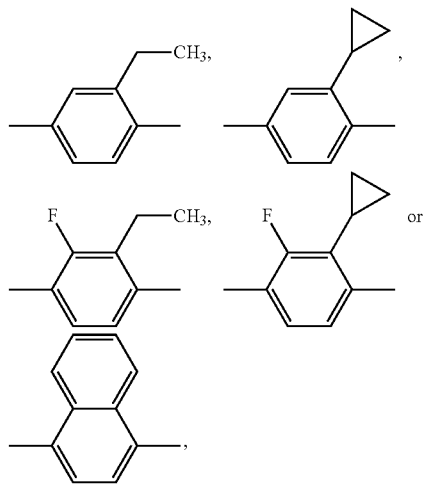

$L^4$ denotes alkyl having 1 to 6 C atoms, cycloalkyl having 3 to 6 C atoms or cycloalkenyl having 4 to 6 C atoms, preferably $CH_3$, $C_2H_5$, n-$C_3H_7$ (—$(CH_2)_2CH_3$), i-$C_3H_7$ (—$CH(CH_3)_2$), cyclopropyl, cyclobutyl, cyclohexyl, cyclopent-1-enyl or cyclohex-1-enyl, and particularly preferably $CH_3$, $C_2H_5$, cyclopropyl or cyclobutyl, $X^4$ denotes H, alkyl having 1 to 3 C atoms or halogen, preferably H, F or Cl, and particularly preferably H or F and very particularly preferably F, $R^{41}$ to $R^{44}$, independently of one another, denote unfluorinated alkyl or unfluorinated alkoxy, each having 1 to 15 C atoms, unfluorinated alkenyl, unfluorinated alkenyloxy or unfluorinated alkoxyalkyl, each having 2 to 15 C atoms, or cycloalkyl, alkylcycloalkyl, cycloalkenyl, alkylcycloalkenyl, alkylcycloalkylalkyl or alkyl-cyclo-alkenylalkyl, each having up to 15 C atoms, and alternatively one of $R^{43}$ and $R^{44}$ or both also denote H, preferably $R^{41}$ and $R^{42}$, independently of one another, denote unfluorinated alkyl or unfluorinated alkoxy, each having 1 to 7 C atoms, or unfluorinated alkenyl, unfluorinated alkenyloxy or unfluorinated alkoxyalkyl, each having 2 to 7 C atoms, particularly preferably $R^{41}$ denotes unfluorinated alkyl having 1 to 7 C atoms or unfluorinated alkenyl, unfluorinated alkenyloxy or unfluorinated alkoxyalkyl, each having 2 to 7 C atoms, and particularly preferably $R^{42}$ denotes unfluorinated alkyl or unfluorinated alkoxy, each having 1 to 7 C atoms, and preferably $R^{43}$ and $R^{44}$ denote H, unfluorinated alkyl having 1 to 5 C atoms, un-fluorinated cycloalkyl or cycloalkenyl having 3 to 7 C atoms, unfluorinated alkylcyclohexyl or unfluorinated cyclohexylalkyl, each having 4 to 12 C atoms, or unfluorinated alkylcyclohexylalkyl having 5 to 15 C atoms, particularly preferably cyclopropyl, cyclobutyl or cyclohexyl, and very particularly preferably at least one of $R^{43}$ and $R^{44}$ denotes n-alkyl, particularly preferably methyl, ethyl or n-propyl, and the other denotes H or n-alkyl, particularly preferably H, methyl, ethyl or n-propyl.

The liquid-crystalline media in accordance with the present application preferably comprise in total 5% to 70%, preferably 5% to 60% and particularly preferably 30% to 50%, of compounds of formula I. The liquid-crystalline media in accordance with the present application preferably comprise in total 20% to 80%, preferably 30% to 70% and particularly preferably 35% to 65%, of compounds of formula II.

The liquid-crystalline media in accordance with the present application preferably comprise in total 5% to 45%, preferably 10% to 40% and particularly preferably 15% to 35%, of compounds of formula III.

In a preferred embodiment of the present invention, in which the liquid-crystalline media comprise in each case one or more compounds of formulae I, II and III, the concentration of the compounds of formula I is preferably 45% to 100%, preferably 50% to 100% and particularly preferably 55% to 100%, The concentration of the compounds of formula II is preferably 1% to 20%, preferably 2% to 15% and particularly preferably 3% to 10%, and the concentration of the compounds of formula III is preferably 1% to 30%, preferably 5% to 25% and particularly preferably 5% to 20%.

In a further preferred embodiment of the present invention, in which the liquid-crystalline media comprise in each case one or more compounds of the formulae I, II and III, the concentration of the compounds of formula I is preferably 15% to 40%, preferably 20% to 35% and particularly preferably 25% to 30%, the concentration of the compounds of formula II is preferably 10% to 35%, preferably 15% to 30% and particularly preferably 20% to 25% and the concentration of the compounds of formula III is preferably 25% to 50%, preferably 30% to 45% and particularly preferably 35% to 40%.

In a preferred embodiment of the present invention, in which the liquid-crystalline media comprise in each case one or more compounds of the formulae I and II, but at most 5% and preferably no compounds of formula III, the concentration of the compounds of formula I is preferably 10% to 50%, preferably 20% to 40% and particularly preferably 25% to 35% the concentration of the compounds of formula II is preferably 40% to 70% preferably 50% to 65% and particularly preferably 55% to 60%, and the concentration of the compounds of formula III is preferably 1% to 4%, preferably 1% to 3% and particularly preferably 0%.

The liquid-crystalline media in accordance with the present application particularly preferably comprise in total 50% to 80%, preferably 55% to 75% and particularly preferably 57% to 70% of compounds of formula I-1 (defined below) and/or in total 5% to 70% preferably 6% to 50% and particularly preferably 8% to 20% of compounds selected from the group of the compounds of the formulae 1-2 and 1-3 (defined below), most preferably compounds both of formula 1-2 and of formula 1-3.

The liquid-crystalline media in accordance with the present application likewise preferably comprise in total 5% to 60% preferably 10% to 50% and particularly preferably 7% to 20% of compounds of formula II.

In the case of the use of a single homologous compound, these limits correspond to the concentration of this homologue, which is preferably 2% to 20% particularly preferably 1% to 15%. In the case of the use of two or more homologues, the concentration of the individual homologues is likewise preferably in each case 1% to 15%

The compounds of the formulae I to III in each case include dielectrically positive compounds having a dielectric anisotropy of greater than 3, dielectrically neutral compounds having a dielectric anisotropy of less than 3 and greater than −1.5 and dielectrically negative compounds having a dielectric anisotropy of −1.5 or less.

In a preferred embodiment of the present invention, the liquid-crystal medium comprises one or more compounds of formula I, preferably selected from the group of the compounds of the formulae I-1 and I-2, preferably of the formulae I-1 and/or 1-2, preferably simultaneously one or more compounds of formula 1-1 and one or more compounds of formula I-2, and optionally, preferably obligatorily, one or more compounds of formula I-3, more preferably these compounds of formula I predominantly consist, even more preferably essentially consist and very particularly preferably completely consist thereof:

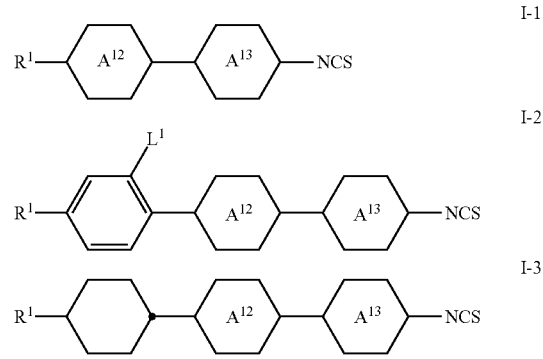

in which
L$^1$ is H or F, preferably H
and the other parameters have the respective meanings indicated above for formula I and preferably
R$^1$ denotes unfluorinated alkyl having 1 to 7 C atoms or un-fluorinated alkenyl having 2 to 7 C atoms.

The media preferably comprise one or more compounds of formula I-1, which are preferably selected from the group of the compounds of the formulae I-1a to I-1c, preferably of formula I-1c, more preferably these compounds of formula I-1 predominantly consist, even more preferably essentially consist and very particularly preferably completely consist thereof:

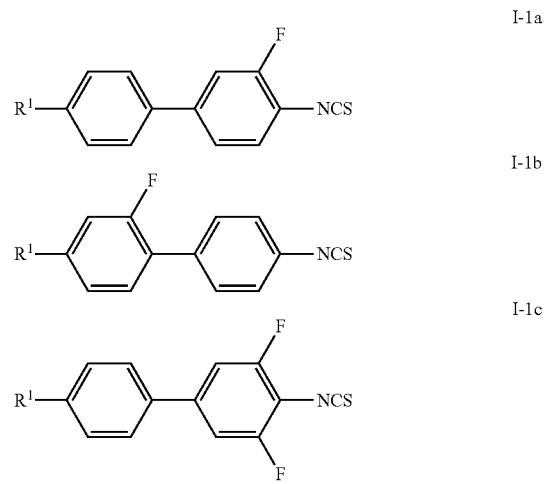

in which the parameters have the respective meanings indicated above for formula I-1 and in which preferably
R$^1$ denotes unfluorinated alkyl or unfluorinated alkenyl.

The media preferably comprise one or more compounds of formula I-2, which are preferably selected from the group of the compounds of the formulae I-2a to I-2d, preferably of formula I-2d, more preferably these compounds of formula I-2 predominantly consist, even more preferably essentially consist and very particularly preferably completely consist thereof:

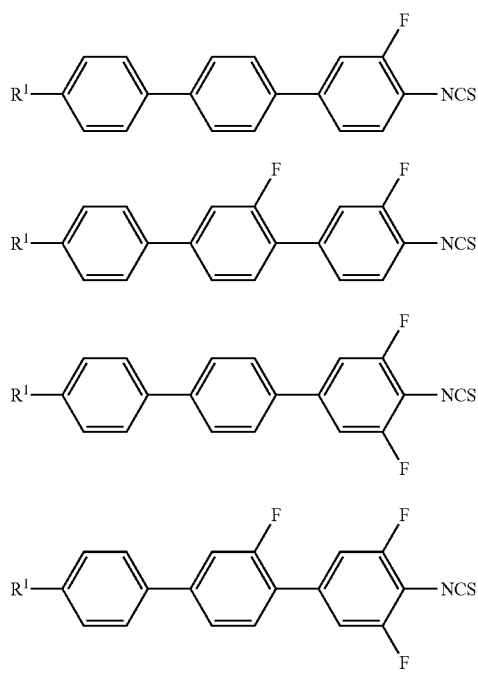

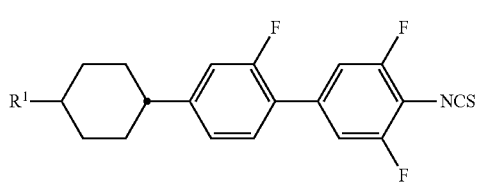

in which the parameters have the respective meanings indicated above for formula 1-2 and in which preferably R¹ denotes unfluorinatd alkyl or unfluorinated alkenyl.

The media preferably comprise one or more compounds of formula I-3, which are preferably selected from the group of the compounds of the formulae I-3a to I-3d, preferably of formula I-3c, more preferably these compounds of formula I-3 predominantly consist, even more preferably essentially consist and very particularly preferably completely consist thereof:

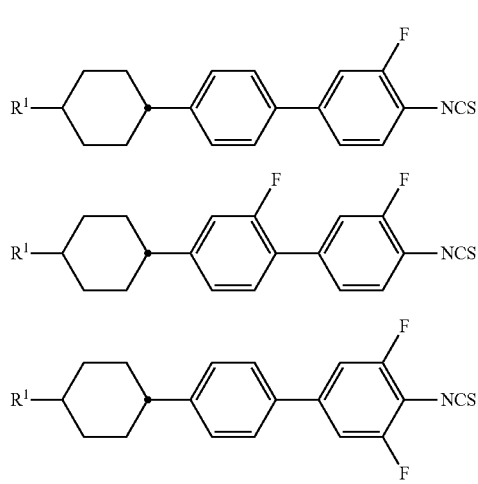

in which the parameters have the respective meanings indicated above for formula I-3 and in which preferably R¹ denotes unfluorinated alkyl or unfluorinated alkenyl.

The media preferably comprise one or more compounds of formula II, which are preferably selected from the group of the compounds of the formulae II-1 to II-3, preferably selected from the group of the compounds of the formulae II-1 and II-2, more preferably these compounds of formula II predominantly consist, even more preferably essentially consist and very particularly preferably completely consist thereof:

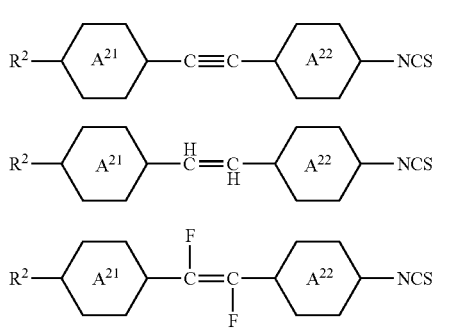

in which the parameters have the meanings given under formula II above and preferably R² denotes H, unfluorinated alkyl or alkoxy having 1 to 7 C atoms or unfluorinated alkenyl having 2 to 7 C atoms, and one of

and

denotes

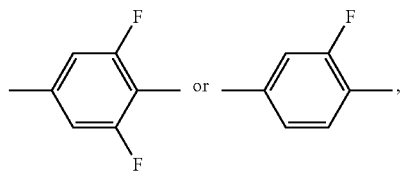

and the other, independently denotes

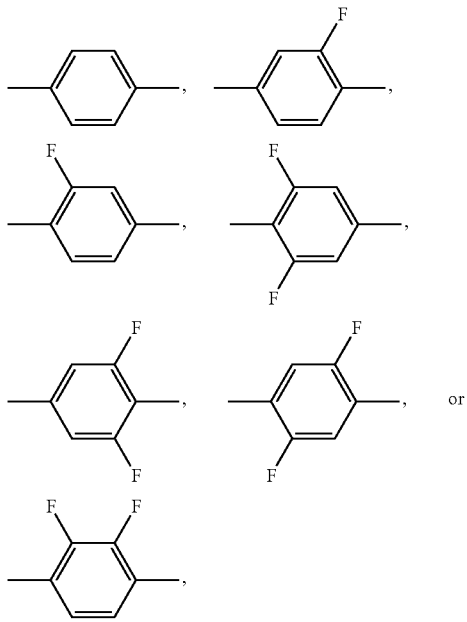

preferably

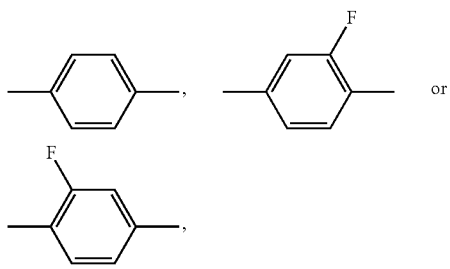

most preferably

and preferably

R² denotes $C_nH_{2n+1}$ or $CH_2$=CH—$(CH_2)_z$, and n denotes an integer in the range from 0 to 15, preferably in the range from 1 to 7 and particularly preferably 1 to 5, and z denotes 0, 1, 2, 3 or 4, preferably 0 or 2.

The media preferably comprise one or more compounds of formula II-1, which are preferably selected from the group of the compounds of the formulae II-1a to II-1e, preferably selected from the group of the compounds of the formulae II-1a and II-1b, more preferably of formula II-1b, more preferably these compounds of formula II-1 predominantly consist, even more preferably essentially consist and very particularly preferably completely consist thereof:

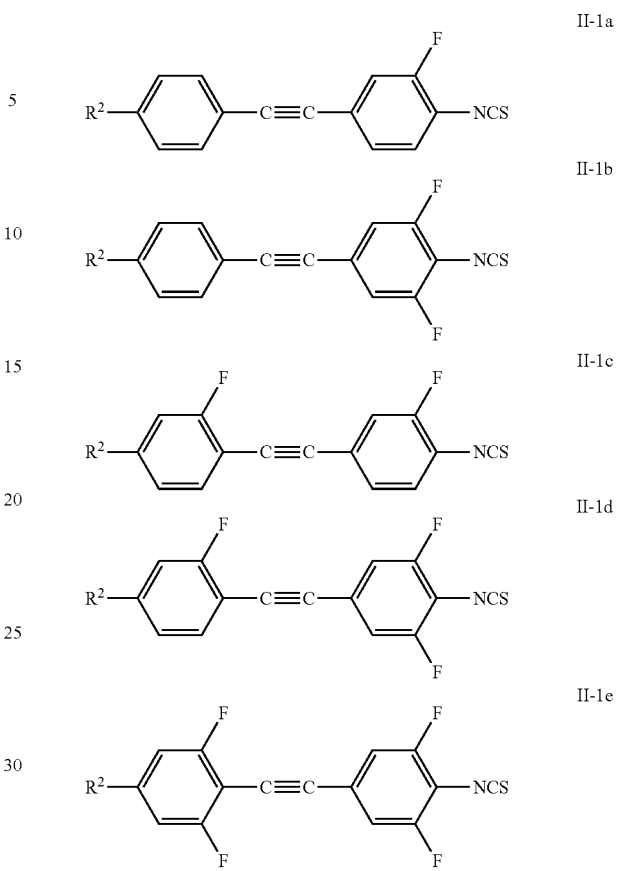

in which
R² has the meaning indicated above and preferably denotes $C_nH_{2n+1}$ or $CH_2$=CH—$(CH_2)_z$, and n denotes an integer in the range from 0 to 15, preferably in the range from 1 to 7 and particularly preferably 1 to 5, and z denotes 0, 1, 2, 3 or 4, preferably 0 or 2.

The media preferably comprise one or more compounds of formula II-2, which are preferably selected from the group of the compounds of the formulae II-2a and II-2b, more preferably simultaneously one or more compounds of formula II-2a and one or more compounds of formula II-2b, more preferably these compounds of formula II-2 predominantly consist, even more preferably essentially consist and very particularly preferably completely consist thereof:

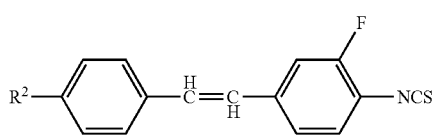

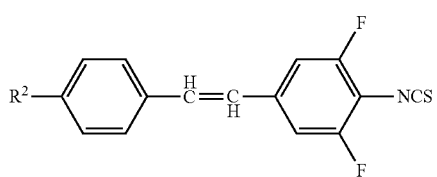

in which

R² has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The media preferably comprise one or more compounds of formula II-3, which are preferably selected from the group of the compounds of the of formulae II-3a to II-3c, preferably selected from the group of the compounds of formulae II-3a and II-3b, more preferably simultaneously one or more compounds of formula II-3a and one or more compounds of formula II-3b, more preferably these compounds of formula II-3 predominantly consist, even more preferably essentially consist and very particularly preferably completely consist thereof:

II-3a
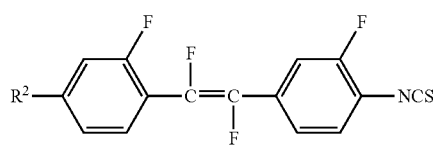

II-3b
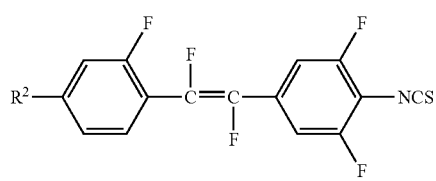

II-3c
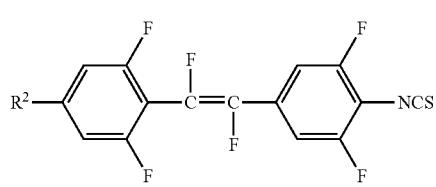

in which

R² has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The media preferably comprise one or more compounds of formula III, which are preferably selected from the group of the compounds of the formulae III-1 to III-6, more preferably these compounds of the formulae selected from the group of the compounds of the formulae III-1, III-2, III-3 and III-4, more preferably of formula III-1 and, even more preferably these compounds of formula III predominantly consist, even more preferably essentially consist and very particularly preferably completely consist thereof:

III-1
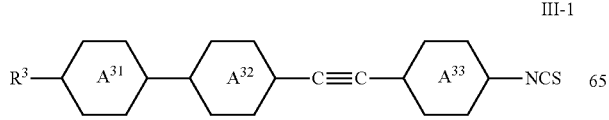

III-2
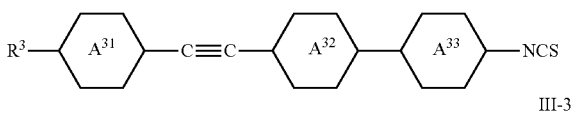

III-3
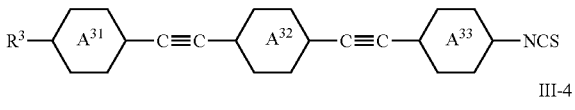

III-4
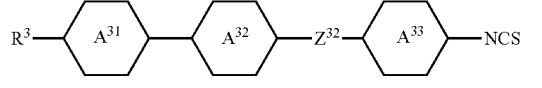

III-5
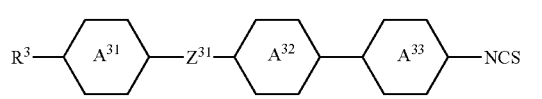

III-6
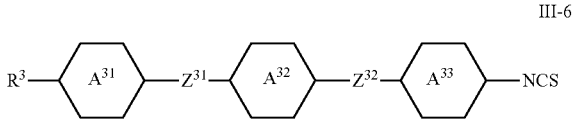

in which $Z^{31}$ and $Z^{32}$ independently of one another denote trans-CH=CH— or trans-CF=CF—, preferably trans-CH=CH—, and in formula III-6 alternatively one of $Z^{31}$ and $Z^{32}$ may denote —C≡C— and the other parameters have the meaning given above under formula III, and preferably R³ denotes H, unfluorinated alkyl or alkoxy having 1 to 7 C atoms or unfluorinated alkenyl having 2 to 7 C atoms, and one of

preferably

preferably denotes

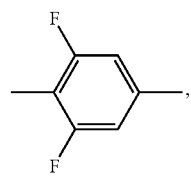 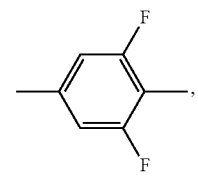

or
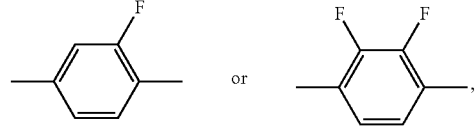

preferably

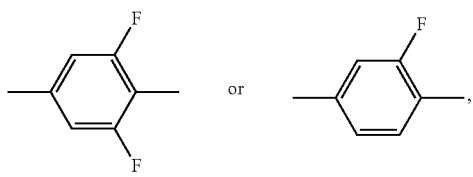

and the others, independently of one another, denote

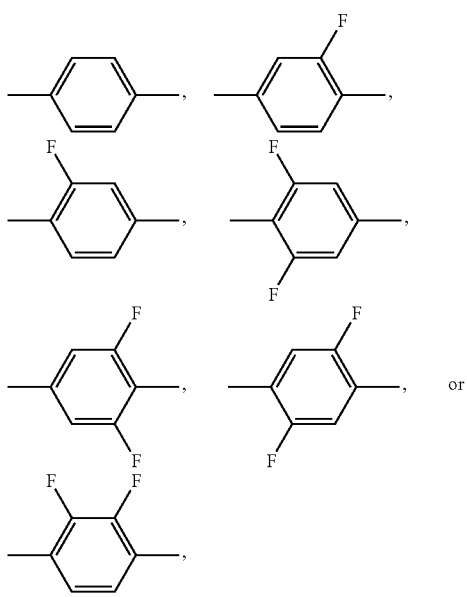

preferably

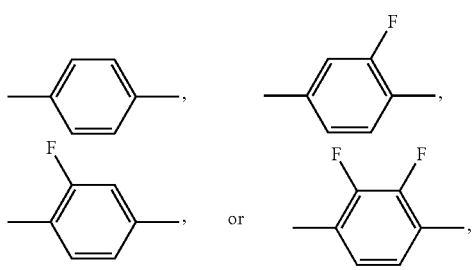

more preferably

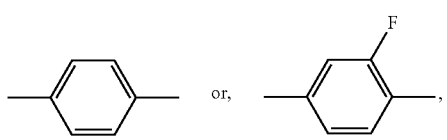

and preferably
R³ denotes $C_nH_{2n+1}$ or $CH_2\!\!=\!\!CH\!-\!(CH_2)_z$,
n denotes an integer in the range from 0 to 15, preferably in the range from 1 to 7 and particularly preferably 1 to 5, and
z denotes 0, 1, 2, 3 or 4, preferably 0 or 2.

The media preferably comprise one or more compounds of formula III-1, which are preferably selected from the group of the compounds of the formulae III-1a to III-1d, preferably selected from the group of the compounds of the formulae III-1a and III-1b, more preferably of formula III-1b, and, even more preferably, these compounds of formula III-1 predominantly consist, even more preferably essentially consist and very particularly preferably completely consist thereof:

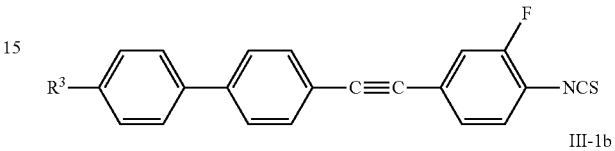

III-1a

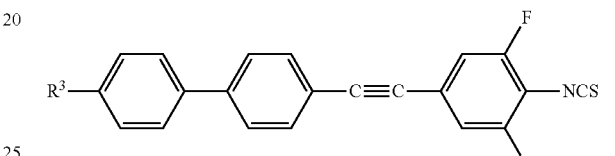

III-1b

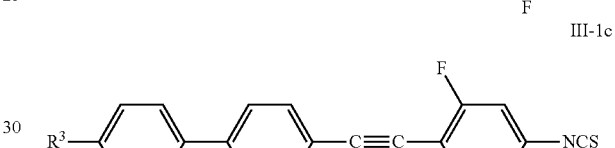

III-1c

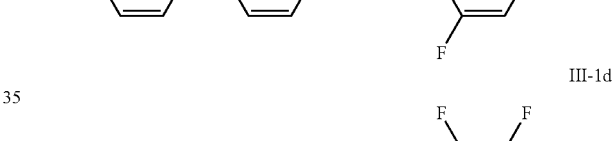

III-1d in which
R³ has the meaning indicated above and preferably denotes $C_nH_{2n+1}$ or $CH_2\!\!=\!\!CH\!-\!(CH_2)_z$,
n denotes an integer in the range from 0 to 15, preferably in the range from 1 to 7 and particularly preferably 1 to 5, and
z denotes 0, 1, 2, 3 or 4, preferably 0 or 2.

The media preferably comprise one or more compounds of formula III-2, which are preferably compounds of formula III-2a:

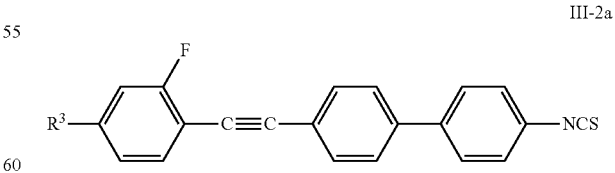

III-2a in which
R³ has the meaning indicated above and preferably denotes $C_nH_{2n+1}$ or $CH_2\!\!=\!\!CH\!-\!(CH_2)_z$,
n denotes an integer in the range from 0 to 15, preferably in the range from 1 to 7 and particularly preferably 1 to 5, and z denotes 0, 1, 2, 3 or 4, preferably 0 or 2.

The media preferably comprise one or more compounds of formula III-3 and/or one or more compounds of formula III-4.

The media preferably comprise one or more compounds of formula III-5, which are preferably compounds of formula III-5a:

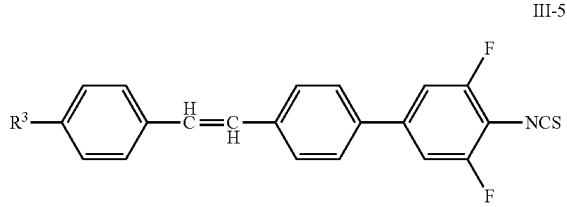

III-5a $R^3$ has the meaning indicated above for formula III-5 and preferably denotes $C_nH_{2n+1}$, in which n denotes an integer in the range from 0 to 7, preferably in the range from 1 to 5.

Further preferred compounds of formula III are the compounds of the following formulae:

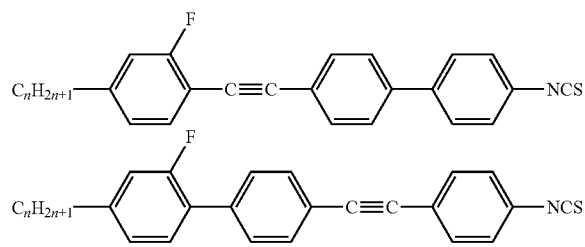

in which n denotes an integer in the range from 0 to 7, preferably in the range from 1 to 5.

Suitable and preferred polymerization methods are, for example, thermally induced polymerization or photo polymerization, preferably photopolymerization, in particular UV photopolymerization. One or more initiators can optionally also be added here. Suitable conditions for the polymerization and suitable types and amounts of initiators are known to the person skilled in the art and are described in the literature. Suitable for free-radical polymerization are, for example, and preferably, the commercially available photoinitiators Irgacure®184, Irgacure®369, Irgacure®651, Irgacure®784 (preferably), Irgacure®819 (preferably), Irgacure®907 or Irgacure®1300 (all from BASF) or Darocure®1173 (from Ciba AG). If an initiator is employed, its proportion is preferably 0.001% to 5% by weight, particularly preferably 0.001% to 1% by weight.

The polymerizable compounds according to the invention are also suitable for polymerization without an initiator, which is accompanied by considerable advantages, such as, for example, lower material costs and in particular less contamination of the LC medium by possible residual amounts of the initiator or degradation products thereof. The polymerization can thus also be carried out without the addition of an initiator. In a preferred embodiment, the LC medium thus comprises no polymerization initiator.

The polymerizable component or the LC medium may also comprise one or more stabilizers in order to prevent undesired spontaneous polymerization of the RMs, for example during storage or transport. Suitable types and amounts of stabilizers are known to the person skilled in the art and are described in the literature. Particularly suitable are, for example, the commercially available stabilizers from the Irganox® series (from Ciba AG), such as, for example, Irganox® 1076. If stabilizers are employed, their proportion, based on the total amount of the mixture of LC's including the RMs or the polymerizable component, is preferably in the range from 10 ppm to 10,000 ppm, particularly preferably in the range from 50 ppm to 2,000 ppm, most preferably 0.2% or about 0.2%.

The mixtures are characterized as described below before the polymerization. The reactive components are then polymerized by irradiation once (180 s), and the resultant media are re-characterized.

The polymerization of the media preferably is carried out by irradiation with a UV lamp (e.g. Dymax, Bluewave 200, 365 nm interference filter) having an effective power of about 3.0 mW/cm² for 180 seconds. The polymerization is carried out directly in the test cell/antenna device. To minimize UV induced host degradation a suitable long pass filter is beneficially applied, for example Schott GG395 or GG410.

The polymerization is carried out at room temperature.

The entire irradiation time which results in maximum stabilization is typically 180 s at the irradiation power indicated. Further polymerizations can be carried out in accordance with an optimized irradiation/temperature program.

The total concentration of the polymerizable compounds in the medium prior to polymerization preferably is in the range from 1% to 20%, more preferably from 2% to 15% and, most preferably from 2% to 10%.

In a preferred embodiment of the present invention, the medium comprises one or more dielectrically positive compounds of formula I-1 having a dielectric anisotropy of greater than 3.

The medium preferably comprises one or more dielectrically neutral compounds of formula I-2 having a dielectric anisotropy in the range from more than −1.5 to 3.

In a preferred embodiment of the present invention, the medium comprises one or more compounds of formula II.

In a further preferred embodiment of the present invention, the medium comprises one or more compounds of formula III.

The liquid-crystalline media, preferably or better the nematic component of the liquid crystalline media used in accordance with the present invention preferably comprise 10% or less, preferably 5% or less, particularly preferably 2% or less, very particularly preferably 1% or less, and in particular absolutely no compound having only two or fewer five- and/or six-membered rings.

The definitions of the abbreviations (acronyms) are likewise indicated below in Table D or are evident from Tables A to C.

The liquid-crystalline media in accordance with the present invention preferably comprise, more preferably predominantly consist of, even more preferably essentially consist of and very preferably completely consist of compounds selected from the group of the compounds of the formulae I to III.

In a preferred embodiment of the present invention the liquid-crystalline media predominantly consist of, more preferably essentially consist of, and, most preferably completely consist of isothiocyanate compounds, preferably selected from the group of the compounds of the formulae I to III.

In this application, "comprise" in connection with compositions means that the entity in question, i.e. the medium or the component, comprises the component or components or compound or compounds indicated, preferably in a total concentration of 10% or more and very preferably 20% or more.

In this connection, "predominantly consist of" means that the entity in question comprises 55% or more, preferably 60% or more and very preferably 70% or more of the component or components or compound or compounds indicated.

In this connection, "essentially consist of" means that the entity in question comprises 80% or more, preferably 90% or more and very preferably 95% or more of the component or components or compound or compounds indicated.

In this connection, "completely consist of" means that the entity in question comprises 98% or more, preferably 99% or more and very preferably 100.0% of the component or components or compound or compounds indicated.

Other mesogenic compounds which are not explicitly mentioned above can optionally and advantageously also be used in the media in accordance with the present invention. Such compounds are known to the person skilled in the art.

Preferably the total concentration of the compounds of formulae I to III in the medium is in the range from 80% or more to 100%, more preferably in the range from 90% or more to 100% and most preferably in the range from 95% or more to 100%.

The total concentration of the compounds of formula I-3, preferably of the formula I-3c, in the media is in the range from 10% to 45% or less, more preferably from 15% or more to 35% or less, more preferably from 20% or more to 33% or less and, most preferably from 25% or more to 30% or less.

The liquid-crystal media in accordance with the present invention preferably have a clearing point of 90° C. or more, more preferably 100° C. or more, still more preferably 120° C. or more, particularly preferably 150° C. or more and very particularly preferably 170° C. or more.

The nematic phase of the media in accordance with the invention preferably extends at least from 20° C. or less to 90° C. or more, preferably up to 100° C. or more, more preferably at least from 0° C. or less to 120° C. or more, very preferably at least from −10° C. or less to 140° C. or more and in particular at least from −20° C. or less to 150° C. or more.

The $\Delta\varepsilon$ of the liquid-crystal medium in accordance with the invention, at 1 kHz and 20° C., is preferably 1 or more, more preferably 2 or more and very preferably 3 or more.

The $\Delta$n of the liquid-crystal media in accordance with the present invention, at 589 nm ($Na^D$) and 20° C., is preferably in the range from 0.200 or more to 0.90 or less, more preferably in the range from 0.250 or more to 0.90 or less, even more preferably in the range from 0.300 or more to 0.85 or less and very particularly preferably in the range from 0.350 or more to 0.800 or less.

In a first preferred embodiment of the present application, the $\Delta$n of the liquid-crystal media in accordance with the present invention is preferably 0.50 or more, more preferably 0.55 or more.

In accordance with the present invention, the individual compounds of formula I are preferably used in a total concentration of 10% to 70%, more preferably 20% to 60%, even more preferably 30% to 50% and very preferably 25% to 45% of the mixture as a whole.

The compounds of formula II are preferably used in a total concentration of 1% to 20%, more preferably 1% to 15%, even more preferably 2% to 15% and very preferably 3% to 10% of the mixture as a whole.

The compounds of formula III are preferably used in a total concentration of 1% to 60%, more preferably 5% to 50%, even more preferably 10% to 45% and very preferably 15% to 40% of the mixture as a whole.

The liquid-crystal media preferably comprise, preferably predominantly consist of and very preferably completely consist of in total 50% to 100%, more preferably 70% to 100% and very preferably 80% to 100% and in particular 90% to 100% of the compounds of the formulae I, II and III.

In the present application, the expression dielectrically positive describes compounds or components where $\Delta\varepsilon > 3.0$, dielectrically neutral describes those where $-1.5 \leq \Delta\varepsilon \leq 3.0$ and dielectrically negative describes those where $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 µm. The voltage applied is a rectangular wave having a frequency of 1 kHz and an effective value of typically 0.5 V to 1.0 V, but it is always selected to be below the capacitive threshold of the respective test mixture.

$\Delta\varepsilon$ is defined as $(\varepsilon_\| - \varepsilon_\perp)$, while $\varepsilon_{ave.}$ is $(\varepsilon_\| + 2\varepsilon_\perp)/3$.

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The parameter ranges indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta$n) is determined at a wavelength of 589.3 nm. The dielectric anisotropy ($\Delta\varepsilon$) is determined at a frequency of 1 kHz. The threshold voltages, as well as all other electro-optical properties, are determined using test cells produced at Merck KGaA, Germany. The test cells for the determination of Δε have a cell thickness of approximately 20 μm. The electrode is a circular ITO electrode having an area of 1.13 cm² and a guard ring. The orientation layers are SE-1211 from Nissan Chemicals, Japan, for homeotropic orientation ($\epsilon_\|$) and polyimide AL-1054 from Japan Synthetic Rubber, Japan, for homogeneous orientation ($\epsilon_\perp$). The capacitances are determined using a Solatron 1260 frequency response analyser using a sine wave with a voltage of 0.3 $V_{rms}$. The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

The liquid-crystalline media are investigated with respect to their properties in the microwave frequency range as described in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548.

Compare in this respect also A. Gaebler, F. Gölden, S. Müller, A. Penirschke and R. Jakoby "Direct Simulation of Material Permittivites . . . ", 12MTC 2009—International Instrumentation and Measurement Technology Conference, Singapore, 2009 (IEEE), pp. 463-467, and DE 10 2004 029 429 A, in which a measurement method is likewise described in detail.

The liquid crystal is introduced into a polytetrafluoroethylene (PTFE) capillary. The capillary has an internal radius of 180 μm and an external radius of 350 μm. The effective length is 2.0 cm. The filled capillary is introduced into the center of the cavity with a resonance frequency of 30 GHz. This cavity has a length of 6.6 mm, a width of 7.1 mm and a height of 3.6 mm. The input signal (source) is then applied, and the result of the output signal is recorded using a commercial vector network analyser.

The change in the resonance frequency and the Q factor between the measurement with the capillary filled with the liquid crystal and the measurement without the capillary filled with the liquid crystal is used to determine the dielectric constant and the loss angle at the corresponding target frequency by means of equations 10 and 11 in A. Penirschke, S. Müller, P. Scheele, C. Weil, M. Wittek, C. Hock and R. Jakoby: "Cavity Perturbation Method for Characterization of Liquid Crystals up to 35 GHz", 34$^{th}$ European Microwave Conference—Amsterdam, pp. 545-548, as described therein.

The values for the components of the properties perpendicular and parallel to the director of the liquid crystal are obtained by alignment of the liquid crystal in a magnetic field. To this end, the magnetic field of a permanent magnet is used. The strength of the magnetic field is 0.35 tesla. The alignment of the magnets is set correspondingly and then rotated correspondingly through 90°.

Preferred components are phase shifters, varactors, wireless and radio wave antenna arrays, matching circuit adaptive filters and others.

In the present application, the term compounds is taken to mean both one compound and a plurality of compounds, unless expressly stated otherwise.

The liquid-crystal media according to the invention preferably have nematic phases in preferred ranges given above. The expression have a nematic phase here means on the one hand that no smectic phase and no crystallization are observed at low temperatures at the corresponding temperature and on the other hand that no clearing occurs on heating from the nematic phase. The investigation at low temperatures is carried out in flow viscometer at the corresponding temperature and checked by storage in test cells having a layer thickness of 5 μm for at least 100 hours. At high temperatures, the clearing point is measured in capillaries by conventional methods.

Furthermore, the liquid-crystal media according to the invention are characterized by high optical anisotropy values in the visible range, especially at a wavelength of 589.0 nm (i.e. at the Na"D" line). The birefringence at 589 nm is preferably 0.20 or more, particularly preferably 0.25 or more, particularly preferably 0.30 or more, particularly preferably 0.40 or more and very particularly preferably 0.45 or more. In addition, the birefringence is preferably 0.80 or less.

The liquid crystals employed preferably have a positive dielectric anisotropy. This is preferably 2 or more, preferably 4 or more, particularly preferably 6 or more and very particularly preferably 10 or more.

Furthermore, the liquid-crystal media according to the invention are characterized by high anisotropy values in the microwave range. The birefringence at about 8.3 GHz is, for example, preferably 0.14 or more, particularly preferably 0.15 or more, particularly preferably 0.20 or more, particularly preferably 0.25 or more and very particularly preferably 0.30 or more. In addition, the birefringence is preferably 0.80 or less.

The dielectric anisotropy in the microwave range is defined as $$\Delta\epsilon_r \equiv (\epsilon_{r,\|} - \epsilon_{r,\perp}).$$

The tuneability (τ) is defined as $$\tau \equiv (\Delta\epsilon_r / \epsilon_{r,\|}).$$

The material quality (η) is defined as $$\eta \equiv (\tau / \tan\delta_{\epsilon r,max}), \text{ where}$$

the maximum dielectric loss is $$\tan\delta_{\epsilon r,max} \equiv \max \cdot \{\tan\delta_{\epsilon r,\perp}; \tan\delta_{\epsilon r,\|}\}.$$

The material quality (η) of the preferred liquid-crystal materials is 6 or more, preferably 8 or more, preferably 10 or more, preferably 15 or more, preferably 17 or more, preferably 20 or more, particularly preferably 25 or more and very particularly preferably 30 or more.

In the corresponding components, the preferred liquid-crystal materials have phase shifter qualities of 15°/dB or more, preferably 20°/dB or more, preferably 30°/dB or more, preferably 40°/dB or more, preferably 50°/dB or more, particularly preferably 80°/dB or more and very particularly preferably 100°/dB or more.

In some embodiments, however, liquid crystals having a negative value of the dielectric anisotropy can also advantageously be used.

The liquid crystals employed are either individual substances or mixtures. They preferably have a nematic phase.

The term "alkyl" preferably encompasses straight-chain and branched alkyl groups having 1 to 15 carbon atoms, in particular the straight-chain groups methyl, ethyl, propyl, butyl, pentyl, hexyl and heptyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote 1 to 10. Preferably, n is 1 and m is 1 to 6.

Compounds containing a vinyl end group and compounds containing a methyl end group have low rotational viscosity.

In the present application, both high-frequency technology and hyper-frequency technology denote applications having frequencies in the range from 1 MHz to 1 THz, preferably from 1 GHz to 500 GHz, more preferably 2 GHz to 300 GHz, particularly preferably from about 5 GHz to 150 GHz.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

Preferably the media according to the present invention comprise one or more chiral compounds as chiral dopants in order to adjust their cholesteric pitch. Their total concentration in the media according to the instant invention is preferably in the range 0.05% to 15%, more preferably from 1% to 10% and most preferably from 2% to 6%.

Optionally the media according to the present invention may comprise further liquid crystal compounds in order to adjust the physical properties. Such compounds are known to the expert. Their concentration in the media according to the instant invention is preferably 0% to 30%, more preferably 0.1% to 20% and most preferably 1% to 15%.

The response times are given as rise time ($\tau_{on}$) for the time for the change of the relative tuning, respectively of the relative contrast for the electo-optical response, from 0% to 90% ($t_{90}$-$t_0$), i.e. including the delay time ($t_{10}$-$t_0$), as decay time ($\tau_{off}$) for the time for the change of the relative tuning, respectively of the relative contrast for the electo-optical response, from 100% back to 10% ($t_{100}$-$t_{10}$) and as the total response time ($\tau_{total}=\tau_{off}$), respectively.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1-E-alkenyl, respectively, in each case having n, m or l C atoms. Table A lists the codes used for the ring elements of the core structures of the compounds, while Table B shows the linking groups. Table C gives the meanings of the codes for the left-hand or right-hand end groups. Table D shows illustrative structures of compounds with their respective abbreviations.

TABLE A

Ring elements

 C

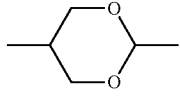 D

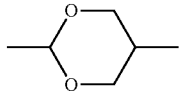 DI

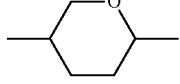 A

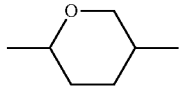 AI

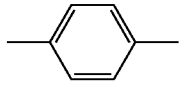 P

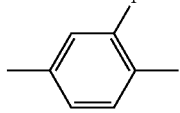 G

TABLE A-continued

| Ring elements | |
|---|---|
| (3-fluoro-1,4-phenylene) | Gl |
| (3,5-difluoro-1,4-phenylene with additional F) | U |
| (2,6-difluoro-1,4-phenylene) | UI |
| (2,3-difluoro-1,4-phenylene) | Y |
| (pyrimidine-2,5-diyl) | M |
| (pyrimidine-5,2-diyl) | MI |
| (pyridine-2,5-diyl) | N |
| (pyridine-5,2-diyl) | NI |
| (naphthalene-2,6-diyl) | Np |
| (trifluoronaphthalene-2,6-diyl) | N3f |
| (trifluoronaphthalene-2,6-diyl isomer) | N3fI |
| (1,2,3,4-tetrahydronaphthalene-2,6-diyl) | tH |
| (1,2,3,4-tetrahydronaphthalene-6,2-diyl) | tHI |
| (difluoro-tetrahydronaphthalene-2,6-diyl) | tH2f |
| (difluoro-tetrahydronaphthalene-6,2-diyl) | tH2fI |
| (decahydronaphthalene-2,6-diyl) | dH |
| (trifluoroindane-2,5-diyl) | K |
| (trifluoroindane-5,2-diyl) | KI |
| (cyclohex-1-ene-1,4-diyl) | L |
| (cyclohex-1-ene-4,1-diyl) | LI |
| (fluorocyclohexene) | F |
| (fluorocyclohexene isomer) | FI |

TABLE A-continued

Ring elements

| Structure | Label |
|---|---|
| 2,5-dimethylphenyl with $C_oH_{2o+1}$ at position 4 | P(o) |
| 2,5-dimethylphenyl with $C_oH_{2o+1}$ at position 3 | PI(o) |
| 2,5-dimethylphenyl with isopropyl | P(i3) |
| 2,5-dimethylphenyl with isopropyl (isomer) | PI(ic3) |
| 2,5-dimethylphenyl with tert-butyl | P(t4) |
| 2,5-dimethylphenyl with tert-butyl (isomer) | PI(t4) |
| 2,5-dimethylphenyl with cyclopropyl | P(c3) |
| 2,5-dimethylphenyl with cyclopropyl (isomer) | PI(c3) |
| 2,5-dimethylphenyl with cyclobutyl | P(c4) |
| 2,5-dimethylphenyl with cyclobutyl (isomer) | PI(c4) |
| 2,5-dimethylphenyl with cyclopentyl | P(c5) |
| 2,5-dimethylphenyl with cyclopentyl (isomer) | PI(c5) |
| 2,5-dimethylphenyl with cyclopentenyl | P(e5) |
| 2,5-dimethylphenyl with cyclopentenyl (isomer) | PI(e5) |
| 2,5-dimethylphenyl with cyclohexyl | P(c6) |
| 2,5-dimethylphenyl with cyclohexyl (isomer) | PI(c6) |
| 2,5-dimethylphenyl with cyclohexenyl | P(e6) |

TABLE A-continued
| Ring elements | |
|---|---|
| 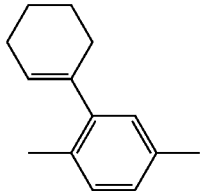 | PI(e6) |
| 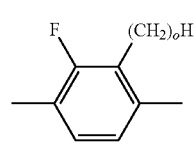  $o \in \{1; 2; 3; 4; 5; 6\}$ | GI(o) |
| 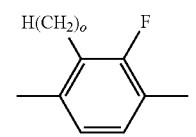  $o \in \{1; 2; 3; 4; 5; 6\}$ | G(o) |
| 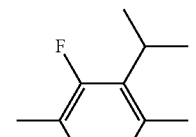 | GI(i3) |
| 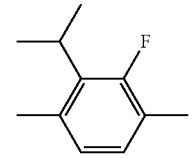 | G(i3) |
| 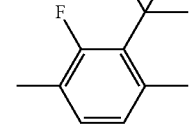 | GI(t4) |
| 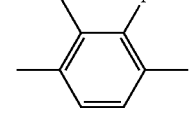 | G(t4) |
| 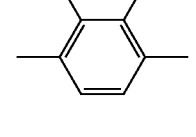 | GI(c3) |
| 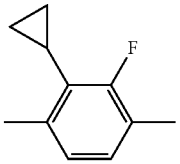 | G(c3) |
| 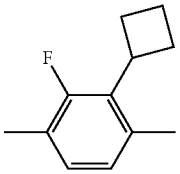 | GI(c4) |
| 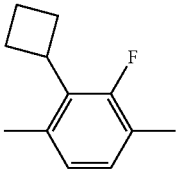 | G(c4) |
| 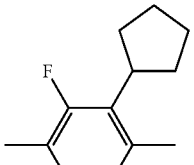 | GI(c5) |
| 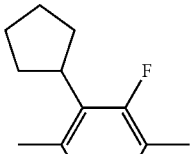 | G(c5) |
| 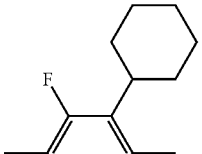 | GI(e5) |
|  | G(e5) |
|  | GI(c6) |

TABLE A-continued

Ring elements

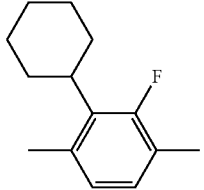
G(c6)

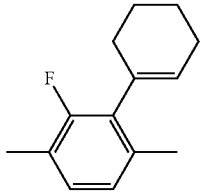
GI(e6)

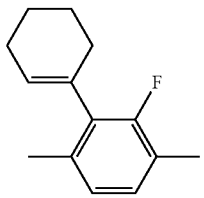
G(e6)

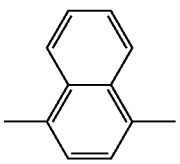
N(1,4)

TABLE B

| Linking groups | | | |
|---|---|---|---|
| E | —CH₂CH₂— | Z | —CO—O— |
| V | —CH═CH— | ZI | —O—CO— |
| X | —CF═CH— | O | —CH₂—O— |
| XI | —CH═CF— | OI | —O—CH₂— |
| B | —CF═CF— | Q | —CF₂—O— |
| T | —C≡C— | QI | —O—CF₂— |
| W | —CF₂CF₂— | | |

TABLE C

| End groups | |
|---|---|
| Left-hand side | Right-hand side |
| Used alone | |

| | | | |
|---|---|---|---|
| -n- | $C_nH_{2n+1}$— | -n | —$C_nH_{2n+1}$ |
| -nO— | $C_nH_{2n+1}$—O— | -nO | —O—$C_nH_{2n+1}$ |
| —V— | CH₂═CH— | —V | —CH═CH₂ |
| -nV— | $C_nH_{2n+1}$—CH═CH— | -nV | —$C_nH_{2n}$—CH═CH₂ |
| —Vn- | CH₂═CH—$C_nH_{2n+1}$— | —Vn | —CH═CH—$C_nH_{2n+1}$ |
| -nVm- | $C_nH_{2n+1}$—CH═CH—$C_mH_{2m}$— | -nVm | —$C_nH_{2n}$—CH═CH—$C_mH_{2m+1}$ |
| —N— | N≡C— | —N | —C≡N |
| —S— | S═C═N— | —S | —N═C═S |
| —F— | F— | —F | —F |
| —CL— | Cl— | —CL | —Cl |
| -M- | CFH₂— | -M | —CFH₂ |
| -D- | CF₂H— | -D | —CF₂H |
| -T- | CF₃— | -T | —CF₃ |
| -MO— | CFH₂O— | —OM | —OCFH₂ |
| -DO— | CF₂HO— | —OD | —OCF₂H |
| -TO— | CF₃O— | —OT | —OCF₃ |
| —FXO— | CF₂═CH—O— | —OXF | —O—CH═CF₂ |
| -A- | H—C≡C— | -A | —C≡C—H |
| -nA- | $C_nH_{2n+1}$—C≡C— | -An | —C≡C—$C_nH_{2n+1}$ |
| —NA- | N≡C—C≡C— | -AN | —C≡C—C≡N |

| Used in combination with others | | | |
|---|---|---|---|
| -...A...- | —C≡C— | -...A...- | —C≡C— |
| -...V...- | —CH═CH— | -...V...- | —CH═CH— |
| -...Z...- | —CO—O— | -...Z...- | —CO—O— |
| -...ZI...- | —O—CO— | -...ZI...- | —O—CO— |
| -...K...- | —CO— | -...K...- | —CO— |
| -...W...- | —CF═CF— | -...W...- | —CF═CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures
The following illustrative structures are compounds, which are particularly preferably employed, having a terminal —NSC group:

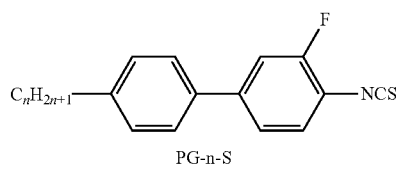

PG-n-S

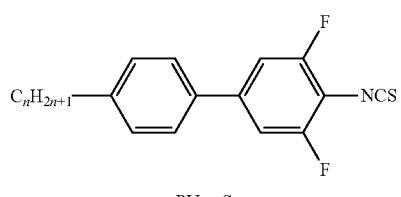

PU-n-S

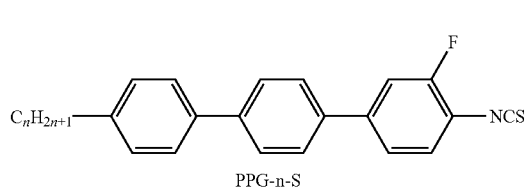

PPG-n-S

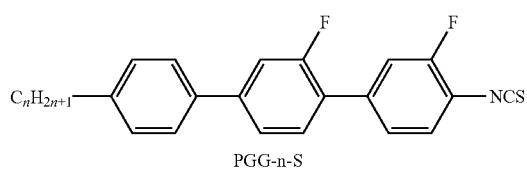

PGG-n-S

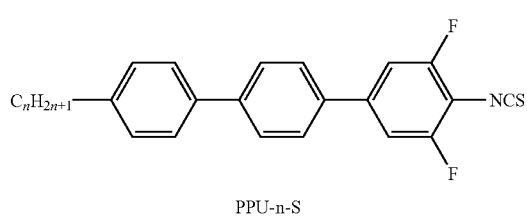

PPU-n-S

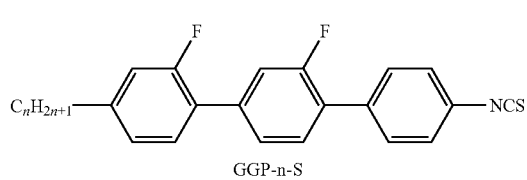

GGP-n-S

TABLE D-continued

Illustrative structures
The following illustrative structures are compounds, which are particularly preferably employed, having a terminal —NSC group:

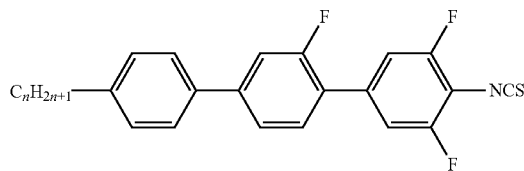

PGU-n-S

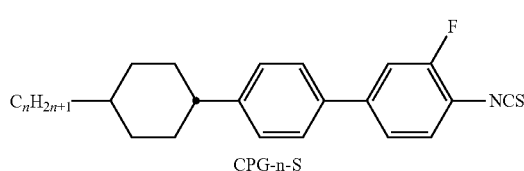

CPG-n-S

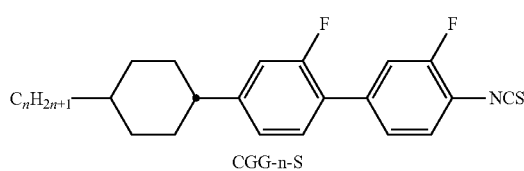

CGG-n-S

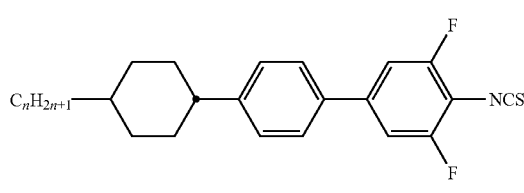

CPU-n-S

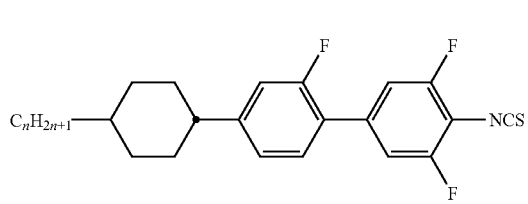

CGU-n-S

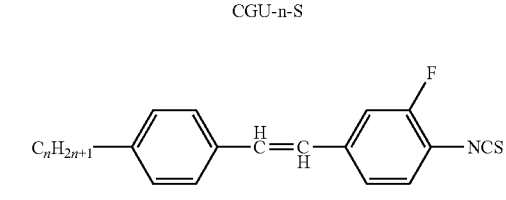

PVG-n-S

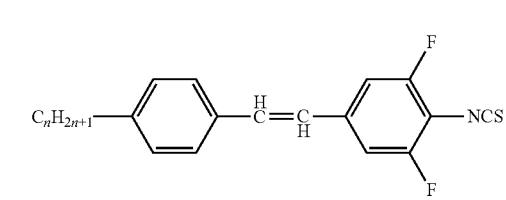

PVU-n-S

TABLE D-continued

Illustrative structures

The following illustrative structures are compounds, which are particularly preferably employed, having a terminal —NCS group:

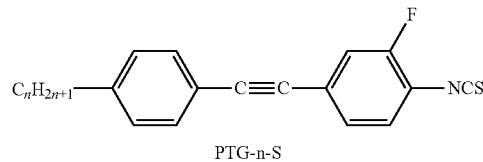
PTG-n-S

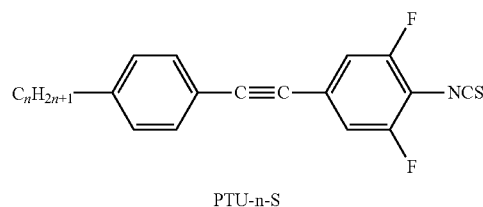
PTU-n-S

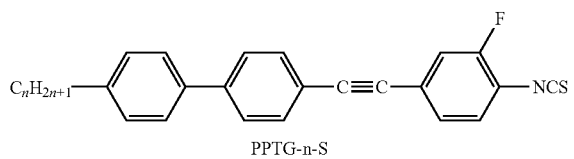
PPTG-n-S

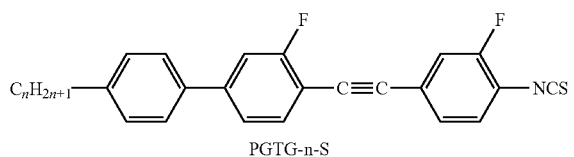
PGTG-n-S

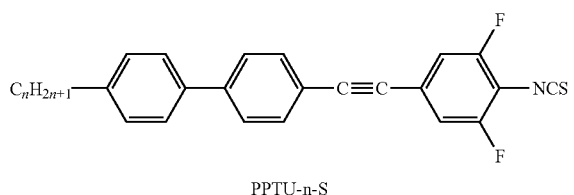
PPTU-n-S

The following illustrative structures are compounds, which are preferably additionally used in the media:

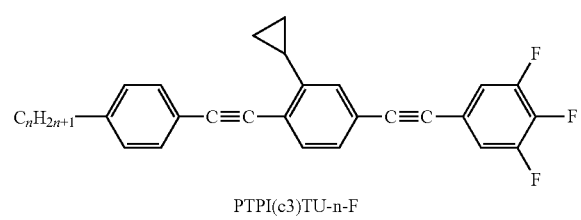
PTPI(c3)TU-n-F

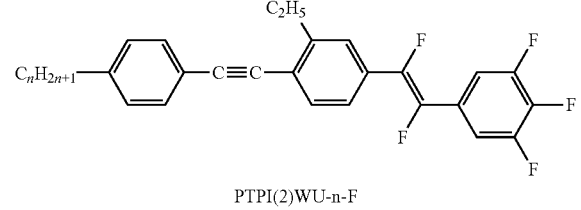
PTPI(2)WU-n-F

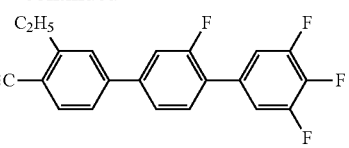
PTPI(2)GU-n-F

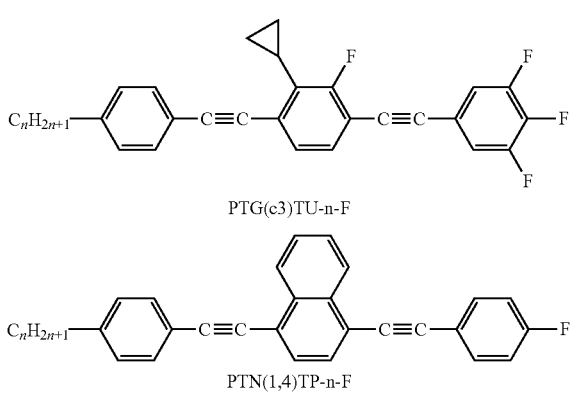
PTG(c3)TU-n-F

PTN(1,4)TP-n-F

The following illustrative structures are auxiliary compounds, which are optionally employed, having three 6-membered rings:

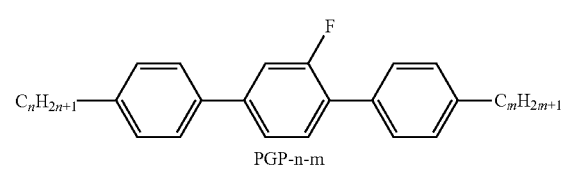
PGP-n-m

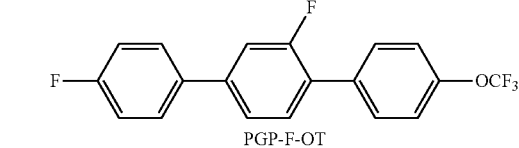
PGP-F-OT

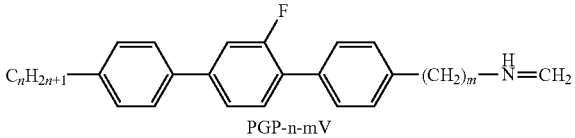
PGP-n-mV

PGP-n-mVI

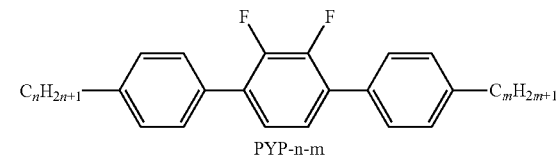
PYP-n-m

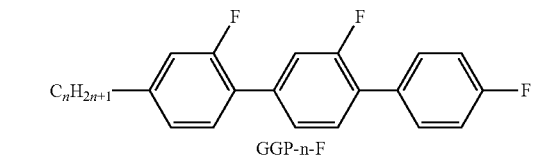
GGP-n-F

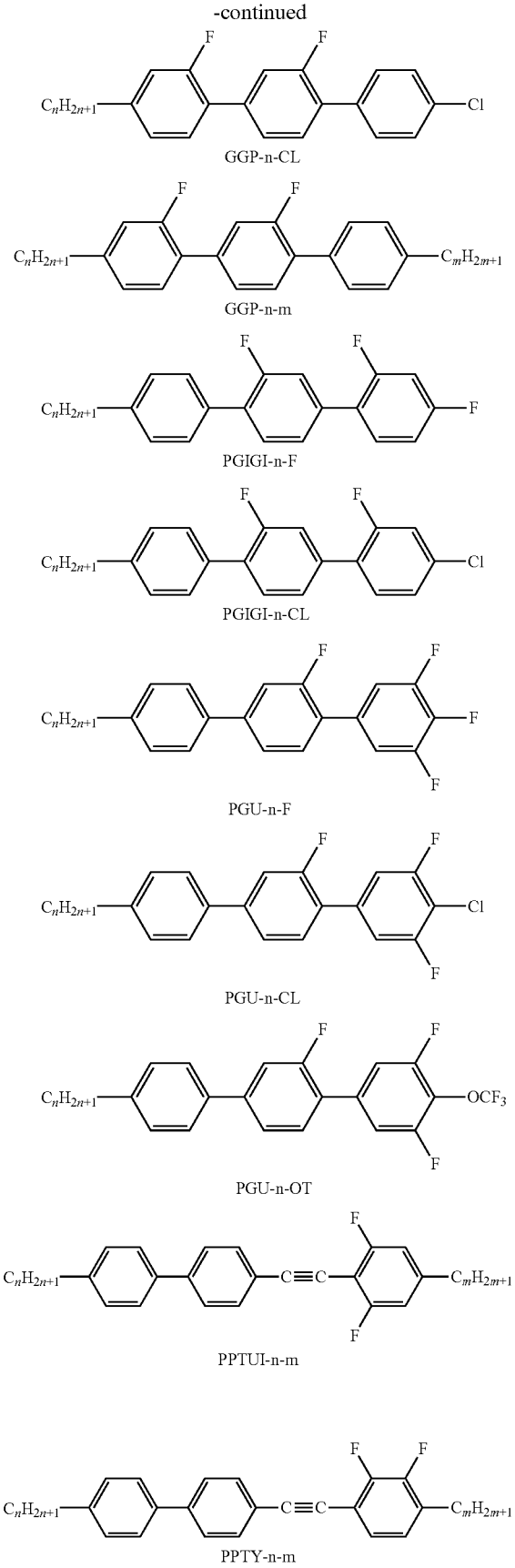
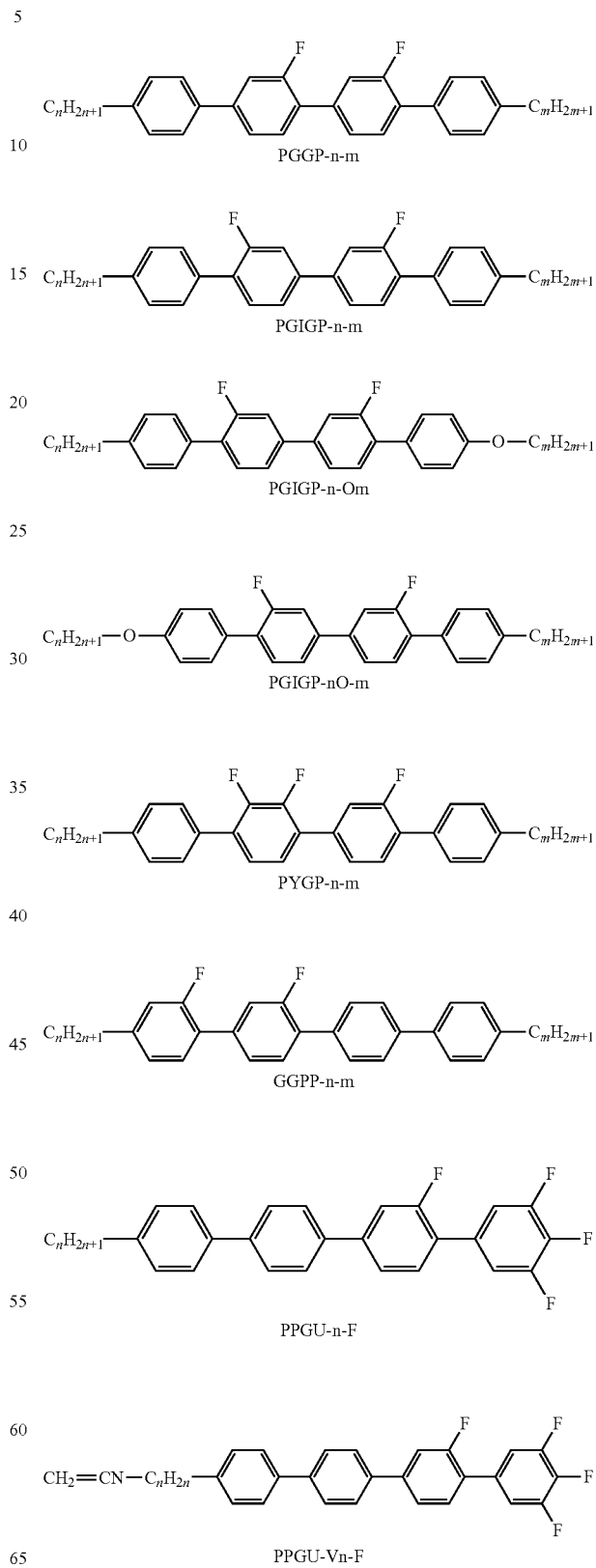
The following illustrative structures are auxiliary compounds, which are optionally employed, having four 6-membered rings:

Illustrative structures of dielectrically neutral compounds which may additionally be employed:
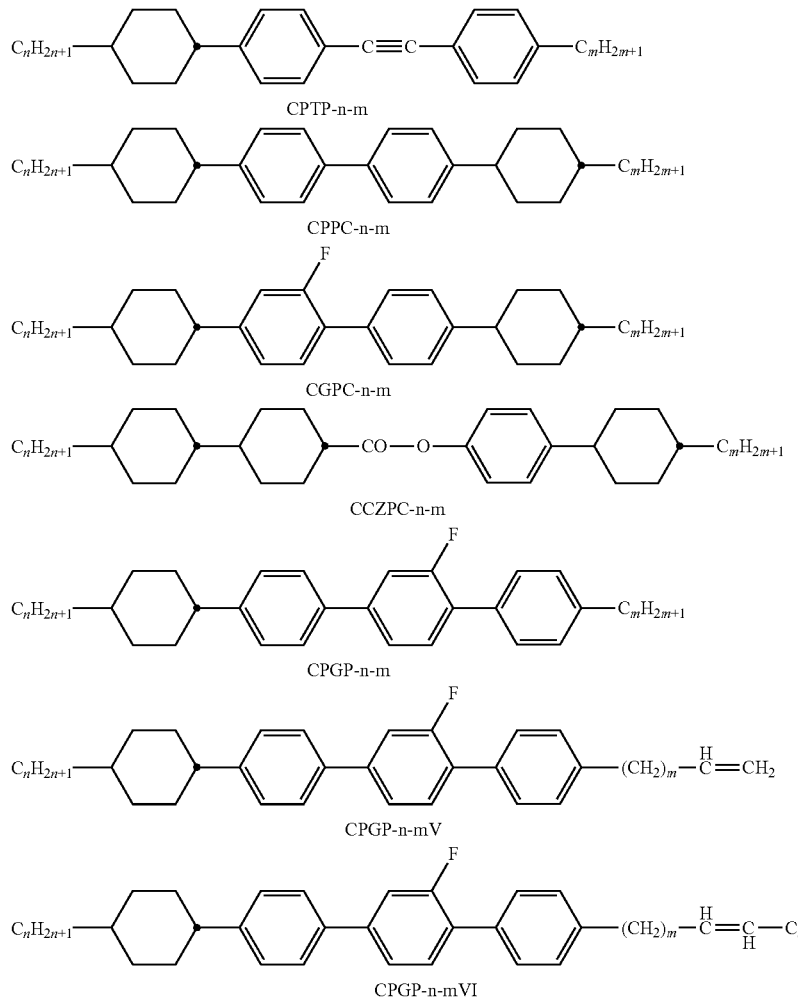
Illustrative structures of further compounds which may additionally be employed:
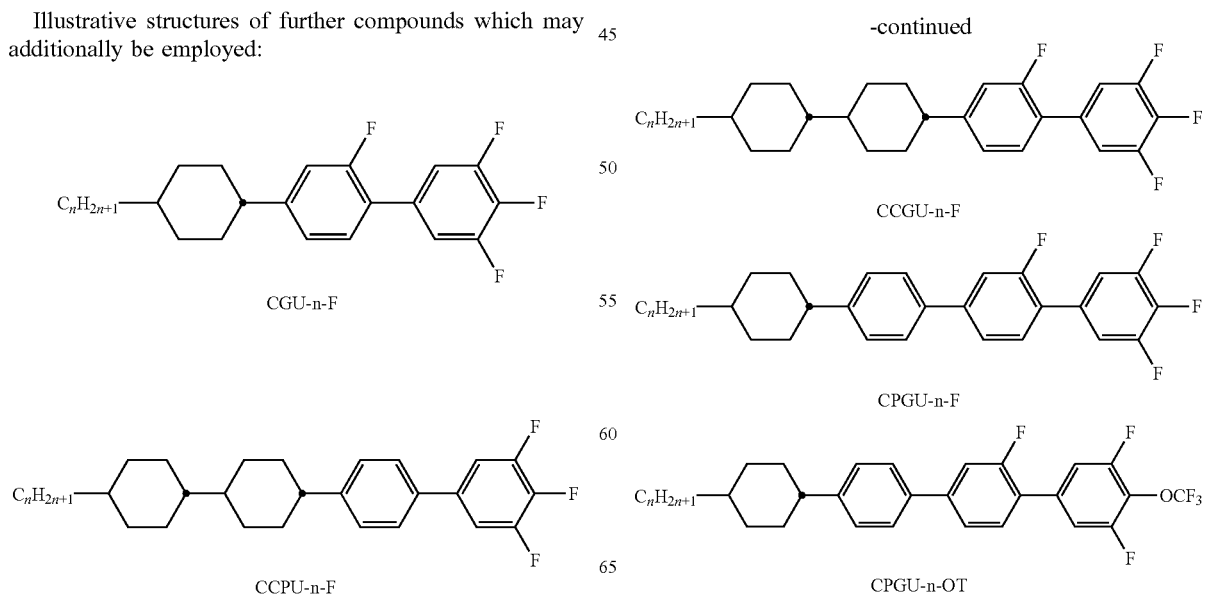

-continued
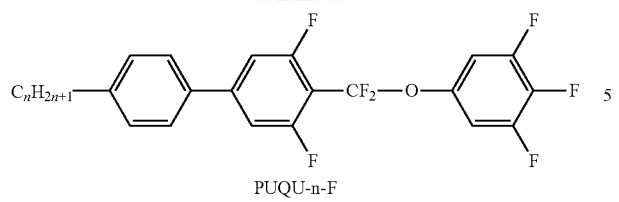
PUQU-n-F
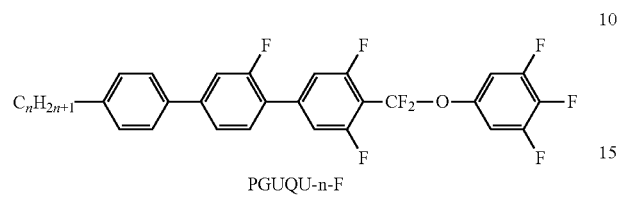
PGUQU-n-F
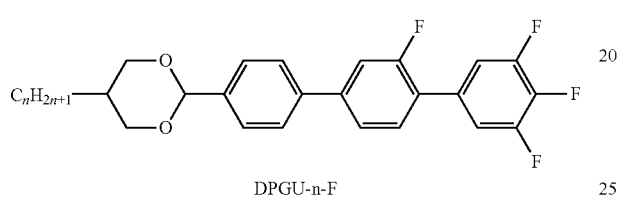
DPGU-n-F
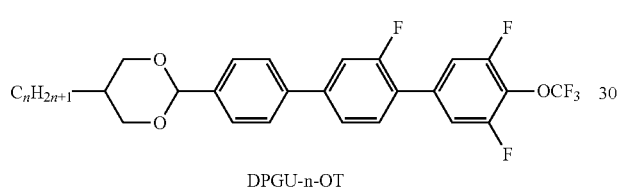
DPGU-n-OT
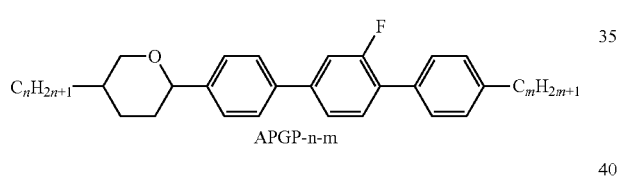
APGP-n-m
The following table, Table E, shows illustrative compounds which can be used as stabilizer in the mesogenic media in accordance with the present invention. The total concentration of these and similar compounds in the media is preferably 5% or less.
TABLE E
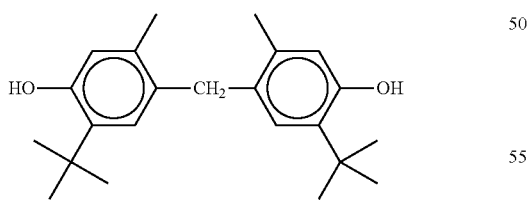
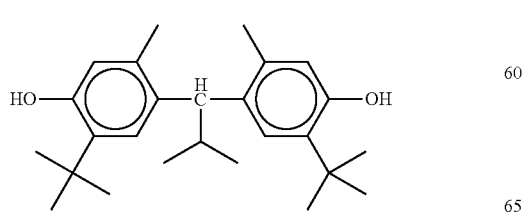
TABLE E-continued
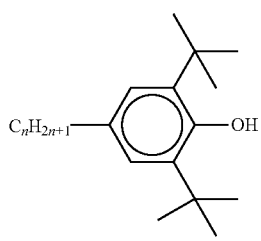
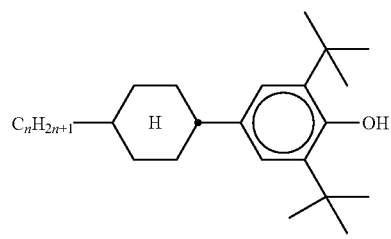
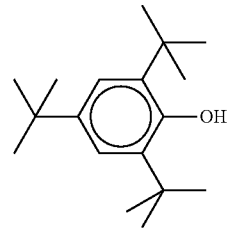
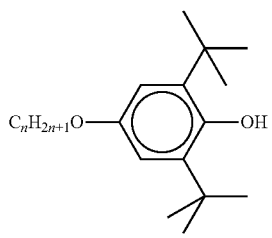
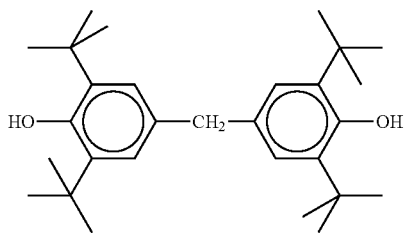
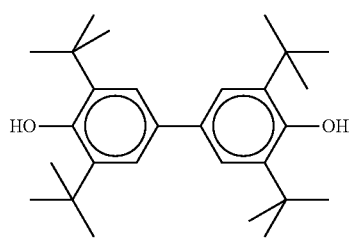

TABLE E-continued
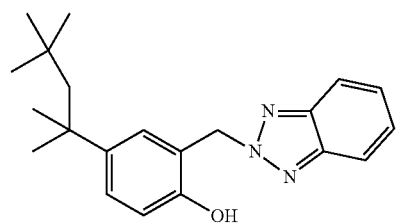 [SMILES: CC(C)(C)CC(C)(C)c1ccc(O)c(Cn2nc3ccccc3n2)c1]
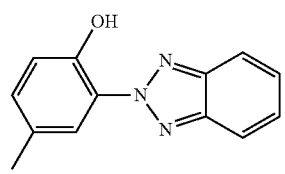 [SMILES: Cc1ccc(O)c(-n2nc3ccccc3n2)c1]
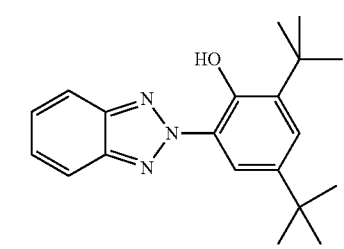 [SMILES: CC(C)(C)c1cc(-n2nc3ccccc3n2)c(O)c(C(C)(C)C)c1]
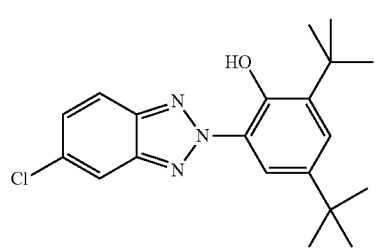 [SMILES: CC(C)(C)c1cc(-n2nc3ccc(Cl)cc3n2)c(O)c(C(C)(C)C)c1]
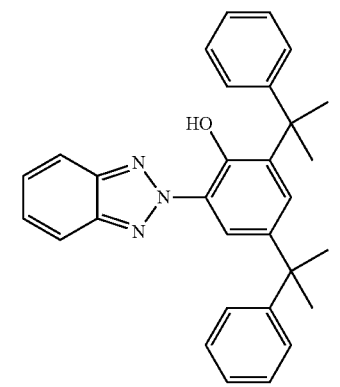 [SMILES: CC(C)(c1ccccc1)c1cc(-n2nc3ccccc3n2)c(O)c(C(C)(C)c2ccccc2)c1]
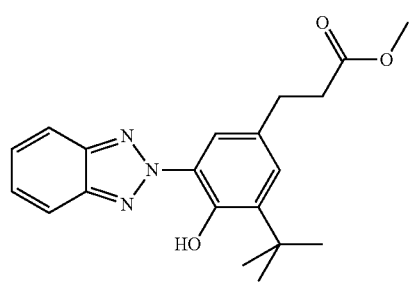 [SMILES: COC(=O)CCc1cc(-n2nc3ccccc3n2)c(O)c(C(C)(C)C)c1]
TABLE E-continued
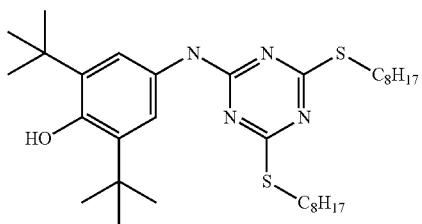
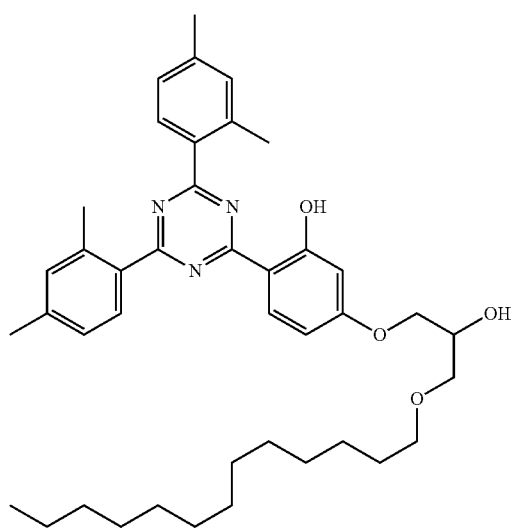 [SMILES: CCCCCCCCCCCCCOCC(O)COc1ccc(-c2nc(-c3ccc(C)cc3C)nc(-c3ccc(C)cc3C)n2)c(O)c1]
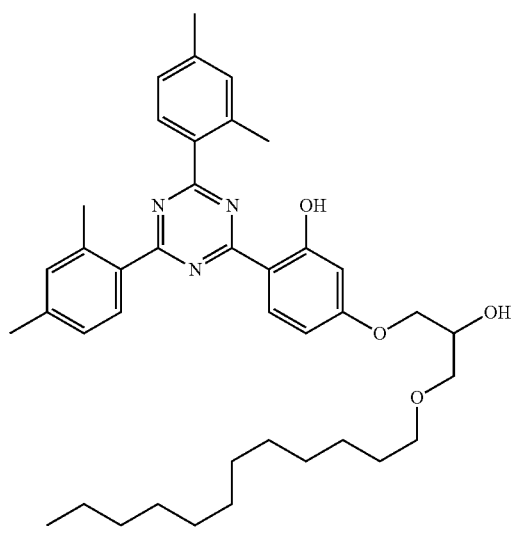 [SMILES: CCCCCCCCCCCCOCC(O)COc1ccc(-c2nc(-c3ccc(C)cc3C)nc(-c3ccc(C)cc3C)n2)c(O)c1]

TABLE E-continued

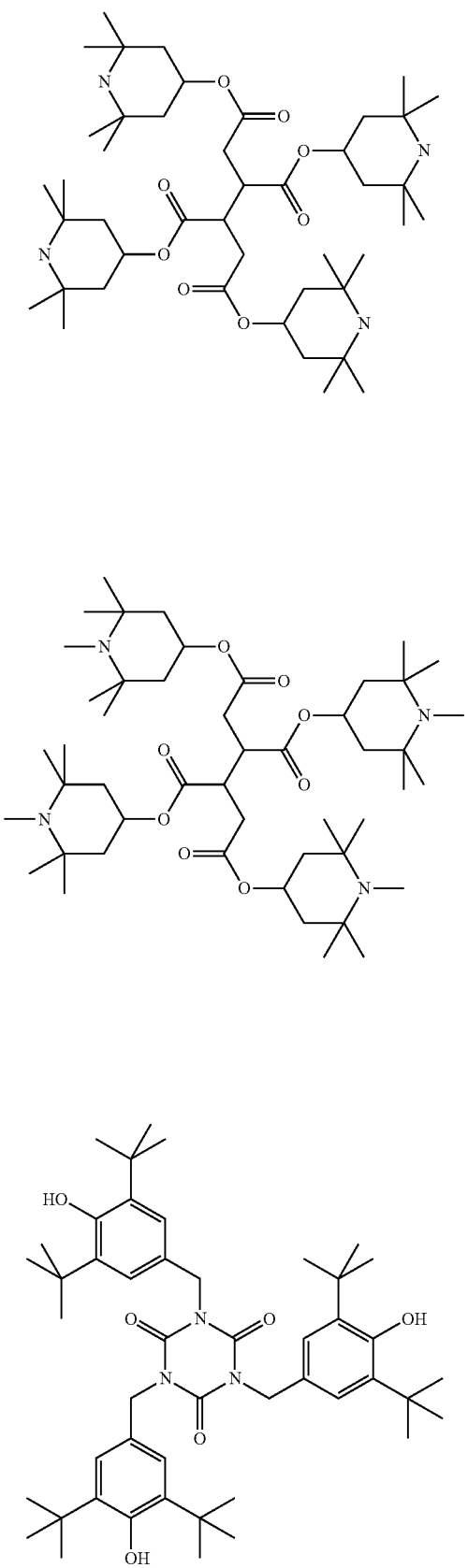

TABLE E-continued

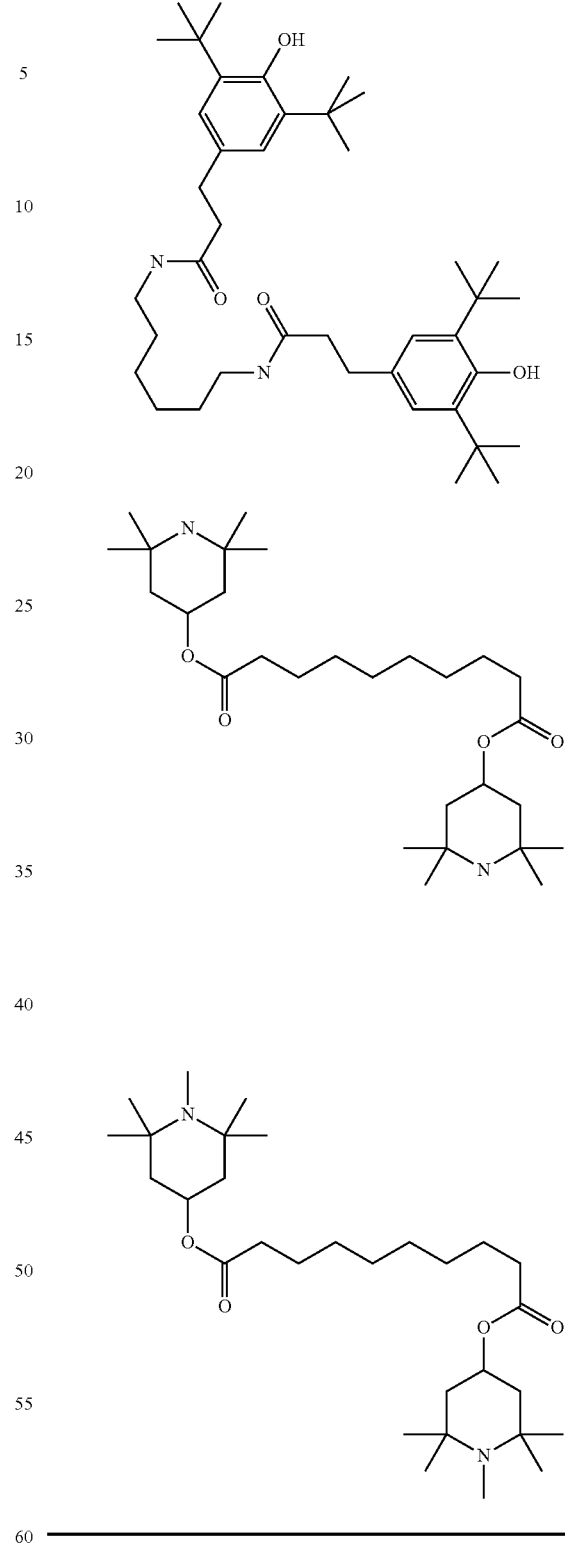

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F
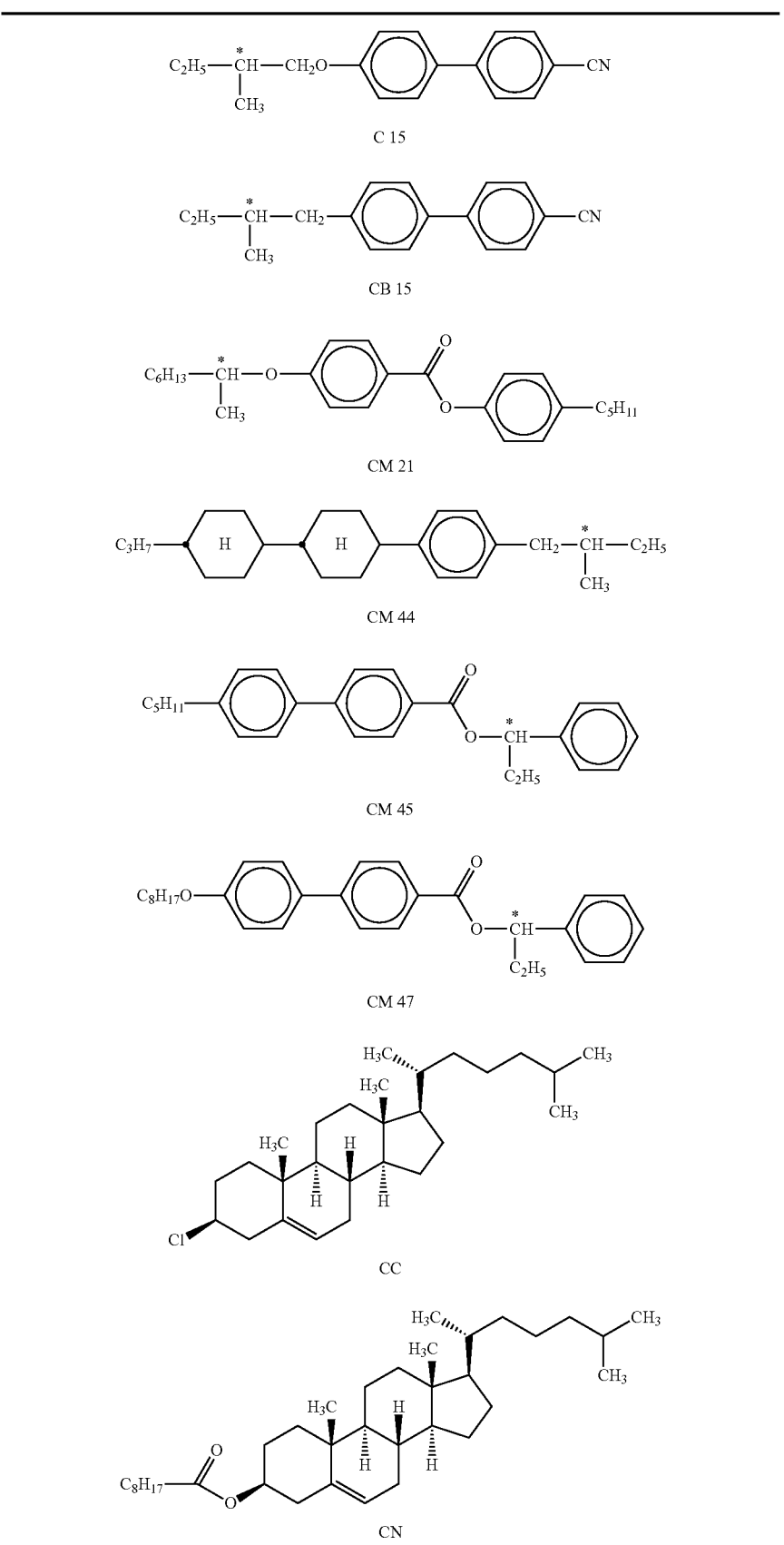

TABLE F-continued

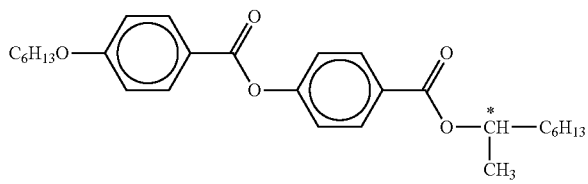

R/S-811

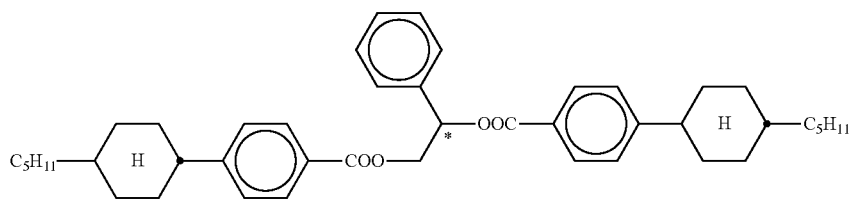

R/S-1011

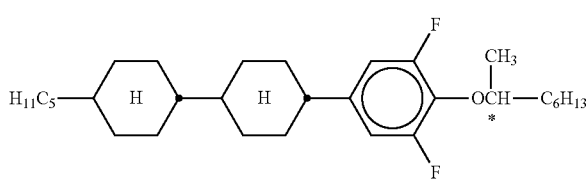

R/S-2011

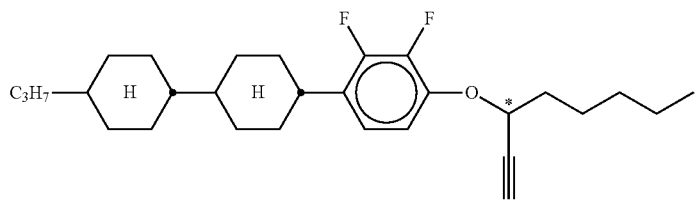

R/S-3011

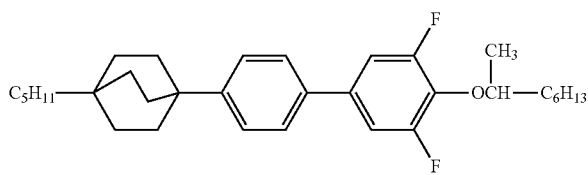

R/S-4011

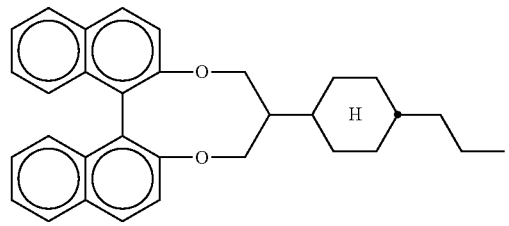

R/S-5011

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise even or more, preferably eight or more, compounds, preferably compounds having three or more, preferably four or more, different formulae, selected from the group of the compounds from Table D.

Without further elaboration, it is believed that one skilled in the art can, using the preceding description, utilize the present invention to its fullest extent. The preceding preferred specific embodiments and the following exmaples are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. EP 14002781.4, filed Aug. 8, 2014, are incorporated by reference herein.

EXAMPLES

The following examples illustrate the present invention without limiting it in any way.

However, it is clear to the person skilled in the art from the physical properties what properties can be achieved and in what ranges they can be modified. In particular, the combination of the various properties which can preferably be achieved is thus well defined for the person skilled in the art.

Examples 1 to 12 and Comparative Example

COMPARATIVE EXAMPLE

A liquid-crystal mixture C-1 having the composition and properties as indicated in the following table is prepared and characterized with respect to its general physical properties and its applicability in microwave

| Composition | | | |
|---|---|---|---|
| Compound No. Abbreviation | Conc./ mass-% | Physical Properties | |
| 1 PPTUI-3-2 | 20.0 | $T(N, I)/°C.$ = | 173 |
| 2 PPTUI-3-4 | 36.0 | $\Delta n$ (20° C., 589.3 nm) = | 0.335 |
| 3 GGP-3-CL | 10.0 | $\Delta\varepsilon$ (20° C., 1 kHz) = | 4.6 |
| 4 GGP-5-CL | 20.0 | $\gamma_1$ (20° C.)/mPa · s = | 746 |
| 5 CPGP-5-2 | 7.0 | $\tan \delta_{\varepsilon\ r,\perp}$ (20° C., 19 GHz) = | 0.0143 |
| 6 CPGP-5-3 | 7.0 | $\tan \delta_{\varepsilon\ r,\|\|}$ (20° C., 19 GHz) = | 0.0038 |
| Σ | 100.0 | $\tau$ (20° C., 19 GHz) = | 0.252 |
| | | $\eta$ (20° C., 19 GHz) = | 17.6 |

This mixture is suitable for applications in the microwave range, in particular for phase shifters or LC based antenna elements in the micro wave (MW) region, however its response times are only moderate and not sufficient for more demanding applications.

Example 1

A liquid-crystal mixture M-1 having the composition and properties as indicated in the following table is prepared and characterized with respect to its general physical properties and its applicability in microwave components at 19 GHz.

| Composition | | | |
|---|---|---|---|
| Compound No. Abbreviation | Conc./ mass-% | Physical Properties | |
| 1 PVG-3-S | 6.0 | $T(N, I)/°C.$ = | 112 |
| 2 PVG-4-S | 16.0 | $n_o$ (20° C., 589.3 nm) = | 1.5454 |
| 3 PVG-5-S | 6.0 | $\Delta n$ (20° C., 589.3 nm) = | t.b.d. |
| 4 PTG-3-S | 10.0 | $\varepsilon_{\|\|}$ (20° C., 1 kHz) = | 25.7 |
| 5 PTG-5-S | 14.0 | $\Delta\varepsilon$ (20° C., 1 kHz) = | 4.4 |
| 6 PTU-3-S | 8.0 | $\gamma_1$ (20° C.)/mPa · s = | 270 |
| 7 PGU-3-S | 8.0 | $\tan \delta_{\varepsilon\ r,\perp}$ (20° C., 19 GHz) = | 0.0143 |
| 8 PPTU-4-S | 16.0 | $\tan \delta_{\varepsilon\ r,\|\|}$ (20° C., 19 GHz) = | 0.0038 |
| 9 PPTU-5-S | 16.0 | $\tau$ (20° C., 19 GHz) = | 0.252 |
| Σ | 100.0 | $\eta$ (20° C., 19 GHz) = | 17.6 |

This mixture is suitable for applications in the microwave range, in particular for phase shifters or LC based antenna elements in the micro wave (MW) region. In comparison to the comparative example this mixture clearly exhibits superior response times.

Example 2

A liquid-crystal mixture M-2 having the composition and properties as indicated in the following table is prepared and characterized with respect to its general physical properties and its applicability in microwave components at 19 GHz.

| Composition | | | |
|---|---|---|---|
| Compound No Abbreviation | Conc./ mass-% | Physical Properties | |
| 1 PU-3-S | 16.0 | $T(N, I)/°C.$ = | 100 |
| 2 PVG-4-S | 13.0 | $n_o$ (20° C., 589.3 nm) = | t.b.d. |
| 3 PVG-5-S | 13.0 | $\Delta n$ (20° C., 589.3 nm) = | t.b.d. |
| 4 PTU-3-S | 7.0 | $\varepsilon_{\|\|}$ (20° C., 1 kHz) = | 28.2 |
| 5 PTU-5-S | 7.0 | $\Delta\varepsilon$ (20° C., 1 kHz) = | 5.0 |
| 6 PGU-3-S | 24.0 | $\gamma_1$ (20° C.)/mPa · s = | 245 |
| 7 PPTU-4-S | 10.0 | $\tan \delta_{\varepsilon\ r,\perp}$ (20° C., 19 GHz) = | t.b.d. |
| 8 PPTU-5-S | 10.0 | $\tan \delta_{\varepsilon\ r,\|\|}$ (20° C., 19 GHz) = | t.b.d. |
| Σ | 100.0 | $\tau$ (20° C., 19 GHz) = | t.b.d. |
| | | $\eta$ (20° C., 19 GHz) = | t.b.d. |

Remark: t.b.d.: to be determined.
$k_{11}$ = 15.8 pN; $k_{33}$ = 15.1 V; $V_{10}$ = 0.87 V This mixture is suitable for applications in the microwave range, in particular for phase shifters or LC based antenna elements in the micro wave (MW) region. In comparison to the Comparison Example 1 this mixture clearly exhibits superior response times.

Example 3

A liquid-crystal mixture M-3 having the composition and properties as indicated in the following table is prepared and characterized with respect to its general physical properties and its applicability in microwave components at 19 GHz.

| Composition | | | |
|---|---|---|---|
| Compound No Abbreviation | Conc./ mass-% | Physical Properties | |
| 1 PU-3-S | 18.0 | $T(N, I)/°C.$ = | 93 |
| 2 PVG-4-S | 13.0 | $n_o$ (20° C., 589.3 nm) = | t.b.d. |
| 3 PVG-5-S | 13.0 | $\Delta n$ (20° C., 589.3 nm) = | t.b.d. |

-continued

| Composition | | | |
|---|---|---|---|
| Compound No Abbreviation | Conc./ mass-% | Physical Properties | |
| 4 PTU-3-S | 8.0 | $\varepsilon_{\|\|}$ (20° C., 1 kHz) = | 27.7 |
| 5 PTU-5-S | 8.0 | $\Delta\varepsilon$ (20° C., 1 kHz) = | 5.0 |
| 6 PGU-3-S | 20.0 | $\gamma_1$ (20° C.)/mPa · s = | 225 |
| 7 PPTU-4-S | 10.0 | tan $\delta_{\varepsilon\ r,\perp}$ (20° C., 19 GHz) = | t.b.d. |
| 8 PPTU-5-S | 10.0 | tan $\delta_{\varepsilon\ r,\|\|}$ (20° C., 19 GHz) = | t.b.d. |
| Σ | 100.0 | $\tau$ (20° C., 19 GHz) = | t.b.d. |
| | | $\eta$ (20° C., 19 GHz) = | t.b.d. |

Remark: t.b.d.: to be determined.
$k_{11}$ = 15.0 pN; $k_{33}$ = 15.4 V; $V_{10}$ = 0.86 V This mixture is suitable for applications in the microwave range, in particular for phase shifters or LC based antenna elements in the micro wave (MW) region. In comparison to the comparative example this mixture clearly exhibits superior response times.

TABLE 5

Comparison of the properties at 19 GHz and 20° C.

| Example | Liquid crystal | $\Delta\varepsilon_{r,\perp}$ | $\delta_{\varepsilon\ r,\perp}$ | $\eta$ |
|---|---|---|---|---|
| 1 | M-1 | 0.56 | 0.013 | 14.5 |
| Comparison | 5CB | | 0.026 | 4.3 |

Example 4

A liquid-crystal mixture M-4 having the composition and properties as indicated in the following table is prepared.

| Composition | | | |
|---|---|---|---|
| Compound No Abbreviation | Conc./ mass-% | Physical Properties | |
| 1 GGP-3-S | 8.0 | T(N, I)/° C. = | 98 |
| 2 PGG-3-S | 12.0 | $n_e$ (20° C., 589.3 nm) = | t.b.d. |
| 3 PGU-3-S | 12.0 | $\Delta n$ (20° C., 589.3 nm) = | t.b.d. |
| 4 PVG-3-S | 6.0 | $\varepsilon_{\|\|}$ (20° C., 1 kHz) = | 26.7 |
| 5 PVG-4-S | 18.0 | $\Delta\varepsilon$ (20° C., 1 kHz) = | 5.1 |
| 6 PTG-3-S | 10.0 | $k_{11}$ (20° C.)/pN | 17.7 |
| 7 PTG-5-S | 18.0 | $k_{33}$ (20° C.)/pN | 15.7 |
| 8 PTU-3-S | 10.0 | $V_0$ (20° C.)/V | 0.96 |
| 9 PPTU-4-S | 6.0 | $\gamma_1$ (20° C.)/mPa · s = | 698 |
| Σ | 100.0 | tan $\delta_{er,max}$ (20° C., 19 GHz) = | 0.0189 |
| | | $\tau$ (20° C., 19 GHz) = | 0.336 |
| | | $\eta$ (20° C., 19 GHz) = | 17.9 |

Remark: t.b.d.: to be determined.

This mixture is very highly suitable for applications in the microwave range, in particular for phase shifters or LC based antenna elements in the MW region.

Examples 5 to 9

To the liquid crystalline medium M-4 of Example 4 alternatively a certain concentration of a further single compound one each is added and the resultant mixtures (M-5 to M-9) are investigated for their general physical properties and for their performance in the microwave regime.

| Composition | | | | |
|---|---|---|---|---|
| Example No. | Mixture No. | Compound Abbreviation | c(Comp.) | c(M-4) |
| | | | / % | |
| 4 | M-4 | None | 0.0 | 100.0 |
| 5 | M-5 | PTPI(c3)TU-4-F | 5.0 | 95.0 |
| 6 | M-6 | PTPI(2)WU-6-F | 10.0 | 90.0 |
| 7 | M.7 | PTPI(2)GU-4-F | 10.0 | 90.0 |
| 8 | M-8 | PTG(c3)TU-4-F | 5.0 | 95.0 |
| 9 | M-9 | PTN(1,4)TP-3-F | 5.0 | 95.0 |

Physical Properties I, General I (20° C. except T(N,I) )

| Example No. | Mixture No. | T(N, I)/ ° C. | $\Delta n$ | $\varepsilon_{\|\|}$ | $\Delta\varepsilon$ |
|---|---|---|---|---|---|
| 4 | M-4 | 98 | t.b.d. | 26.7 | 21.5 |
| 5 | M-5 | 98 | t.b.d. | 26.1 | 20.9 |
| 6 | M-6 | 90 | t.b.d. | 26.0 | 21.0 |
| 7 | M.7 | 102 | t.b.d. | 27.0 | 21.9 |
| 8 | M-8 | 93.9 | t.b.d. | 27.0 | 21.8 |
| 9 | M-9 | 99.5 | t.b.d. | 25.9 | 20.9 |

Remark: t.b.d.: to be determined.

Physical Properties II, General II (20° C.)

| Example No. | Mixture No. | $\gamma_1$ | $k_{11}$/pN | $k_{33}$/pN | $V_0$/V |
|---|---|---|---|---|---|
| 4 | M-4 | 241 | 17.7 | 15.7 | 0.96 |
| 5 | M-5 | 254 | 15.1 | 14.6 | 0.90 |
| 6 | M-6 | 272 | 15.8 | 15.8 | 0.91 |
| 7 | M.7 | 319 | 16.0 | 16.9 | 0.90 |
| 8 | M-8 | 257 | 15.8 | 15.0 | 0.90 |
| 9 | M-9 | 273 | 18.2 | 15.9 | 0.99 |

Physical Properties III, Microwave I (20° C., 19 GHz)

| Example No. | Mixture No. | $\varepsilon_{r,\perp}$ | $\varepsilon_{r,\|\|}$ | tan $\delta_{\varepsilon\ r,\|\|}$ | tan $\delta_{\varepsilon\ r,\perp}$ |
|---|---|---|---|---|---|
| 4 | M-4 | 3.74 | 2.49 | 0.0189 | 0.0091 |
| 5 | M-5 | 3.68 | 2.48 | 0.0177 | 0.0088 |
| 6 | M-6 | 3.67 | 2.49 | 0.0174 | 0.0084 |
| 7 | M.7 | 3.68 | 2.48 | 0.0170 | 0.0082 |
| 8 | M-8 | 3.70 | 2.49 | 0.0180 | 0.0088 |
| 9 | M-9 | 3.73 | 2.49 | 0.0175 | 0.0085 |

Physical Properties IV, Microwave II (20° C., 19 GHz)

| Example No. | Mixture No. | tan $\delta_{\varepsilon\ r,\perp}$ | $\tau_{\varepsilon\ r}$ | $\eta$ |
|---|---|---|---|---|
| 4 | M-4 | 0.0189 | 0.336 | 17.8 |
| 5 | M-5 | 0.0177 | 0.326 | 18.4 |
| 6 | M-6 | 0.0174 | 0.323 | 18.6 |
| 7 | M.7 | 0.0170 | 0.327 | 19.3 |
| 8 | M-8 | 0.0180 | 0.327 | 18.1 |
| 9 | M-9 | 0.0175 | 0.332 | 19.0 |

These mixtures are very well suitable for applications in the microwave range, in particular for phase shifters or LC based antenna elements in the MW region.

The mixtures of examples 4 to 9 are treated and investigated as described under example 1. The resultant mixtures comprising the chiral compound in the respective concentrations show similarly improved properties. They are especially characterized in particular by improved response times.

Example 10

A liquid-crystal mixture M-10 having the composition and properties as indicated in the following table is prepared and characterized with respect to its general physical properties and its applicability in microwave components at 19 GHz.

| Composition | | | |
|---|---|---|---|
| Compound No Abbreviation | Conc./mass-% | Physical Properties | |
| 1 PU-3-S | 10.0 | $T(N, I)/°C. =$ | 126.5 |
| 2 PTU-3-S | 10.0 | $n_o$ (20° C., 589.3 nm) = | t.b.d. |
| 3 PTU-5-S | 10.0 | $\Delta n$ (20° C., 589.3 nm) = | t.b.d. |
| 4 CGU-2-S | 10.0 | $\varepsilon_\parallel$ (20° C., 1 kHz) = | 27.1 |
| 5 CGU-3-S | 10.0 | $\Delta\varepsilon$ (20° C., 1 kHz) = | 4.5 |
| 6 CGU-4-S | 10.0 | $\gamma_1$ (20° C.)/mPa · s = | 299 |
| 7 CGU-5-S | 10.0 | $k_1$ (20° C.)/pN = | 14.8 |
| 8 PGU-3-S | 16.0 | $k_3/k_1$ (20° C.) = | 1.43 |
| 9 PPTU-4-S | 7.0 | $V_0$ (20° C.)/V = | 0.86 |
| 10 PPTU-5-S | 7.0 | $\varepsilon_{r,\perp}$ (20° C., 19 kHz) = | 2.36 |
| Σ | 100.0 | $\varepsilon_{r,\parallel}$ (20° C., 19 kHz) = | 3.44 |
| | | tan $\delta_{\varepsilon\ r,\perp}$ (20° C., 19 GHz) = | 0.0116 |
| | | tan $\delta_{\varepsilon\ r,\parallel}$ (20° C., 19 GHz) = | 0.0064 |
| | | τ (20° C., 19 GHz) = | 0.315 |
| | | η (20° C., 19 GHz) = | 27.2 |

Remark: t.b.d.: to be determined.

This mixture is suitable for applications in the microwave range, in particular for phase shifters or LC based antenna elements in the micro wave (MW) region. In comparison to the comparative example this mixture clearly exhibits superior response times.

Example 11

A liquid-crystal mixture M-11 having the composition and properties as indicated in the following table is prepared and characterized with respect to its general physical properties and its applicability in microwave components at 19 GHz.

| Composition | | | |
|---|---|---|---|
| Compound No Abbreviation | Conc./mass-% | Physical Properties | |
| 1 PU-3-S | 10.0 | $T(N, I)/°C. =$ | 123 |
| 2 PTU-3-S | 10.0 | $n_o$ (20° C., 589.3 nm) = | t.b.d. |
| 3 PTU-5-S | 10.0 | $\Delta n$ (20° C., 589.3 nm) = | t.b.d. |
| 4 CGU-2-S | 20.0 | $\varepsilon_\parallel$ (20° C., 1 kHz) = | 26.9 |
| 5 CGU-4-S | 20.0 | $\Delta\varepsilon$ (20° C., 1 kHz) = | 4.7 |
| 6 PGU-3-S | 16.0 | $\gamma_1$ (20° C.)/mPa · s = | 287 |
| 7 PPTU-4-S | 7.0 | $k_1$ (20° C.)/pN = | 14.0 |
| 8 PPTU-5-S | 7.0 | $k_3/k_1$ (20° C.) = | 1.39 |
| Σ | 100.0 | $V_0$ (20° C.)/V = | 0.84 |
| | | $\varepsilon_{r,\perp}$ (20° C., 19 kHz) = | 2.36 |
| | | $\varepsilon_{r,\parallel}$ (20° C., 19 kHz) = | 3.42 |
| | | tan $\delta_{\varepsilon\ r,\perp}$ (20° C., 19 GHz) = | 0.0116 |
| | | tan $\delta_{\varepsilon\ r,\parallel}$ (20° C., 19 GHz) = | 0.0066 |
| | | τ (20° C., 19 GHz) = | 0.310 |
| | | η (20° C., 19 GHz) = | 26.7 |

Remark: t.b.d.: to be determined.

This mixture is suitable for applications in the microwave range, in particular for phase shifters or LC based antenna elements in the micro wave (MW) region. In comparison to the comparative example this mixture clearly exhibits superior response times.

Example 12

A liquid-crystal mixture M-12 having the composition and properties as indicated in the following table is prepared and characterized with respect to its general physical properties and its applicability in microwave components at 19 GHz.

| Composition | | | |
|---|---|---|---|
| Compound No Abbreviation | Conc./mass-% | Physical Properties | |
| 1 PU-3-S | 14.0 | $T(N, I)/°C. =$ | t.b.d. |
| 2 PTU-3-S | 14.0 | $n_o$ (20° C., 589.3 nm) = | t.b.d. |
| 3 CGU-2-S | 20.0 | $\Delta n$ (20° C., 589.3 nm) = | t.b.d. |
| 4 CGU-4-S | 20.0 | $\varepsilon_\parallel$ (20° C., 1 kHz) = | t.b.d. |
| 5 PGU-3-S | 18.0 | $\Delta\varepsilon$ (20° C., 1 kHz) = | t.b.d. |
| 6 PPTU-4-S | 7.0 | $\gamma_1$ (20° C.)/mPa · s = | t.b.d. |
| 7 PPTU-5-S | 10.0 | $k_1$ (20° C.)/pN = | t.b.d. |
| Σ | 100.0 | $k_3/k_1$ (20° C.) = | t.b.d. |
| | | $V_0$ (20° C.)/V = | t.b.d. |
| | | $\varepsilon_{r,\perp}$ (20° C., 19 kHz) = | t.b.d. |
| | | $\varepsilon_{r,\parallel}$ (20° C., 19 kHz) = | t.b.d. |
| | | tan $\delta_{\varepsilon\ r,\perp}$ (20° C., 19 GHz) = | t.b.d. |
| | | tan $\delta_{\varepsilon\ r,\parallel}$ (20° C., 19 GHz) = | t.b.d. |
| | | τ (20° C., 19 GHz) = | t.b.d. |
| | | η (20° C., 19 GHz) = | t.b.d. |

Remark: t.b.d.: to be determined.

This mixture is suitable for applications in the microwave range, in particular for phase shifters or LC based antenna elements in the micro wave (MW) region. In comparison to the comparative example this mixture clearly exhibits superior response times.

Example 13

A liquid-crystal mixture M-13 having the composition and properties as indicated in the following table is prepared and characterized with respect to its general physical properties and its applicability in microwave components at 19 GHz.

| Composition | | | |
|---|---|---|---|
| Compound No Abbreviation | Conc./mass-% | Physical Properties | |
| 1 PU-3-S | 8.0 | $T(N, I)/°C. =$ | 121.5 |
| 2 PVG-4-S | 8.0 | $n_o$ (20° C., 589.3 nm) = | t.b.d. |
| 3 PVG-5-S | 8.0 | $\Delta n$ (20° C., 589.3 nm) = | t.b.d. |
| 4 PTU-3-S | 8.0 | $\varepsilon_\parallel$ (20° C., 1 kHz) = | 26.2 |
| 5 PTU-5-S | 8.0 | $\Delta\varepsilon$ (20° C., 1 kHz) = | 4.6 |
| 6 CGU-3-S | 10.0 | $\gamma_1$ (20° C.)/mPa · s = | 298 |
| 7 CGU-4-S | 10.0 | $k_1$ (20° C.)/pN = | 16.0 |
| 8 CGU-5-S | 10.0 | $k_3/k_1$ (20° C.) = | 1.31 |
| 9 PGU-3-S | 16.0 | $V_0$ (20° C.)/V = | 0.91 |
| 9 PPTU-4-S | 7.0 | $\varepsilon_{r,\perp}$ (20° C., 19 kHz) = | 2.36 |
| 11 PPTU-5-S | 7.0 | $\varepsilon_{r,\parallel}$ (20° C., 19 kHz) = | 3.48 |
| Σ | 100.0 | tan $\delta_{\varepsilon\ r,\perp}$ (20° C., 19 GHz) = | 0.0121 |
| | | tan $\delta_{\varepsilon\ r,\parallel}$ (20° C., 19 GHz) = | 0.0067 |
| | | τ (20° C., 19 GHz) = | 0.321 |
| | | η (20° C., 19 GHz) = | 26.5 |

Remark: t.b.d.: to be determined.

This mixture is suitable for applications in the microwave range, in particular for phase shifters or LC based antenna elements in the micro wave (MW) region. In comparison to the comparative example this mixture clearly exhibits superior response times.

Example 14

A liquid-crystal mixture M-14 having the composition and properties as indicated in the following table is prepared and characterized with respect to its general physical properties and its applicability in microwave components at 19 GHz.

| Composition | | | |
|---|---|---|---|
| Compound No | Abbreviation | Conc./ mass-% | Physical Properties |
| 1 | PU-3-S | 8.0 | T(N, I)/° C. = 124 |
| 2 | PVG-4-S | 8.0 | $n_o$ (20° C., 589.3 nm) = t.b.d. |
| 3 | PVG-5-S | 8.0 | $\Delta n$ (20° C., 589.3 nm) = t.b.d. |
| 4 | PTU-3-S | 8.0 | $\varepsilon_\parallel$ (20° C., 1 kHz) = 26.2 |
| 5 | PTU-5-S | 8.0 | $\Delta\varepsilon$ (20° C., 1 kHz) = 4.6 |
| 6 | CGU-4-S | 15.0 | $\gamma_1$ (20° C.)/mPa·s = 311 |
| 7 | CGU-5-S | 15.0 | $k_1$ (20° C.)/pN = 16.2 |
| 8 | PGU-3-S | 16.0 | $k_3/k_1$ (20° C.) = 1.28 |
| 9 | PPTU-4-S | 7.0 | $V_0$ (20° C.)/V = 0.91 |
| 10 | PPTU-5-S | 7.0 | $\varepsilon_{r,\perp}$ (20° C., 19 kHz) = 2.37 |
| Σ | | 100.0 | $\varepsilon_{r,\parallel}$ (20° C., 19 kHz) = 3.48 |
| | | | tan $\delta_{\varepsilon\, r,\perp}$ (20° C., 19 GHz) = 0.0120 |
| | | | tan $\delta_{\varepsilon\, r,\parallel}$ (20° C., 19 GHz) = 0.0066 |
| | | | τ (20° C., 19 GHz) = 0.318 |
| | | | η (20° C., 19 GHz) = 26.2 |

Remark: t.b.d.: to be determined.

This mixture is suitable for applications in the microwave range, in particular for phase shifters or LC based antenna elements in the micro wave (MW) region. In comparison to the comparative example this mixture clearly exhibits superior response times.

Example 15

A liquid-crystal mixture M-15 having the composition and properties as indicated in the following table is prepared and characterized with respect to its general physical properties and its applicability in microwave components at 19 GHz.

| Composition | | | |
|---|---|---|---|
| Compound No | Abbreviation | Conc./ mass-% | Physical Properties |
| 1 | PU-3-S | 10.0 | T(N, I)/° C. = 126.5 |
| 2 | PTU-3-S | 10.0 | $n_o$ (20° C., 589.3 nm) = t.b.d. |
| 3 | PTU-5-S | 10.0 | $\Delta n$ (20° C., 589.3 nm) = t.b.d. |
| 4 | CGU-2-S | 14.0 | $\varepsilon_\parallel$ (20° C., 1 kHz) = 27.4 |
| 5 | CGU-3-S | 13.0 | $\Delta\varepsilon$ (20° C., 1 kHz) = 4.6 |
| 6 | CGU-4-S | 13.0 | $\gamma_1$ (20° C.)/mPa·s = 297 |
| 7 | PGU-3-S | 16.0 | $k_1$ (20° C.)/ = 14.5 |
| 8 | PPTU-4-S | 7.0 | $k_3/k_1$ (20° C.) = 1.45 |
| 9 | PPTU-5-S | 7.0 | $V_0$ (20° C.)/V = 0.84 |
| Σ | | 100.0 | $\varepsilon_{r,\perp}$ (20° C., 19 kHz) = 2.36 |
| | | | $\varepsilon_{r,\parallel}$ (20° C., 19 kHz) = 3.44 |
| | | | tan $\delta_{\varepsilon\, r,\perp}$ (20° C., 19 GHz) = 0.0115 |
| | | | tan $\delta_{\varepsilon\, r,\parallel}$ (20° C., 19 GHz) = 0.0065 |
| | | | τ (20° C., 19 GHz) = 0.313 |
| | | | η (20° C., 19 GHz) = 27.2 |

Remark: t.b.d.: to be determined.

This mixture is suitable for applications in the microwave range, in particular for phase shifters or LC based antenna elements in the micro wave (MW) region. In comparison to the comparative example this mixture clearly exhibits superior response times.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A liquid-crystal medium comprising:
one or more compounds selected from formulae I-3a to I-3d:

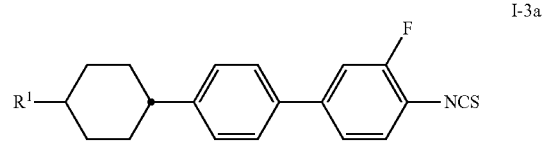

I-3a

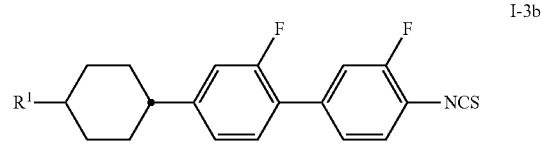

I-3b

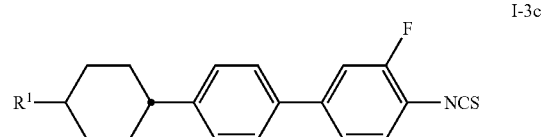

I-3c

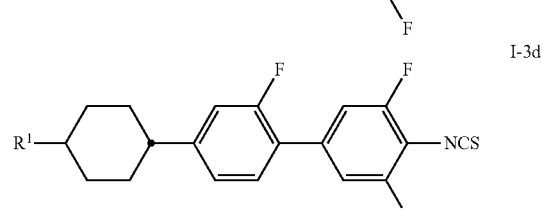

I-3d in which
$R^1$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms;
one or more compounds selected from formula II:

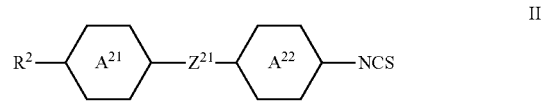

II in which
$R^2$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms, $Z^{21}$ denotes trans-CH=CH—, trans-CF=CF— or —C≡C—, and

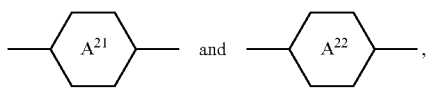

independently of one another, denote

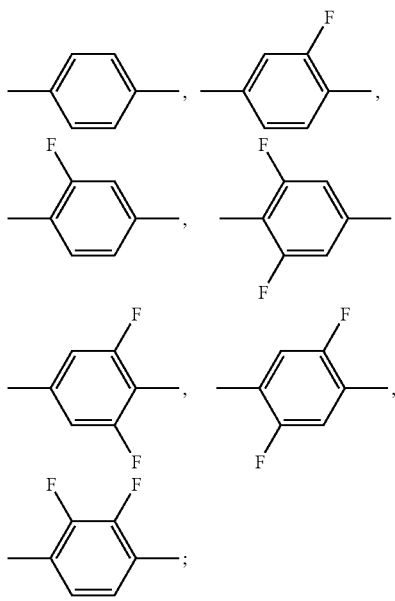

and one or more compounds selected from formula III-1b:

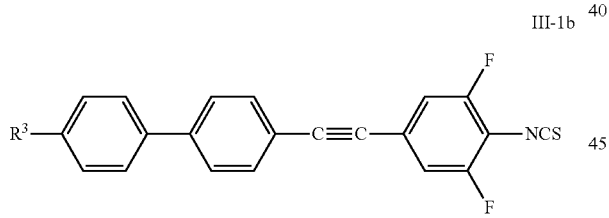
III-1b in which
R³ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
wherein the amount of compounds of formula III-1b in said medium is in the range from 5 to 45 wt. %,
wherein the liquid-crystal medium has a clearing point of 90° C. or more,
wherein the medium has a material quality, η, of 20 or more at 20° C. and 19 GHz, and
wherein the total concentration of compounds of formulae I-3a to I-3d, II, and III-1b is 90% to 100%.

2. A liquid-crystal medium according to claim 1, wherein said medium further contains one or more compounds of formulae I-1 and I-2, and wherein said one or more compounds of formula II are selected from compounds of formulae II-1 to II-3

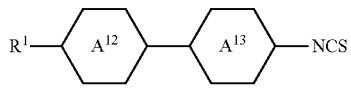
I-1

I-2

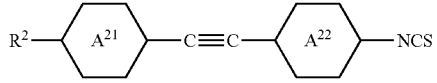
II-1

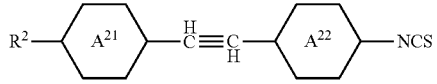
II-2

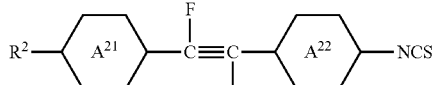
II-3 in which
R¹, R², A²¹, and A²² have the respective meanings given in claim 1, and

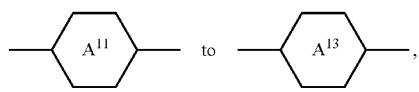

independently of one another, denote

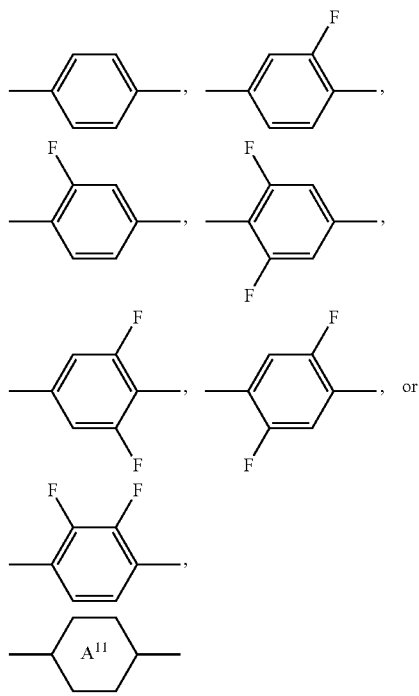

alternatively denotes

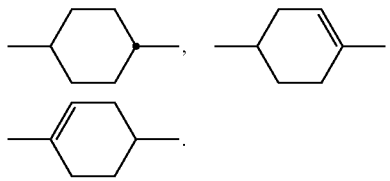

3. A liquid-crystal medium according to claim 2, wherein said medium contains one or more compounds of formula I-2, and one or more compounds of formula II-1.

4. A liquid-crystal medium according to claim 2, wherein said medium contains one or more compounds selected from formulae I-1a to I-1c:

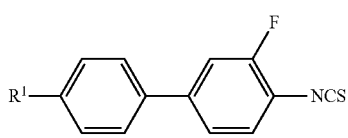

I-1a

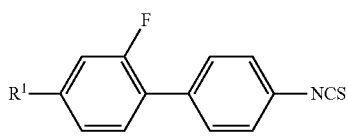

I-1b

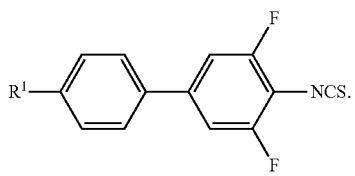

I-1c

5. A liquid-crystal medium according to claim 2, wherein said medium contains one or more compounds selected from formulae II-1a to II-1e:

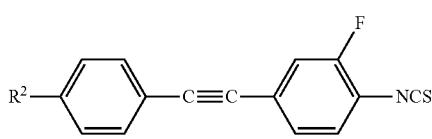

II-1a

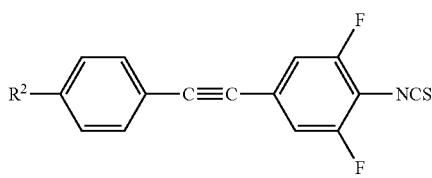

II-1b

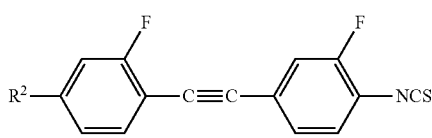

II-1c

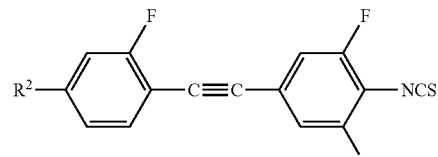

II-1d

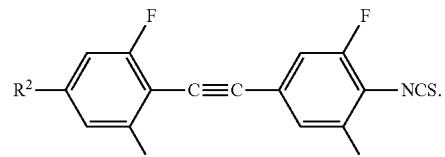

II-1e

6. A liquid-crystal medium according to claim 5, wherein $R^2$ denotes $C_nH_{2n+1}$ or $CH_2=CH-(CH_2)_z$, n denotes an integer in the range from 0 to 15, and z denotes 0, 1, 2, 3 or 4.

7. A liquid-crystal medium according to claim 1, wherein, in addition to said one or more compounds selected from formulae I-3a to I-3d, said medium contains one of more compounds of formula I that are not of formulae I-3a to I-3d:
formula I:

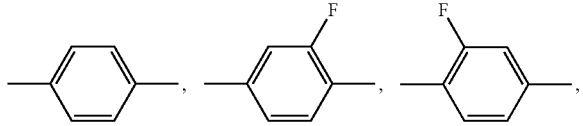

I in which
$R^1$ denotes H, unfluorinated alkyl or unfluorinated alkoxy having 1 to 17 C atoms or unfluorinated alkenyl, unfluorinated alkenyloxy or unfluorinated alkoxyalkyl having 2 to 15 C atoms,
n denotes 0 or 1, and

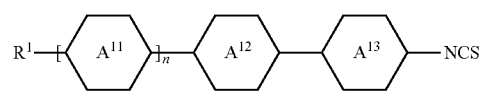

independently of one another, denote

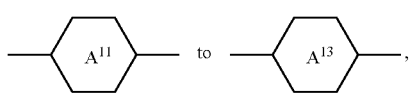

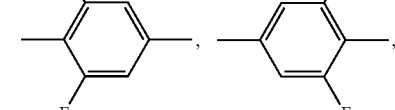

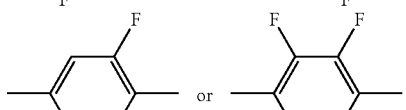

-continued

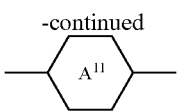

alternatively denotes

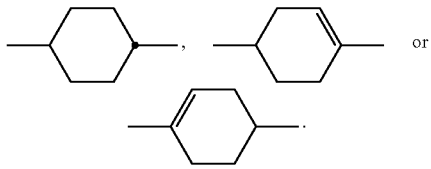

8. A liquid-crystal medium according to claim 7, where $R^1$ denotes unfluorinated alkyl having 1 to 17 C atoms or unfluorinated alkenyl having 2 to 15 C atom.

9. A liquid-crystal medium according to claim 2, wherein said medium contains one or more compounds selected from formulae I-2a to I-2d:

I-2a
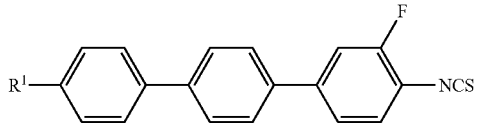

I-2b
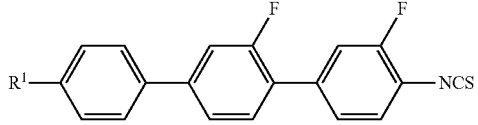

I-2c
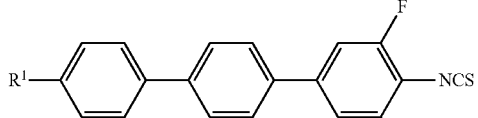

I-2d
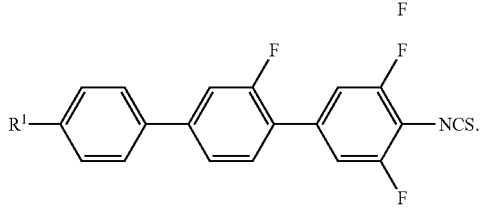

10. A liquid-crystal medium according to claim 9, where $R^1$ denotes unfluorinated alkyl having 1 to 17 C atoms or unfluorinated alkenyl having 2 to 15 C atom.

11. A liquid-crystal medium according to claim 1, wherein said medium further comprises one or more compounds selected from formulae III-1a, III-1c, and III-1d:

III-1a
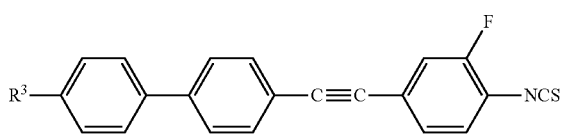

III-1c
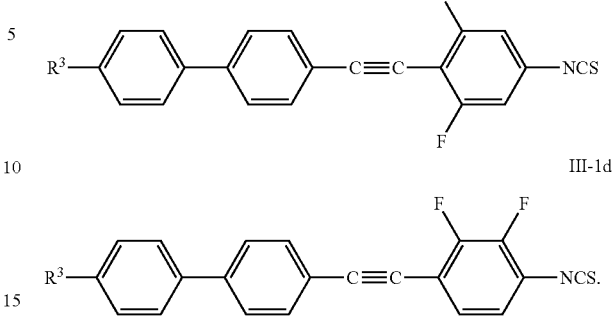

III-1d

12. A liquid-crystal medium according to claim 11, wherein $R^3$ denotes $C_nH_{2n+1}$ or $CH_2=CH-(CH_2)_z$, n denotes an integer in the range from 0 to 15, and z denotes 0, 1, 2, 3 or 4.

13. A liquid-crystal medium according to claim 5, wherein said medium contains one or more compounds selected from II-1b.

14. A liquid-crystal medium according to claim 7, wherein said medium contains one or more compounds selected from I-3c.

15. A liquid-crystal medium according to claim 9, wherein said medium contains one or more compounds selected from I-2d.

16. A component for high-frequency technology, comprising a liquid crystal medium according to claim 1.

17. A component according to claim 16, wherein said component is suitable for operation in the microwave range.

18. A component according to claim 16, wherein said component is a phase shifter or a LC based antenna element operable in the microwave region.

19. A process for the preparation of a liquid-crystal medium according to claim 1, said process comprising mixing one or more compounds selected from formulae I-3a to I-3d, one or more compounds selected from formula II, and one or more compounds selected from formula III-1b, and optionally with one or more further compounds and/or with one or more additives.

20. A microwave antenna array comprising one or more components according to claim 16.

21. A liquid-crystal medium according to claim 2, wherein said medium further contains one or more compounds selected from formulae III-2 to III-6

III-2
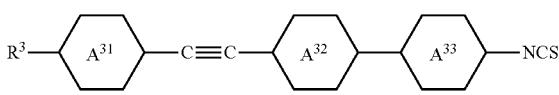

III-3
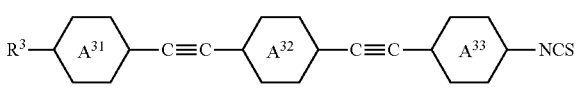

III-4
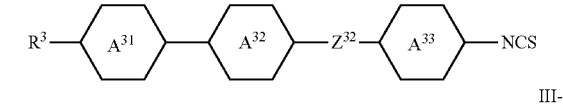

III-5
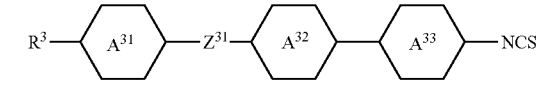

-continued

III-6

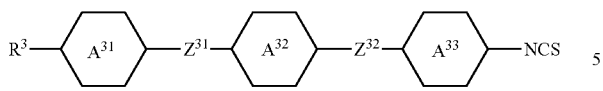

in which
R³ has the meaning given in claim 1,

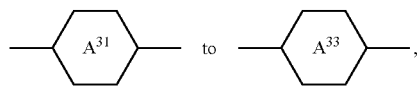

independently of one another, denote

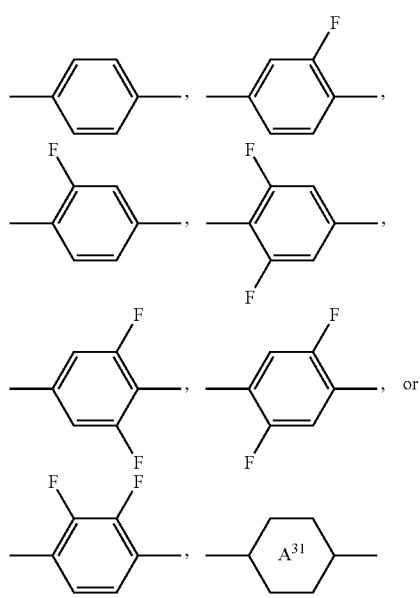

alternatively independently denotes

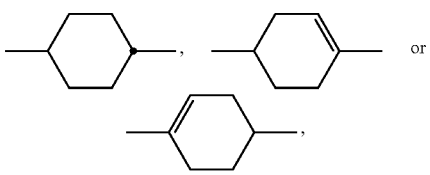

and
Z³¹ and Z³² independently of one another denote trans-CH=CH— or trans-CF=CF—, and in formula 111-6 alternatively one of Z³¹ and Z³² may denote —C≡C—.

22. A liquid-crystal medium according to claim 1, wherein said medium contains one or more compounds selected from I-3c.

23. A liquid-crystal medium according to claim 2, wherein said medium contains one or more compounds selected from I-3c.

24. A liquid-crystal medium according to claim 21, wherein said medium contains one or more compounds selected from formula I-3c.

25. A liquid-crystal medium according to claim 2, wherein said medium contains one or more compounds selected from formula II-2.

26. A liquid-crystal medium according to claim 2, wherein said medium contains one or more compounds selected from formula II-3.

27. A liquid-crystal medium according to claim 2, wherein said medium has a clearing point of 100° C. or more.

28. A liquid-crystal medium according to claim 1, wherein the amount of compounds of formula III-1b in said medium is in the range from 10 to 40 wt. %.

29. A liquid-crystal medium according to claim 1, wherein the amount of compounds of formula III-1b in said medium is in the range from 14 to 45 wt. %.

30. A liquid-crystal medium according to claim 1, wherein the liquid-crystal medium has a clearing point of 120° C. or more.

* * * * *